United States Patent
Leen

(10) Patent No.: US 9,151,510 B2
(45) Date of Patent: Oct. 6, 2015

(54) DISPLAY FOR HVAC SYSTEMS IN REMOTE CONTROL UNITS

(75) Inventor: Cary Leen, Hammond, WI (US)

(73) Assignee: Honeywell International Inc., Morristown, NJ (US)

(*) Notice: Subject to any disclaimer, the term of this patent is extended or adjusted under 35 U.S.C. 154(b) by 1813 days.

(21) Appl. No.: 12/323,433

(22) Filed: Nov. 25, 2008

(65) Prior Publication Data

US 2009/0140057 A1 Jun. 4, 2009

Related U.S. Application Data

(60) Provisional application No. 60/991,674, filed on Nov. 30, 2007.

(51) Int. Cl.
F24F 11/00 (2006.01)
G05D 23/19 (2006.01)

(52) U.S. Cl.
CPC .......... *F24F 11/006* (2013.01); *G05D 23/1905* (2013.01); *F24F 2011/0068* (2013.01); *F24F 2011/0091* (2013.01)

(58) Field of Classification Search
CPC .................. F24F 2011/0064; F24F 2011/0091
USPC ...................................... 236/51, 94
See application file for complete search history.

(56) References Cited

U.S. PATENT DOCUMENTS

| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong et al. |
| 4,298,946 A | 11/1981 | Hartsell et al. |

(Continued)

FOREIGN PATENT DOCUMENTS

| DE | 3334117 | 4/1985 |
| EP | 0070414 | 1/1983 |

(Continued)

OTHER PUBLICATIONS

AED Electronics, Inc., "Presenting Climatouch the Most Innovative Thermostat in the World!," 2 pages, prior to Nov. 30, 2007.

(Continued)

*Primary Examiner* — Jonathan Bradford
(74) *Attorney, Agent, or Firm* — Seager, Tufte & Wickhem LLC

(57) ABSTRACT

An HVAC remote controller for use in an HVAC system is described. In some instances, the HVAC remote controller may include a wireless interface for communicating with one or more HVAC controllers and/or other HVAC devices. The HVAC remote control unit may be configured to display two or more option on a display, wherein the user may be allowed to select one of the two or more options resulting in a selected option. The HVAC remote control unit may display a visual cue for the selected option that visually distinguishes the selected option from the remaining options. The visual cue may include a different border for the selected option than the remaining options and/or a marker within or adjacent to the border. It is also contemplated that a similar visual cue may be used in conjunction with an HVAC controller display, if desired.

19 Claims, 69 Drawing Sheets

(56) References Cited

U.S. PATENT DOCUMENTS

| | | | |
|---|---|---|---|
| 4,308,991 | A | 1/1982 | Peinetti et al. |
| 4,332,352 | A | 6/1982 | Jaeger |
| 4,336,902 | A | 6/1982 | Neal |
| 4,337,822 | A | 7/1982 | Hyltin et al. |
| 4,337,893 | A | 7/1982 | Flanders et al. |
| 4,373,664 | A | 2/1983 | Barker et al. |
| 4,379,483 | A | 4/1983 | Farley |
| 4,382,544 | A | 5/1983 | Stewart |
| 4,386,649 | A | 6/1983 | Hines et al. |
| 4,388,692 | A | 6/1983 | Jones et al. |
| 4,431,134 | A | 2/1984 | Hendricks et al. |
| 4,433,719 | A | 2/1984 | Cherry et al. |
| 4,442,972 | A | 4/1984 | Sahay et al. |
| 4,446,913 | A | 5/1984 | Krocker |
| 4,479,604 | A | 10/1984 | Didner |
| 4,503,471 | A | 3/1985 | Hanajima et al. |
| 4,506,827 | A | 3/1985 | Jamieson et al. |
| 4,556,169 | A | 12/1985 | Zervos |
| 4,585,164 | A | 4/1986 | Butkovich et al. |
| 4,606,401 | A | 8/1986 | Levine et al. |
| 4,621,336 | A | 11/1986 | Brown |
| 4,622,544 | A | 11/1986 | Bially et al. |
| 4,628,201 | A | 12/1986 | Schmitt |
| 4,646,964 | A | 3/1987 | Parker et al. |
| 4,717,333 | A | 1/1988 | Carignan |
| 4,725,001 | A | 2/1988 | Carney et al. |
| 4,837,731 | A | 6/1989 | Levine et al. |
| 4,881,686 | A | 11/1989 | Mehta |
| 4,918,439 | A | 4/1990 | Wozniak et al. |
| 4,948,040 | A | 8/1990 | Kobayashi et al. |
| 4,969,508 | A | 11/1990 | Tate et al. |
| 4,992,779 | A | 2/1991 | Sugino et al. |
| 4,997,029 | A | 3/1991 | Otsuka et al. |
| 5,005,365 | A | 4/1991 | Lynch |
| 5,012,973 | A | 5/1991 | Dick et al. |
| 5,038,851 | A | 8/1991 | Mehta |
| 5,053,752 | A | 10/1991 | Epstein et al. |
| 5,065,813 | A | 11/1991 | Berkeley et al. |
| 5,086,385 | A | 2/1992 | Launey et al. |
| 5,088,645 | A | 2/1992 | Bell |
| 5,140,310 | A | 8/1992 | DeLuca et al. |
| 5,161,606 | A | 11/1992 | Berkeley et al. |
| 5,170,935 | A | 12/1992 | Federspiel et al. |
| 5,172,565 | A | 12/1992 | Wruck et al. |
| 5,181,653 | A | 1/1993 | Foster et al. |
| 5,187,797 | A | 2/1993 | Nielsen et al. |
| 5,230,482 | A | 7/1993 | Ratz et al. |
| 5,238,184 | A | 8/1993 | Adams |
| 5,251,813 | A | 10/1993 | Kniepkamp |
| 5,259,445 | A | 11/1993 | Pratt et al. |
| 5,272,477 | A * | 12/1993 | Tashima et al. .......... 340/870.16 |
| 5,329,991 | A | 7/1994 | Mehta et al. |
| 5,348,078 | A | 9/1994 | Dushane et al. |
| 5,386,577 | A | 1/1995 | Zenda |
| 5,404,934 | A | 4/1995 | Carlson et al. |
| 5,414,618 | A | 5/1995 | Mock et al. |
| 5,482,209 | A | 1/1996 | Cochran et al. |
| 5,495,887 | A | 3/1996 | Kathnelson et al. |
| 5,526,422 | A | 6/1996 | Keen |
| 5,537,106 | A | 7/1996 | Mitcuhashi |
| 5,566,879 | A | 10/1996 | Longtin |
| 5,570,837 | A | 11/1996 | Brown et al. |
| 5,590,831 | A * | 1/1997 | Manson et al. ................. 236/51 |
| 5,603,451 | A | 2/1997 | Helander et al. |
| 5,654,813 | A | 8/1997 | Whitworth |
| 5,673,850 | A | 10/1997 | Uptegraph |
| 5,682,206 | A | 10/1997 | Wehmeyer et al. |
| 5,732,691 | A | 3/1998 | Maiello et al. |
| 5,782,296 | A | 7/1998 | Metha |
| 5,818,428 | A | 10/1998 | Eisenbrandt et al. |
| 5,833,134 | A * | 11/1998 | Ho et al. ..................... 236/49.3 |
| 5,839,654 | A | 11/1998 | Weber |
| 5,873,519 | A | 2/1999 | Beilfuss |
| 5,886,697 | A | 3/1999 | Naughton et al. |
| 5,902,183 | A | 5/1999 | D'Souza |
| 5,915,473 | A | 6/1999 | Ganesh et al. |
| D413,328 | S | 8/1999 | Kazama |
| 5,937,942 | A | 8/1999 | Bias et al. |
| 5,947,372 | A | 9/1999 | Tiernan |
| 5,950,709 | A | 9/1999 | Krueger et al. |
| 6,009,355 | A | 12/1999 | Obradovich et al. |
| 6,020,881 | A | 2/2000 | Naughton et al. |
| 6,032,867 | A | 3/2000 | Dushane et al. |
| D422,594 | S | 4/2000 | Henderson et al. |
| 6,059,195 | A | 5/2000 | Adams et al. |
| 6,081,197 | A | 6/2000 | Garrick et al. |
| 6,101,824 | A | 8/2000 | Meyer et al. |
| 6,104,963 | A | 8/2000 | Cebasek et al. |
| 6,119,125 | A | 9/2000 | Gloudeman et al. |
| 6,121,875 | A | 9/2000 | Hamm et al. |
| 6,140,987 | A | 10/2000 | Stein et al. |
| 6,141,595 | A | 10/2000 | Gloudeman et al. |
| 6,149,065 | A | 11/2000 | White et al. |
| 6,152,375 | A | 11/2000 | Robison |
| 6,154,681 | A | 11/2000 | Drees et al. |
| 6,167,316 | A | 12/2000 | Gloudeman et al. |
| 6,192,282 | B1 | 2/2001 | Smith et al. |
| 6,196,467 | B1 | 3/2001 | Dushane et al. |
| 6,208,331 | B1 | 3/2001 | Singh et al. |
| 6,216,956 | B1 | 4/2001 | Ehlers et al. |
| 6,236,326 | B1 | 5/2001 | Murphy |
| 6,260,765 | B1 | 7/2001 | Natale et al. |
| 6,285,912 | B1 | 9/2001 | Ellison et al. |
| 6,290,140 | B1 | 9/2001 | Pesko et al. |
| D448,757 | S | 10/2001 | Okubo |
| 6,315,211 | B1 | 11/2001 | Sartain et al. |
| 6,318,639 | B1 | 11/2001 | Toth |
| 6,330,806 | B1 | 12/2001 | Beaverson et al. |
| 6,344,861 | B1 | 2/2002 | Naughton et al. |
| 6,351,693 | B1 | 2/2002 | Monie et al. |
| 6,394,359 | B1 * | 5/2002 | Morgan ........................ 236/51 |
| 6,398,118 | B1 | 6/2002 | Rosen et al. |
| 6,453,687 | B2 | 9/2002 | Sharood et al. |
| D464,948 | S | 10/2002 | Vasquez et al. |
| 6,460,774 | B2 | 10/2002 | Sumida et al. |
| 6,466,132 | B1 | 10/2002 | Caronna et al. |
| 6,478,233 | B1 | 11/2002 | Shah |
| 6,502,758 | B2 | 1/2003 | Cottrell |
| 6,518,953 | B1 | 2/2003 | Armstrong |
| 6,518,957 | B1 | 2/2003 | Lehtinen et al. |
| 6,546,419 | B1 | 4/2003 | Humpleman et al. |
| 6,556,899 | B1 | 4/2003 | Pachet et al. |
| 6,578,770 | B1 | 6/2003 | Rosen |
| 6,580,950 | B1 | 6/2003 | Johnson et al. |
| 6,581,846 | B1 | 6/2003 | Rosen |
| 6,595,430 | B1 | 7/2003 | Shah |
| D478,051 | S | 8/2003 | Sagawa |
| 6,608,560 | B2 | 8/2003 | Abrams |
| 6,619,555 | B2 | 9/2003 | Rosen |
| 6,621,507 | B1 | 9/2003 | Shah |
| 6,726,112 | B1 | 4/2004 | Ho |
| D492,282 | S | 6/2004 | Lachello et al. |
| 6,786,421 | B2 | 9/2004 | Rosen |
| 6,789,739 | B2 | 9/2004 | Rosen |
| 6,810,307 | B1 | 10/2004 | Addy |
| 6,810,397 | B1 | 10/2004 | Qian et al. |
| 6,868,293 | B1 | 3/2005 | Schurr et al. |
| D512,208 | S | 12/2005 | Kubo et al. |
| D520,989 | S | 5/2006 | Miller |
| 7,050,026 | B1 | 5/2006 | Rosen |
| 7,055,759 | B2 | 6/2006 | Wacker et al. |
| 7,083,109 | B2 | 8/2006 | Pouchak |
| 7,089,088 | B2 | 8/2006 | Terry et al. |
| 7,108,194 | B1 | 9/2006 | Hankins, II |
| 7,130,720 | B2 | 10/2006 | Fisher |
| D531,588 | S | 11/2006 | Peh |
| D533,515 | S | 12/2006 | Klein et al. |
| 7,146,253 | B2 | 12/2006 | Hoog et al. |
| 7,152,806 | B1 | 12/2006 | Rosen |
| 7,156,318 | B1 | 1/2007 | Rosen |
| D542,236 | S | 5/2007 | Klein et al. |
| 7,225,054 | B2 | 5/2007 | Amundson et al. |
| 7,232,075 | B1 | 6/2007 | Rosen |
| D548,703 | S | 8/2007 | Vendramini |

(56) References Cited

U.S. PATENT DOCUMENTS

| | | | |
|---|---|---|---|
| D549,667 | S | 8/2007 | Huang |
| 2001/0029585 | A1 | 10/2001 | Simon et al. |
| 2001/0042684 | A1 | 11/2001 | Essalik et al. |
| 2001/0052459 | A1 | 12/2001 | Essalik et al. |
| 2002/0005435 | A1 | 1/2002 | Cottrell |
| 2002/0011923 | A1 | 1/2002 | Cunningham et al. |
| 2002/0022991 | A1 | 2/2002 | Sharood et al. |
| 2002/0060701 | A1 | 5/2002 | Naughton et al. |
| 2002/0092779 | A1 | 7/2002 | Essalik et al. |
| 2002/0096572 | A1 | 7/2002 | Chene et al. |
| 2002/0138184 | A1 | 9/2002 | Kipersztok et al. |
| 2002/0171624 | A1* | 11/2002 | Stecyk et al. ............ 345/156 |
| 2002/0173929 | A1 | 11/2002 | Seigel |
| 2003/0000692 | A1 | 1/2003 | Okano et al. |
| 2003/0014179 | A1 | 1/2003 | Szukala et al. |
| 2003/0033156 | A1 | 2/2003 | McCall |
| 2003/0033230 | A1 | 2/2003 | McCall |
| 2003/0034897 | A1 | 2/2003 | Shamoon et al. |
| 2003/0034898 | A1 | 2/2003 | Shamoon et al. |
| 2003/0074489 | A1 | 4/2003 | Steger et al. |
| 2003/0103075 | A1 | 6/2003 | Rosselot |
| 2003/0121652 | A1 | 7/2003 | Carey et al. |
| 2003/0123224 | A1 | 7/2003 | LaCroix et al. |
| 2003/0136135 | A1 | 7/2003 | Kim et al. |
| 2003/0142121 | A1 | 7/2003 | Rosen |
| 2003/0150926 | A1 | 8/2003 | Rosen |
| 2003/0150927 | A1 | 8/2003 | Rosen |
| 2003/0177012 | A1 | 9/2003 | Drennen |
| 2004/0074978 | A1 | 4/2004 | Rosen |
| 2004/0193324 | A1 | 9/2004 | Hoog et al. |
| 2004/0245352 | A1 | 12/2004 | Smith |
| 2004/0262410 | A1 | 12/2004 | Hull |
| 2005/0083168 | A1 | 4/2005 | Breitenbach |
| 2005/0270151 | A1* | 12/2005 | Winick ............ 340/539.1 |
| 2006/0071086 | A1 | 4/2006 | Kates |
| 2006/0186213 | A1 | 8/2006 | Carey et al. |
| 2006/0242591 | A1* | 10/2006 | Van Dok et al. ............ 715/762 |
| 2007/0029397 | A1* | 2/2007 | Mueller et al. ............ 236/46 C |
| 2007/0114293 | A1 | 5/2007 | Gugenheim |
| 2007/0114295 | A1 | 5/2007 | Jenkins |
| 2007/0278320 | A1* | 12/2007 | Lunacek et al. ............ 236/94 |

FOREIGN PATENT DOCUMENTS

| | | |
|---|---|---|
| EP | 0678204 | 3/2000 |
| EP | 0985994 | 3/2000 |
| EP | 1033641 | 9/2000 |
| EP | 1074009 | 7/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

Carrier, "Edge Performance Programmable Owner's Manual," 64 pages, 2007.
Totaline, "P/N P374-0431 Thermostat Remote Control and Receiver," Owner's Manual, 11 pages, prior to Nov. 30, 2007.
Totaline, "Wireless Remote Sensor, Model P474-0401-1RF/REC," 2 pages, prior to Nov. 30, 2007.
Totaline, "P474-1100RF, P474-1100REC Wireless Thermostat," 1 page, prior to Nov. 30, 2007.
DESA Heating Products, "Wireless Hand-Held Remote Control Sets Models (C) GHRCB and (C)GHRCTB, Operating Instructions," 4 pages, May 2003.
Logitech, "Harmony 880 Remote User Manual," v. 1, pp. 1-15, prior to Nov. 30, 2007.
Lux Products Corporation, "9000RF Remote Instructions," 2 pages, prior to Nov. 30, 2007.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. B02WAD1, 2 pages, Jun. 2002.
Sharp Corporation, "GP1S036HEZ Phototransistor Output, Transmissive Photointerrupter with Tilt Direction (4-Direction) Detecting," pp. 1-11, Oct. 3, 2005.
Totaline, "P/N 374-0431 Thermostat Remote Control & Receiver," 11 pages, prior to Nov. 30, 2007.
Trane, "Wireless Zone Sensor. Where Will Technology Take You?", 4 pages, Feb. 2006.
Travis Industries, Remote Fireplace Thermostat, Part #99300651, 6 pages, printed Feb. 3, 2003.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar. . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thmad.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.

(56) References Cited

OTHER PUBLICATIONS

Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Introduction of the S7350A Honeywell WebPAD Information Appliance," Home and Building Control Bulletin, 2 pages, Aug. 29, 2000; Picture of WebPad Device with touch screen, 1 page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents,"53 pages, printed Sep. 20, 2004.
http://www.ritetemp.info/rtMenu_13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.

(56) References Cited

OTHER PUBLICATIONS

Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.

* cited by examiner

DISPLAY FOR HVAC SYSTEMS IN REMOTE CONTROL UNITS

This application also claims priority to U.S. Provisional Application Ser. No. 60/991,674 filed Nov. 30, 2007, entitled "REMOTE CONTROL UNIT FOR HVAC SYSTEM", the entirety of which is incorporated herein by reference.

FIELD

This disclosure generally relates to HVAC controllers for controlling HVAC systems, and more particularly, to HVAC control systems that include an HVAC remote control unit.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation.

In some but not all cases, the HVAC controllers are embodied in a thermostat that is mounted to a wall or the like within a building. A typical thermostat includes a local temperature sensor, and/or in some cases, accesses other sensors such as one or more remote temperature sensors. The sensors are used to sense one or more environmental conditions of the inside space, and provide a measure of the sensed environmental condition to the HVAC controller. The HVAC controller may use the measure provided by the sensor to control the one or more HVAC components to achieve desired programmed or set environmental conditions. In many cases, the sensors are provided within the housing of the HVAC controller itself, which is typically mounted at or near the walls of the building, and/or the sensors are mounted at particular fixed locations within the building, which are also typically located at or near the walls of the building. In some cases, the environmental conditions at or near the walls of the building can be different from the environmental conditions away from the walls. As such, the environmental conditions sensed by the sensors sometimes do not accurately represent the actual environmental conditions felt by the occupants of the building.

HVAC controllers often have a user interface that can be used to program or otherwise operate the HVAC controller. By interacting with the user interface, the user may, for example, change a set point, program a schedule, enable or disable certain HVAC components, and/or perform some other action or tasks. In order to interact with the user interface, the user must typically physically walk over to the HVAC controller. In zoned systems, which typically include a plurality of HVAC controllers, the user must typically often walk over and interact with each HVAC controller where changes are desired.

SUMMARY

This disclosure generally relates to HVAC controllers for controlling HVAC systems, and more particularly, to HVAC control systems that include an HVAC remote control unit. In some instances, an HVAC remote control unit wirelessly communicates with one or more HVAC controllers and/or other HVAC devices. The HVAC remote control unit may be configured to display two or more option on a display, wherein the user may be allowed to select one of the two or more options resulting in a selected option. The HVAC remote control unit may display a visual cue for the selected option that visually distinguishes the selected option from the remaining options. In some cases, the HVAC remote control unit may display a different border for the selected option than the remaining options to visually distinguish the selected option from the remaining options. In some cases, the HVAC remote control unit may add a marker within or adjacent to the border to indicate that the selection option has been selected by a user. It is contemplated that a similar visual cue may be used in conjunction with an HVAC controller display, if desired.

The preceding summary is provided to facilitate a general understanding of some of the innovative features unique to the present disclosure and is not intended to be a full description. A full appreciation of the disclosure can be gained by taking the entire specification, claims, drawings, and abstract as a whole.

BRIEF DESCRIPTION

The invention may be more completely understood in consideration of the following detailed description of various illustrative embodiments of the invention in connection with the accompanying drawings, in which.

DESCRIPTION

Figure 1:
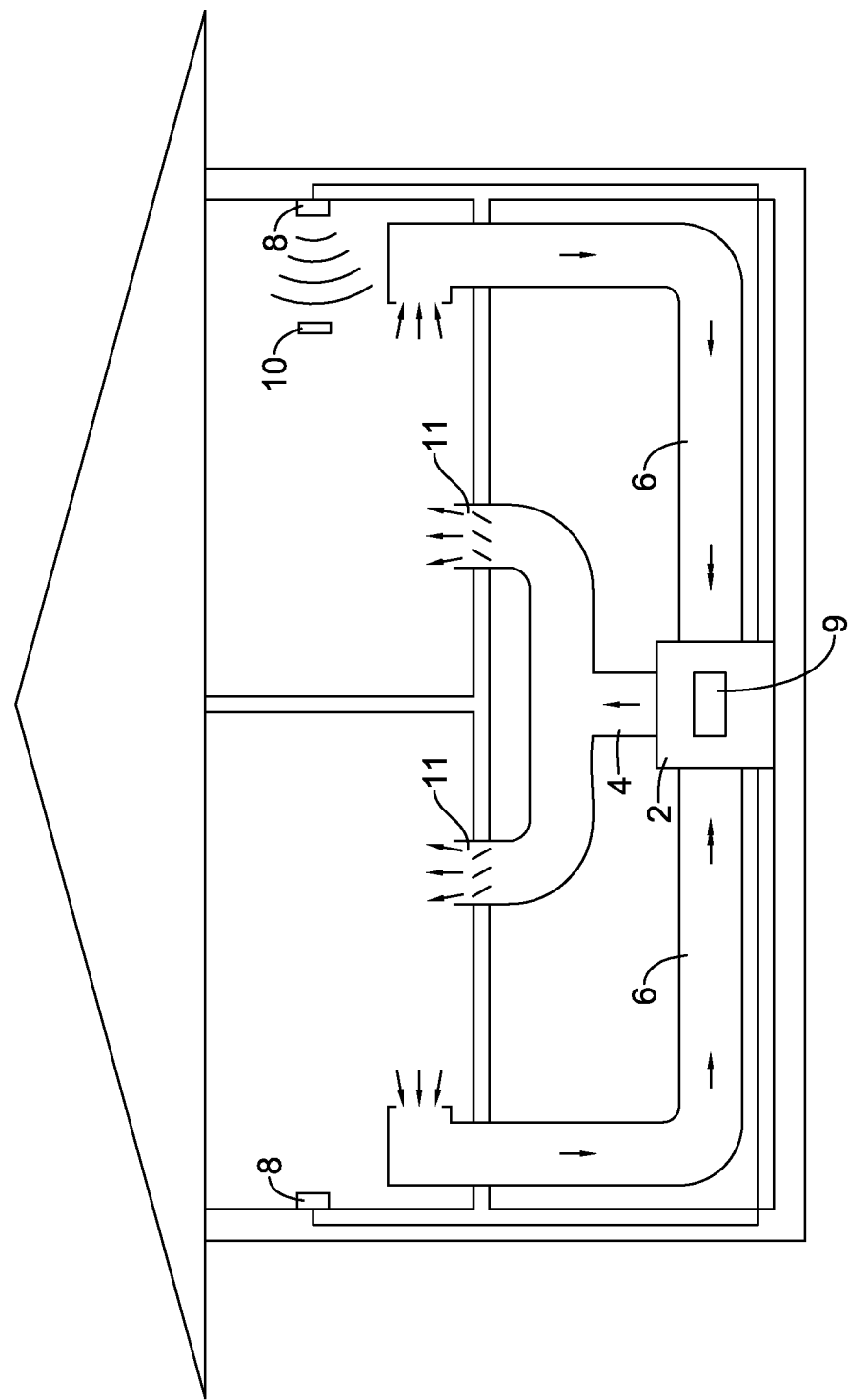
FIG. 1 is a schematic view of a building or other structure with an illustrative heating, ventilation, and air conditioning (HVAC) system.

The following description should be read with reference to the drawings wherein like reference numerals indicate like elements throughout the several views. The detailed description and drawings show several embodiments which are meant to be illustrative of the claimed invention.

FIG. 1 is a schematic view of a building or other structure having an illustrative heating, ventilation, and air conditioning (HVAC) system. While FIG. 1 shows a typical force air type HVAC system, other types of HVAC systems may be used including hydronic systems, boiler systems, radiant heating systems, electric heating systems, or any other suitable type of HVAC system, as desired. The HVAC system of FIG. 1 includes one or more HVAC components 2, a system of vents or ductwork 4 and 6, and one or more HVAC controllers 8. The one or more HVAC components 2 may include, but are not limited to, a furnace, a boiler, a heat pump, an electric heating unit, an air conditioning unit, a humidifier, a dehumidifier, an air exchanger, an air cleaner, and/or the like.

In the illustrative HVAC system shown in FIG. 1, the one or more HVAC components 2 can provide heated air (and/or cooled air) via the ductwork throughout the building or other structure. As illustrated, the one or more HVAC components 2 may be in fluid communication with every room and/or zone in the building or other structure via the ductwork 4 and 6. In operation, when a heat call signal is provided by one or more of the HVAC controllers 8, one or more HVAC components 2 (e.g. forced warm air furnace) may be activated to supply heated air to one or more rooms and/or zones within the building or other structure via supply air ducts 4. The heated air may be forced through supply air duct 4 by a blower or fan 9. In this example, the cooler air from each zone may be returned to the one or more HVAC components 2 (e.g. forced warm air furnace) for heating via return air ducts 6. Similarly, when a cool call signal is provided by one or more of the HVAC controllers 8, the one or more HVAC components 2 (e.g. air conditioning unit) may be activated to supply cooled air to one or more rooms and/or zones within the building or other structure via supply air ducts 4. The cooled air may be forced through supply air duct 4 by the blower or fan 9. In this example, the warmer air from each zone may be returned to the one or more HVAC components 2 (e.g. air conditioning unit) for cooling via return air ducts 6.

In some cases, the system of vents or ductwork 4 and 6 can include one or more dampers 11 to regulate the flow of air. For example, one or more dampers 11 may be coupled to one or more of the HVAC controllers 8 and can be coordinated with the operation of one or more HVAC components 2. The one or more HVAC controllers 8 may actuate dampers 11 to an open position, a closed position, and/or a partially open position to modulate the flow of air from the one or more HVAC components 2 to an appropriate room and/or zone in the building or other structure. The dampers 11 may be particularly useful in zoned HVAC systems, and may be used to control which zone(s) receives conditioned air from the HVAC components 2.

It is contemplated that the one or more HVAC controllers 8 may be configured to control the comfort level of the building or structure by activating and deactivating the one or more HVAC components 2. In some cases, the one or more HVAC controllers 8 may be thermostats, such as, for example, wall mountable thermostat, but this is not required in all embodiments. In some embodiments, the HVAC controllers 8 may be zone controllers, each controlling the comfort level within a particular zone in the building or other structure. Some contemplated HVAC controllers include that disclosed in U.S. Provisional Patent Application Ser. No. 60/991,626, titled "HVAC CONTROLLER", the entirety of which is incorporated herein by reference.

As shown in FIG. 1, an HVAC remote controller 10 may also be provided. In some cases, the HVAC remote controller 10 may be operatively connected in any suitable manner to one or more of the HVAC controllers 8 (e.g. one or more HVAC thermostats and/or one or more HVAC zone controllers) to provide remote temperature sensing and/or parameter setting control for the one or more HVAC controllers 8. In some cases, the HVAC remote controller 10 may be wirelessly connected to one or more of the HVAC controllers 8. The HVAC remote controller 10 may be a portable remote control unit that may allow a user to view, display and/or change one or more parameters of the corresponding HVAC controllers 8 and/or HVAC remote controller 10. The HVAC remote controller 10 may be movable by the user between multiple locations within the building or other structure. For example, in a residential building, the HVAC remote controller 10 may be movable between a living room, a kitchen, a den, a bedroom, and/or any other location in the building. When provided with a temperature sensor, the HVAC remote controller 10 may sense an ambient temperature proximate to the HVAC remote controller 10 and, in some cases, relay the temperature to an appropriate HVAC controller 8. In some cases, the appropriate HVAC controller 8 may use the temperature sensed by the HVAC remote controller 10 to control the comfort level of the building or structure by issuing appropriate commands to the HVAC equipment 2.

In a zoned HVAC system, there may be more than one HVAC controller 8 (or zone controllers), each controlling a corresponding zone within the building or other structure. When so provided, it is contemplated that the HVAC remote controller 10 may be operatively coupled to each of the HVAC controllers 8, either simultaneously, sequentially or by user selection. In some cases, the HVAC remote controller 10 may be configured to automatically or manually detect the number of zoned HVAC controllers 8 in the zoned HVAC system. For example, the HVAC remote controller 10 may be configured to automatically detect and establish communication with each of the zoned HVAC controllers 8, either simultaneously, sequentially or by user selection. Once connected, the HVAC remote controller 10 may be used to provide remote temperature sensing and/or parameter or setting control for the corresponding zoned HVAC controller 8. In some cases, the HVAC remote controller 10 may dynamically change its behavior based on whether it detects a non-zoned or a zone system. For example, when a zoned system is detected, the HVAC remote controller 10 may automatically provide a selection mechanism on the user interface of the HVAC remote controller 10 that allows a user to select, display and/or control parameters and/or settings of an HVAC controller 8 that corresponds to a selected zone in the building or other structure. When a non-zoned system is detected, the zone selection mechanism may not be provided on the display.

Rather than establishing communication with the HVAC controllers 8, and then have the HVAC controllers 8 issue commands or calls to the HVAC components 2, it is contemplated that the HVAC remote controller 10 may issue commands or calls directly to the HVAC components 2, typically across a wireless interface.

Figure 1A:
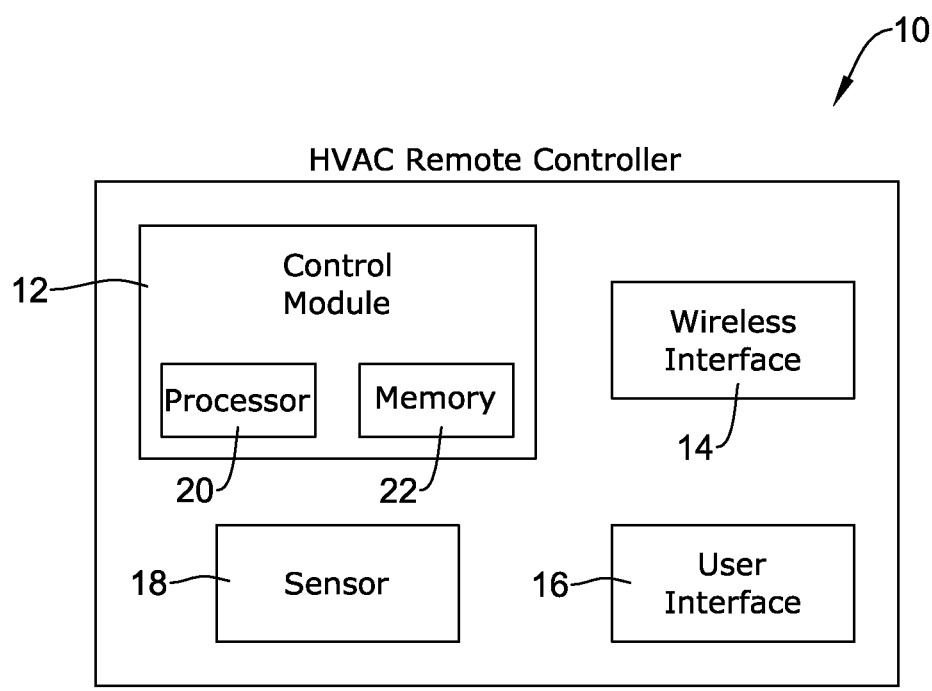
FIG. 1A is a block diagram of an illustrative HVAC remote controller that may be used in conjunction with the HVAC system of FIG. 1.

FIG. 1A is a block diagram of an illustrative HVAC remote controller 10 that may be used in conjunction with the HVAC system of FIG. 1. In the illustrative embodiment, the HVAC remote controller 10 includes a control module 12, a wireless interface 14, a user interface 16, and one or more sensors 18. In some cases, the one or more sensors 18 may include a temperature sensor, a humidity sensor, a ventilation sensor, an air quality sensor, and/or any other suitable HVAC building control system sensor, as desired. The temperature sensor may be provided to sense the temperature proximate the HVAC remote controller 10. The humidity sensor may be provided to sense the humidity proximate the HVAC remote controller 10. The ventilation sensor may be provided to sense the ventilation proximate the HVAC remote controller 10. As illustrated, the one or more sensors 18 may be included with the HVAC remote controller 10, such as within a housing (shown in FIG. 2) of HVAC remote controller 10. However, it is contemplated that one or more sensors 18 may be located remote from the HVAC controller 10, but in communication therewith, if desired.

Control module 12 of HVAC remote controller 10 may be configured to help control the comfort level (i.e. heating, cooling, ventilation, air quality, etc.) of at least a portion of the building or structure by controlling whether one or more HVAC components 2 of HVAC equipment are activated. In some instances, control module 12 may include a processor 20 and a memory 22. Control module 12 may be configured to control and/or set one or more HVAC functions, such as, for example, HVAC schedules, temperature setpoints, humidity setpoints, trend logs, timers, environment sensing, and/or other HVAC functions or programs, as desired. In some cases, control module 12 may be configured to remotely configure the one or more settings of the HVAC controller, such as, for example, HVAC controller schedules, temperature setpoints, humidity setpoints, trend logs, timers, environment sensing, HVAC controller programs, user preferences, and/or other HVAC controller settings, as desired. In the illustrative embodiment, control module 12 may help control the comfort level of at least a portion of the building or structure using the temperature sensed by temperature sensor of the one or more sensors 18, when provided.

Memory 22 may be used to store any desired information, such as the aforementioned HVAC schedules, temperature setpoints, humidity setpoints, trend logs, timers, environmental settings, and any other settings and/or information as desired. Control module 12 may store information within memory 22 and may subsequently retrieve the stored information. Memory 22 may include any suitable type of memory, such as, for example, random-access memory (RAM), read-only member (ROM), electrically erasable programmable read-only memory (EEPROM), Flash memory, or any other suitable memory, as desired.

Wireless interface 14 of the HVAC remote controller 10 may be configured to wirelessly communicate (i.e. transmit and/or receive signals) with a wireless interface of one or more HVAC controllers 8 (and/or HVAC components 2). For example, wireless interface 14 may be configured to communicate with a wireless interface of HVAC controllers 8 (see FIG. 1) to send and/or receive signals that corresponding to, for example, a temperature sensed by temperature sensor, a humidity sensed by the humidity sensor, heat and/or cool set points, ventilation settings, indoor and/or outdoor air temperatures, equipment status, scheduling, trend logs, and/or any other suitable information and/or data. It is contemplated that the wireless interface 14 may include, for example, a radio frequency (RF) wireless interface, an infrared wireless interface, a microwave wireless interface, an optical interface, and/or any other suitable wireless interface, as desired.

User interface 14 may be any suitable interface that is configured to display and/or solicit information as well as permit a user to enter data and/or other settings, as desired. In some cases, user interface 16 of the HVAC remote controller 10 may allow a user or technician to program and/or modify one or more control parameters of HVAC remote controller 10, such as programming, set point, time, equipment status and/or parameters, as desired. Alternatively, or in addition, user interface 16 may allow a user or technician to program and/or modify one or more control parameters of the HVAC controller 8. In some instances, the user interface 16 may include a touch screen, a liquid crystal display (LCD) panel and keypad, a dot matrix display, a computer, buttons and/or any other suitable interface, as desired. In one illustrative embodiment, at least some of the parameters and/or settings may be transmitted to a HVAC controller 8 via wireless interface 14.

Figure 2:
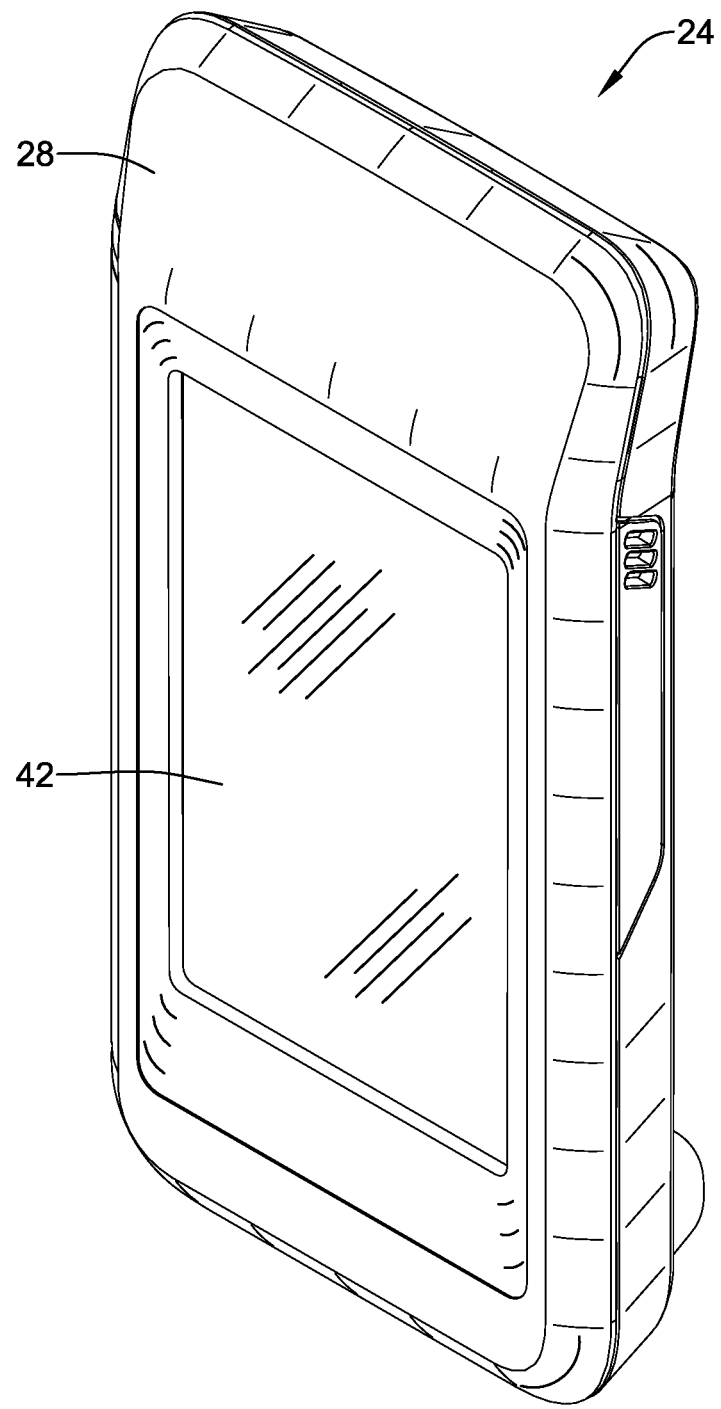
FIG. 2 is a perspective view of an illustrative HVAC remote controller.

FIG. 2 is a perspective view of an illustrative HVAC remote controller 24. In some instances, HVAC remote controller 24 may represent a manifestation of HVAC remote controller 10 of FIGS. 1 and 1A, but this is not required. The illustrative HVAC remote controller 24 includes a display 42 that is disposed within a housing 28. In some cases, display 42 may be at least a portion of the user interface of the HVAC remote controller 24. Display 42 may be a touch screen display, a liquid crystal display (LCD) panel, a dot matrix display, a fixed segment display, a cathode ray tube (CRT), or any other suitable display, as desired. A dot matrix display is a typically a LCD display that permits images such as letters, numbers, graphics, and the like to be displayed anywhere on the LCD, rather than being confined to predetermined locations such as is the case with a fixed segment LCD. Housing 28 may be formed of any suitable material, such as a polymeric, metallic, or any other material, as desired. In some cases, the display 42 may be either inset or recessed within the housing 28 as shown.

The HVAC remote controller 24 may be configured to provide substantial display and/or programming functionality. FIGS. 3 through 16 provide examples of screens that may be displayed by HVAC remote controller 24 during operation. In some cases, the screens may include a home screen that can be displayed by HVAC remote controller 24 as a default screen, when no other data entry is underway, and/or when selected by the user. A home screen may, if desired, display one or more parameters relating to environmental conditions such as indoor and/or outdoor temperature and/or humidity, expected weather conditions, set points, time, equipment status, and/or any other suitable parameter or setting, as desired. In some cases, the home screen may vary depending on the HVAC system that the HVAC remote controller 24 is operatively engaged in helping to control (e.g. zone HVAC system, non-zoned HVAC system, programmable HVAC controller, non-programmable HVAC controller, etc.).

In some instances, the home screen may allow many or all of the user settings of the HVAC remote controller 24 to be viewed and controlled, without having to access sub-menus. In one illustrative embodiment, all settings (other than installer setup settings) may be accessed and controlled in a single menu level or screen (e.g. the home screen). These settings may include, for example, system setting (e.g. heat, cool, off), set point(s), zone selection, clock, indoor temperature, outdoor temperature, etc. It is contemplated that this may be accomplished even when the display 42 is a fixed segment LCD display. In one example, a HVAC remote controller may display a home screen that can be used to change an HVAC system setting (e.g. heat, cool, off), a set point temperature, and a hold setting without having to access a sub-menu. The example home screen may also allow a user to: change whether the HVAC system uses a temperature sensed by the HVAC remote control unit or a separate thermostat; select between two or more zones when the HVAC system is a zoned HVAC system; and/or display one or more temperature readings (e.g. indoor temperature reading and/or outdoor temperature reading), without having to access a sub-menu. In some cases, less used settings, such as installer setup settings, may be provided in one or more sub-menus or other menus, if desired. In other embodiments, at least some of the settings for the main user functionality of the HVAC remote controller 24 may also be incorporated into one or more sub-menus, if desired.

FIGS. 3-16 are pictorial views showing some illustrative screens that may be displayed on the display 42 of the HVAC remote controller 24 of FIG. 2. In the illustrative embodiment, HVAC remote controller 24 may be configured to display information about one or more HVAC control parameters on at least a portion of a touch screen display 42. In some cases, and as discussed above, remote controller touch screen display 42, which may be at least part of the user interface, may include an LCD touch screen display configured to display and/or allow a user to modify one or more parameters or settings. The parameters viewed and/or changes made using touch screen display 42 may be transmitted to and/or received from an HVAC controller 8. Some examples of suitable touch screens include resistive, capacitive, infrared or surface acoustic wave (SAW) type touch screens. As illustrated, the touch screen display 42 may be a fixed segment display. However, this is not meant to be limiting in any manner and it is contemplated that the touch screen display 42 may be any suitable display, such as, for example, a dot matrix display.

In the illustrative embodiment, touch screen display 42 may be configured to have a screen 30 that provides the user with information about the operational status of the HVAC controller 8 and/or HVAC remote controller 24. This information may include, for example, the current inside temperature 48, the current outside temperature 46, the current time 44, the current heat and/or cool set point 50, as well as other operational parameters and/or information as desired. By pressing various icon buttons on the touch screen display 42, the HVAC remote controller 24 can be configured to access and/or modify various operational settings of the HVAC controller 8 and/or HVAC remote controller 24. For example, the user may use the touch screen display 42 to adjust the current temperature or humidity setpoints, change the clock or date settings of the HVAC controller 8 and/or HVAC remote controller 24, change the operational status of the HVAC controller 8 and/or HVAC remote controller 24 (i.e. heat 32, cool 34, off 36), etc.

Although not expressly shown, in some cases, the touch screen display 42 may be configured to display the humidity level on a portion of screen 30. In this case, touch screen display 42 may be configured to display the outdoor humidity level and/or indoor humidity level, as desired. In one example, touch screen display 42 may be configured to display the outdoor humidity level when the user touches the touch screen display adjacent to the current outside temperature 46. In another example, touch screen display 42 may be configured to display the inside humidity level when the user touches the touch screen display adjacent to the current inside temperature 48. In some cases, the inside and/or outside humidity levels may be displayed for a period of time or, in other cases, may be displayed until the user touches the touch screen display 42 adjacent to the current inside temperature 48 and/or the current outside temperature 42, respectively. However, it is contemplated that any suitable method of displaying the outside and/or inside humidity levels may be used, as desired.

The touch screen display 42 may indicate and/or allow a user to set which temperature sensor (e.g. temperature sensor of the HVAC remote controller 10 of FIG. 1A, or a temperature sensor of the HVAC controller 8) is currently being used to control the comfort level of the building or other structure. For example, touch screen display 42 may include an icon 38 for indicating when the temperature sensor of the HVAC controller 8 is currently controlling, and an icon 40 for indicating when the temperature sensor of the HVAC remote controller 10 of FIG. 1A (or HVAC remote controller 24) is controlling (e.g. this device).

As illustrated, the touch screen display 42 may simultaneously display an icon for each option that a user may wish to select. For example, touch screen display 42 may include icons 32, 34, and 36, corresponding to the heat mode, cool mode, and off mode, respectively, of the HVAC controller 8, and icons 38 and 40 for indicating which device's sensed temperature (e.g. the HVAC controller 8 or the HVAC remote controller 10), respectively, is currently being used to control the comfort level of the building or other structure. To indicate which option is currently selected, the icon corresponding to the selected option may include a bold outline, as illustrated by bold outline around icon 38 and icon 32, and/or a dot or other marker provided within or proximate the outline of the icon, as illustrated by the dot in the relative top left corner of icon 38 and icon 32. It is contemplated that the option that is currently selected may include a different border, be highlighted, grayed out, or otherwise indicated in any suitable visually discernable manner, as desired. In some cases, a user may be able to touch the area of the touch screen display 42 that corresponds to icon 32, 34, or 36 to manually select and switch the operation status of the HVAC controller 8, or the area of touch screen display 42 corresponding to icon 38 or 40 to manually select and switch which device's sensed temperature is currently being used to control the comfort level within the building or other structure.

In some embodiments, HVAC remote controller 24 may include a backlight operation to illuminate at least a portion of touch screen display 42. In some cases, the backlight may be configured to illuminate touch screen display 42 when the user touches a portion of the touch screen display 42. In one example, the backlight may be configured to illuminate the touch screen display 42 for a period of time, such as, for example, one second, two seconds, three seconds, four seconds, five seconds, ten seconds, or any other suitable period of time, as desired. In this case, the period of time may be reset each time the user touches the touch screen display 42. Additionally, the illustrative HVAC remote controller 24 may include one or more backlight operation settings, such as, for example, the brightness, the length of time to illuminate the touch screen display 42 after a touch, and/or any other suitable backlight setting, as desired.

In some cases, the HVAC remote controller 24 may be configured to activate the backlight to illuminate the touch screen display 42 when the user touches any portion of the touch screen display 42. However, in other cases, the HVAC remote controller 24 may be configured to illuminate the touch screen display 42 only when a predetermined portion of the touch screen display 42 is touched, such as, for example, the corners of the touch screen display 42, a portion of the touch screen display 42 that does not correspond to any icon, or any other suitable portion, as desired. In another illustrative case, the HVAC remote controller 24 may be configured to include a button to activate and/or deactivate the backlight display on the housing 28 of the HVAC remote controller 24, but this is not required.

In one example, the touch screen display 42 may be configured to illuminate the backlight when the user touches the touch screen display 42. When the touch screen display 42 is illuminated, the user may then be able to view, control, and/or adjust the one or more parameters of the HVAC remote controller 24. In this example, the HVAC remote controller 24 may be configured to prevent any parameter or setting changes to the HVAC remote controller 24 when the touch screen display 42 is not illuminated by the backlight, but this is not required.

Figure 3A:
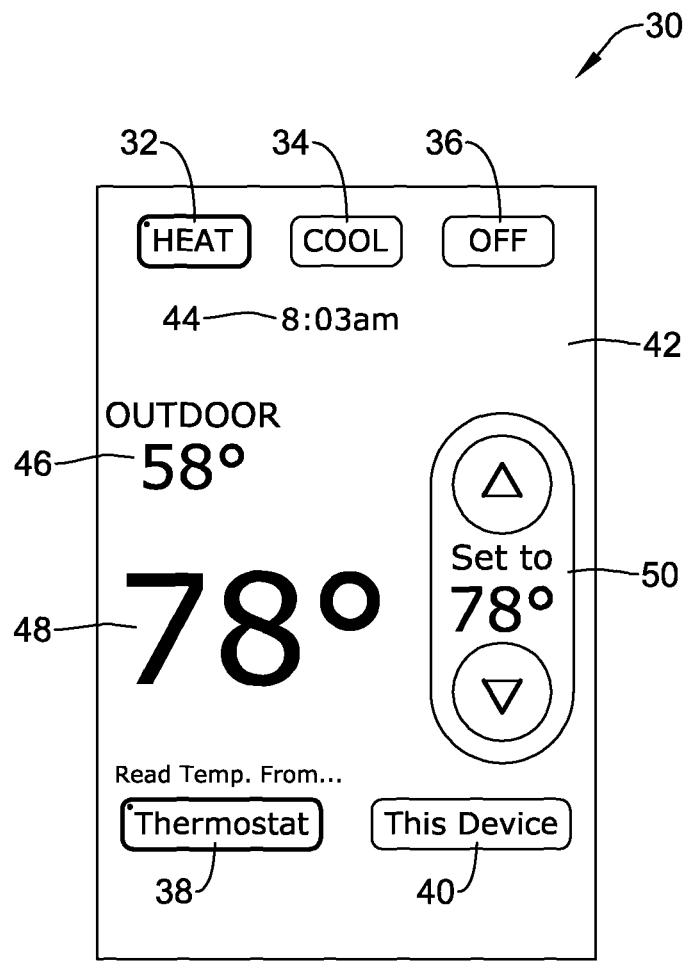
FIGS. 3-16 are pictorial views showing illustrative screens that may be displayed on the HVAC remote controllers of FIG. 1 and FIG. 2.

In FIG. 3A, the screen 30 may correspond to a home screen for the HVAC remote controller 24. In some cases, screen 30 may represent a home screen when, for example, the HVAC remote controller 24 is operatively coupled to a programmable HVAC controller 8 in a non-zoned HVAC system. As discussed previously, screen 30 of the touch screen display 42 may provide HVAC operational status, such as, the current inside temperature 48, the current outside temperature 46, the current time 44, and the current heat and/or cool set point 50. Also, as discussed previously, screen 30 may indicate which device's temperature sensor is currently being used to control the comfort level within the building or other structure. In addition, screen 30 may provide the operational status of the HVAC control system (e.g. heat, cool, off, etc.). As illustrated, touch screen display 42 may include an icon 32 for indicating when the HVAC controller 8 is in heat mode, an icon 34 for indicating when the HVAC controller 8 is in cool mode, and an icon 36 for indicating when the HVAC controller 8 is in an off mode. As illustrated by the bold outline of icon 32 and the dot in icon 32, the operational status of the HVAC controller 8 is shown to be in the heat mode. In some cases, a user may be able to touch the area of the touch screen display 42 corresponding to icon 32, 34, or 36 to manually switch the operational status of the HVAC controller 8, if desired. If a user manually changes the operational status of the HVAC controller to the off mode or the cool mode, screen 30 may change to either screen 52 or 54, shown in FIGS. 3B and 3C, respectively.

In the illustrative embodiment, the set point shown as the current heat and/or cool set point 50 may be changed by touching the region of the touch screen display 42 that corresponds to the up arrow and/or the down arrow shown above and below the heat and/or cool set point 50. If the set point is changed, the touch screen display 42 may display, for example, screen 92 shown in FIG. 8A.

In some cases, the illustrative HVAC remote controller 24 may be configured to include an auto operational mode. In one example, the auto mode may be set, or switched to, by touching the touch screen display 42 corresponding to both icon 32 and icon 34 simultaneously. In some cases, the touch may have to last for a period of time, but this is not required. If the operational mode is switched to auto mode, the touch screen display 42 may display screen 142 shown in FIG. 11A. Alternatively, it is contemplated that a separate "auto" mode button may be provided on the touch screen display 42, which can then be directly selected by the user.

In some cases, the HVAC remote controller 24 may be configured to detect a power level, such as, for example, a remaining battery power level. If the remaining battery power level detected by the HVAC remote controller 24 is less than a threshold level, in some cases, the touch screen display 42 may display screen 76 or 80 shown in FIG. 6A or 6B, respectively, which displays a "Replace Battery" indicator.

In the illustrative embodiment, the HVAC remote controller may be configured to wirelessly communication with one or more HVAC controllers 8 and/or HVAC components 2. In some cases, it is contemplated that the wireless communication signal, such as, for example, a radio frequency (RF) signal, may be lost at least temporarily. In this case, when the communication signal is lost, the touch screen display 42 may display screen174 and/or 178 of FIGS. 14A and 14B, respectively.

Figure 3B:
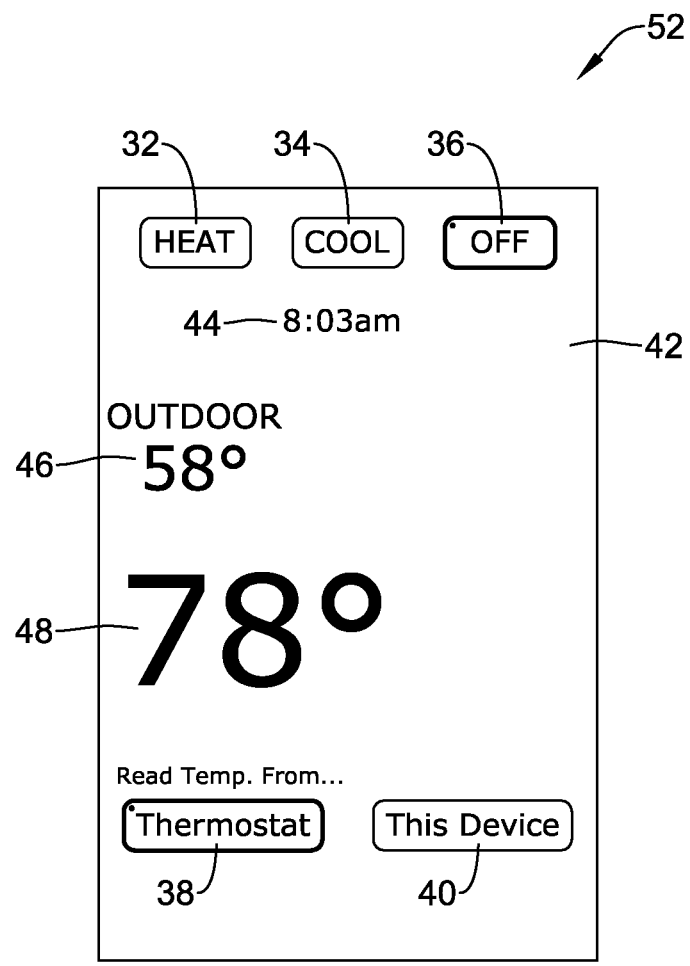

FIG. 3B shows an illustrative screen 52 that may be displayed on the touch screen display 42 when the operational status of the HVAC controller is turned to the off mode. As illustrated, screen 52 may be similar to screen 30 shown in FIG. 3A, providing parameters such as, the current inside temperature 48, the current outside temperature 46, the current time 44, the controlling device (e.g. which temperature sensor is currently being used to control the comfort level of the building or other structure), and the operational status of the HVAC control system (e.g. heat, cool, off). However, in screen 52 as opposed to screen 30, icon 36 corresponding to the off mode, may include a bold outline and/or dot, or may include a different border, be highlighted, grayed out, or otherwise indicate that the HVAC controller is set to the off mode. In addition, because the HVAC controller is in the off mode, the current heat and/or cool set point, shown as 50 of FIG. 3A, may be removed from screen 52.

Figure 3C:
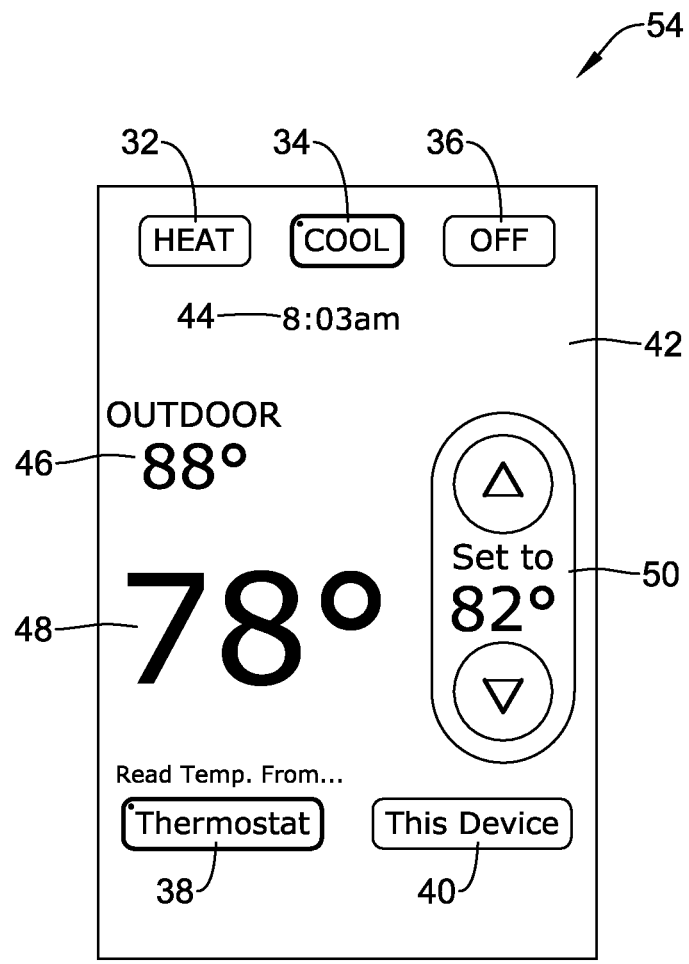

FIG. 3C shows an illustrative screen 54 of touch screen display 42 when the operational status of the HVAC controller is turned to cool mode. As illustrated, screen 54 may be similar to screen 30 and 52 shown in FIGS. 3A and 3B, respectively, providing parameters, such as, the current inside temperature 48, the current outside temperature 46, the current time 44, the controlling device (e.g. which temperature sensor is currently being used to control the comfort level of the building or other structure), and the operational status of the HVAC control system (e.g. heat, cool, off). In screen 54, and in contrast to screens 30 and 52, the icon 34 corresponding to the cool mode may include a bold outline and/or dot, may include a different border, may be highlighted, grayed out, or otherwise indicated that the HVAC controller is set to the cool mode. Similar to screen 30 of FIG. 3A and in contrast to screen 52 of FIG. 3B, the current heat and/or cool set point, shown at 50 may be provided on the screen 54.

FIGS. 4A-4D are pictorial views showing illustrative screens 56, 66, 68, and 72 that may be displayed on the illustrative HVAC remote controller touch screen display 42 for setting/changing zones, when present. In the illustrative embodiment, the HVAC remote controller 24 may be used in a multi-thermostat building control system and/or a zoned HVAC control system. In some cases, illustrative screen 56 shown in FIG. 4A may be used as a home screen for a zoned HVAC system, but this is not required.

Screen 56 provides parameters related to HVAC operational status including, for example, the current inside temperature 48, the current outside temperature 46, the current time 44, and the current heat and/or cool set point 50. In addition, screen 56 may provide the operational status of the HVAC control system. As illustrated, touch screen display 42 may include an icon 32 for indicating when the HVAC controller is in heat mode, an icon 34 for indicating when the HVAC controller is in cool mode, and an icon 36 for indicating when the HVAC control is off. As described above, to indicate the current operational status, the icon that corresponds to the current operational status of the HVAC system may include a bold outline, as illustrated by bold outline around icon 32, and/or a dot within the icon, or may include a different border, may be highlighted, grayed out, or otherwise differentiated from the other operational status icons. In some cases, a user may be able to touch the area of the touch screen display 42 corresponding to icon 32, 34, or 36 to manually switch the operational status of the HVAC system. Although not expressly shown, it is contemplated that screen 56 may include an indication of which device (e.g. which temperature sensor is currently being used to control the comfort level of the building or other structure) is controlling the HVAC controller, if desired.

In the illustrative embodiment, screen 56 may include an HVAC zone navigation area 58 for indicating and/or navigating through the various zones of the building or other structure. As illustrated, the navigation area 58 may include a room indicator 64 and two directional arrows, shown as icons 60 and 62, for scrolling or toggling through the one or more available zones in the building or other structure. In the illustrative screen 56, the HVAC remote controller 24 is currently identifying the "LIVING ROOM" zone, as shown by room indicator 64. In this case, the HVAC remote controller 24 may display, set and/or control parameters related to the living room zone of the building or other structure. To navigate to a different zone of the building or other structure, a user may touch the left directional arrow icon 60 or right directional arrow icon 62. Touching the icons 60 or 62 may scroll or toggle through the available zones in the building or other structure.

Figure 4A:
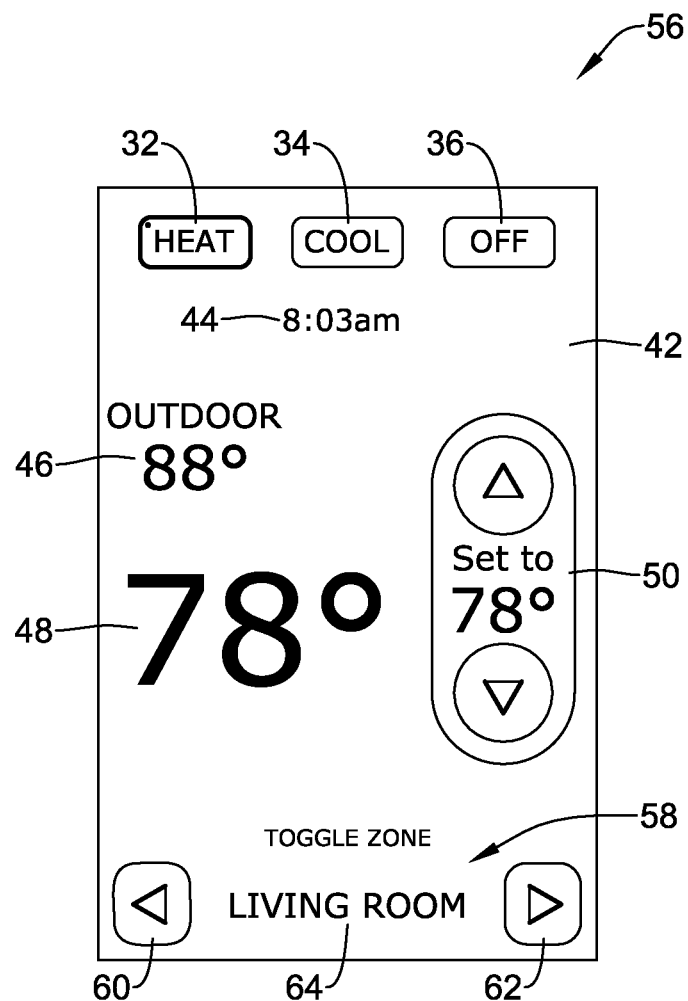
Figure 4B:
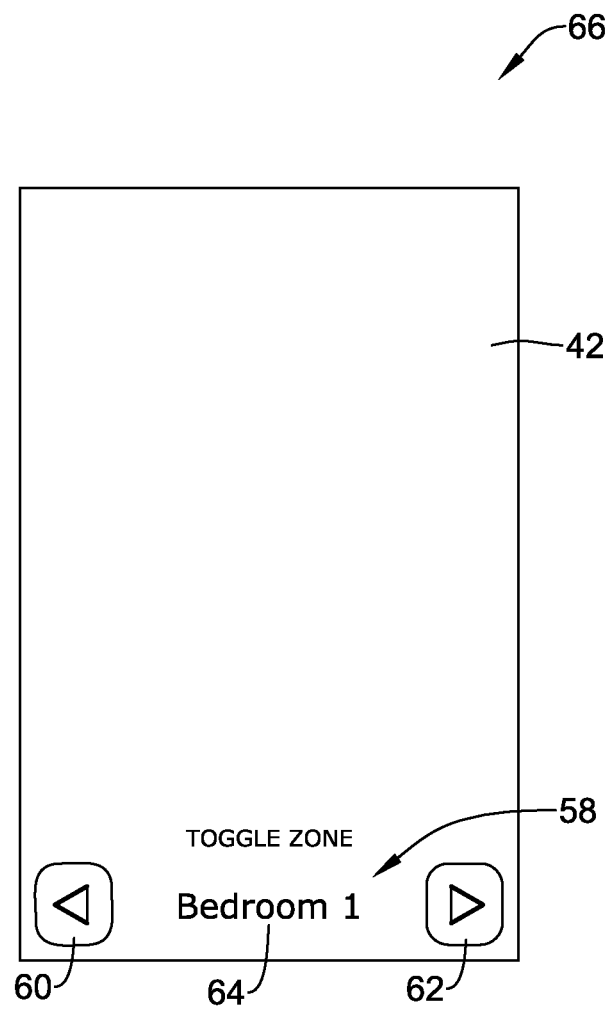

When the left directional arrow icon 60 or the right directional arrow icon 62 is touched, the touch screen display 42 may switch from screen 56 to screen 66, shown in FIG. 4B. As illustrated in screen 66, the HVAC operational status, such as, the current inside temperature 48, the current outside temperature 46, the current time 44, the current heat and/or cool set point 50, and the current operational status (e.g. heat 32, cool 34, and off 36) may be removed from screen 66, but this is not required. As illustrated, the room indicator 64 display may change from the "LIVING ROOM" zone to a "BEDROOM 1" zone. It is contemplated that the room indicator 64 may correspond to any number of rooms, such as, for example, "KITCHEN", "DEN", "FAMILY ROOM", "BASEMENT", "BEDROOM 2", "BEDROOM 3", "BEDROOM 4", "BATHROOM", "DINING ROOM", "STUDY", or any other suitable zone, as desired. Multiple touches of the icons 60 and/or 62 may cause the room indicator 64 to display a third zone, a fourth zone, a fifth zone, and so on to scroll or toggle through the available zones.

Figure 4C:
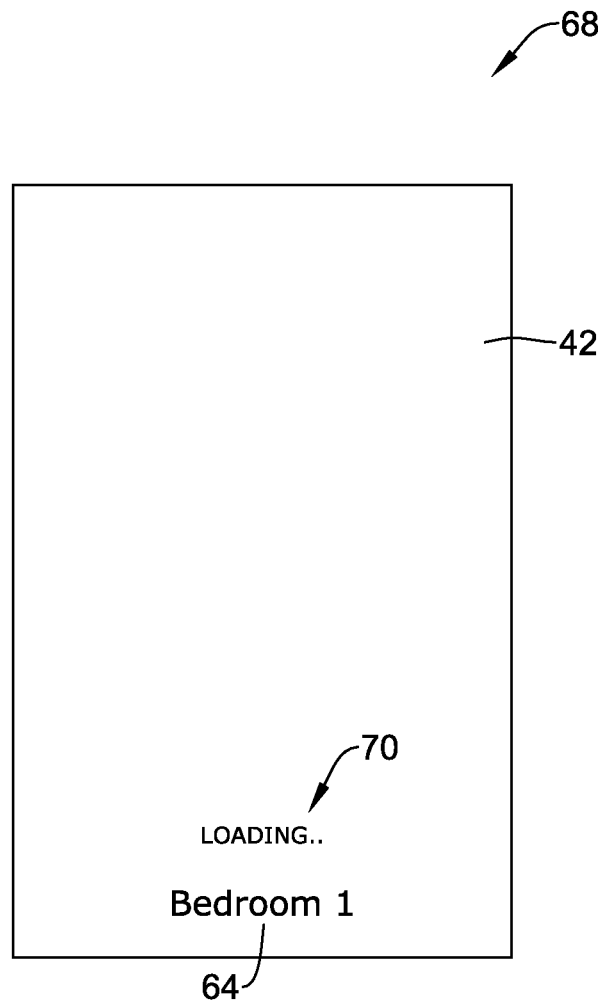
Figure 4D:
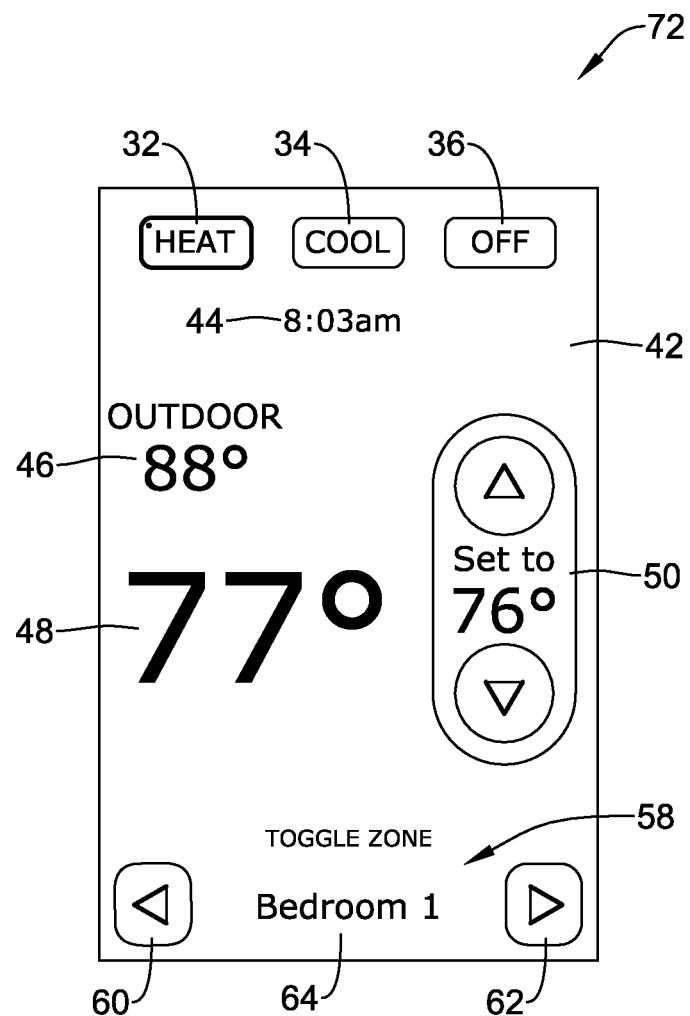

In some cases, if the touch screen display 42 does not register a touch within a predetermined time period, the zone identified by room indicator 64 may be selected and the HVAC remote controller 24 may display screen 68 on the touch screen display as shown in FIG. 4C. In one example, the predetermined time may be about 1.5 seconds. However, it is contemplated that any predetermined time may be used, such as, for example, one second, two seconds, three seconds, four seconds, five seconds, ten seconds, or any other amount of time, as desired. Additionally or alternatively, screen 66 may include an icon (not shown) that the user may touch to indicate that the user is done. For example, screen 66 may include a "Done" icon and, in some cases, a "Cancel" icon to cancel the change, if desired.

As illustrated, screen 68 shown in FIG. 4C may display a loading indicator 70, or activity indicator, along with the room indicator 64, indicating that the currently selected zone is being loaded onto the HVAC remote controller 24. In some cases, loading indicator 70 may include the text "loading" and/or may include a status progress bar, and/or may include any other suitable mechanism for indicating that the currently selected zone is being loaded. In some cases, the loading indicator 70 and/or progress bar may indicate to a user that the HVAC remote controller 24 is busy, such as, for example, attempting to establish a wireless communication with the HVAC controller 8. In the illustrative screen 68, "BEDROOM 1" is displayed indicating that the HVAC remote controller 24 is switching to the BEDROOM 1 zone. When screen 68 is displayed, the HVAC remote controller 24 is attempting to wirelessly communicate with the HVAC controller 8 of the selected zone, which, in some cases, may be through RF or other signals. If parameters related to the desired zone are successfully loaded, screen 72, shown in FIG. 4D, may be displayed on the touch screen display 42.

In some cases, the HVAC remote controller 24 may provide for a predetermined loading period of time. In this case, if the HVAC remote controller 24 successfully establishes communication and successfully loads the parameters for the selected zone, screen 72 may be displayed. If, however, communication cannot be established between the HVAC remote controller 24 and the HVAC controller 8 of the selected zone within the predetermined loading period of time, screen 180 of FIG. 14C may be displayed. In some cases, the predetermined loading period of time may be on the order of seconds or minutes, depending on the installation and HVAC controller. In one example case, the predetermined loading period of time may be about 7 second. Additionally, in some cases, any hold and/or auto information, which will be discussed below, may be removed from the touch screen display 42 when the new zone is loading on the HVAC remote controller 24, if desired. Screen 72 of FIG. 4D may be similar to screen 56 shown in FIG. 4A, except that the room indicator 64 may correspond to a different zone of the building or other structure. For example, "LIVING ROOM" was displayed on screen 56 and "BEDROOM 1" is displayed on screen 72.

In some cases, the HVAC remote controller 24 may automatically select a corresponding zone, as the HVAC remote controller 24 is carried through the building or other structure. For example, the HVAC remote controller 24 may include a signal strength indicator that measures the signal strength from each of the identified HVAC zone controllers 8. The HVAC remote controller 24 may then automatically select the HVAC zone controller 8 that produces the highest signal strength. Alternatively, or in addition, each zone may include a zone ID device that, when the HVAC remote controller 24 is in the proximity of a zone ID device, the zone ID device informs the HVAC remote controller 24 which zone that the HVAC remote controller 24 is currently in. The HVAC remote controller 24 may then automatically select the appropriate zone.

Once the parameters for the currently selected zone have been loaded, the user may alter the settings for the zone via the user interface of the HVAC remote control unit. The one or more changed parameters and/or settings may then be sent to the zoned HVAC system via the wireless interface, wherein the zoned HVAC system may subsequently operate in accordance with the one or more changed parameters and/or settings in the selected zone. In some instances, the parameters and/or settings may be loaded from and sent to one or more wall mounted thermostats, if desired. The HVAC remote control unit may be configured to automatically detect and establish communication with each of two or more wall mounted thermostats either simultaneously, sequentially or by user selection, if desired.

In some instances, the HVAC remote control unit may be configured to dynamically change its behavior based on whether it detects a non-zoned or a zoned HVAC system. For example, if a non-zoned HVAC system is detected, the HVAC remote control unit may not display HVAC zone navigation area 58, and may control the HVAC system in accordance with an algorithm for a non-zoned HVAC system. Likewise, if a zoned HVAC system is detected, the HVAC remote control unit may display HVAC zone navigation area 58, and may control the HVAC system in accordance with an algorithm for a zoned HVAC system. In some cases, and for zoned HVAC systems, the behavior of the HVAC remote control unit may automatically change depending on the number of wireless thermostats that are detected. For example, the HVAC remote control unit may allow a user to navigate to each of the detected zones via HVAC zone navigation area 58, and may use an appropriate control algorithm (e.g. 2 zone algorithm, 3 zone algorithm, 4 zone algorithm, etc.) depending on the number of detected zones.

Figure 5:
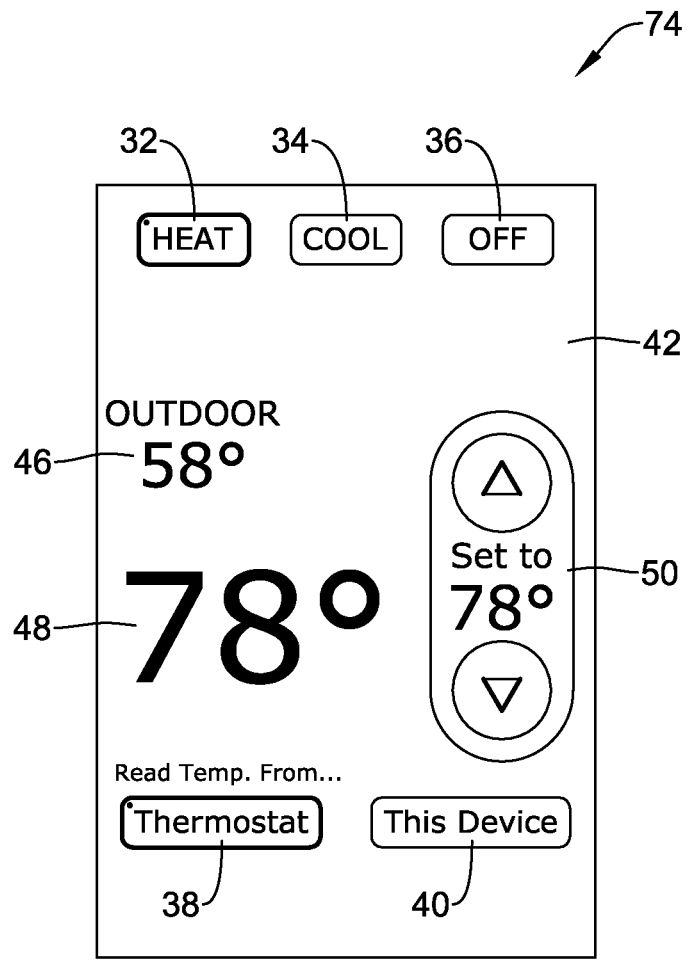

FIG. 5 is a pictorial view showing a screen 74 that may be displayed on the illustrative HVAC remote controller 24 touch screen display 42. Screen 74 may be displayed as a home screen for the HVAC remote controller 24 when, for example, the HVAC remote controller 24 is operatively coupled to a non-programmable HVAC controller in a non-zoned HVAC system. As illustrated, screen 74 may provide HVAC operational status, such as, the current inside temperature 48, the current outside temperature 46, the current heat and/or cool set point 50, the current operational status of the HVAC controller (e.g. heat 32, cool 34, and off 36), and the device whose temperature sensor is currently controlling the HVAC controller (e.g. thermostat 38, this device 40). As described above, screen 74 may include a bold outline and/or dot to indicate the current operational status and/or device controlling the comfort level of the building. In the illustrative diagram, icon 32 has a bold outline and dot indicating that the HVAC controller 8 is currently in heat mode, and icon 38 has a bold outline and dot indicating that the temperature sensor of the HVAC controller 8 (e.g. Thermostat) is currently being used to control the comfort level of the building or other structure. Although not expressly shown, it is contemplated that screen 74 may include the current time and/or other parameters if the HVAC controller 8 or other device in wireless communication with the HVAC remote controller 24 supports such parameters.

Figure 6A:
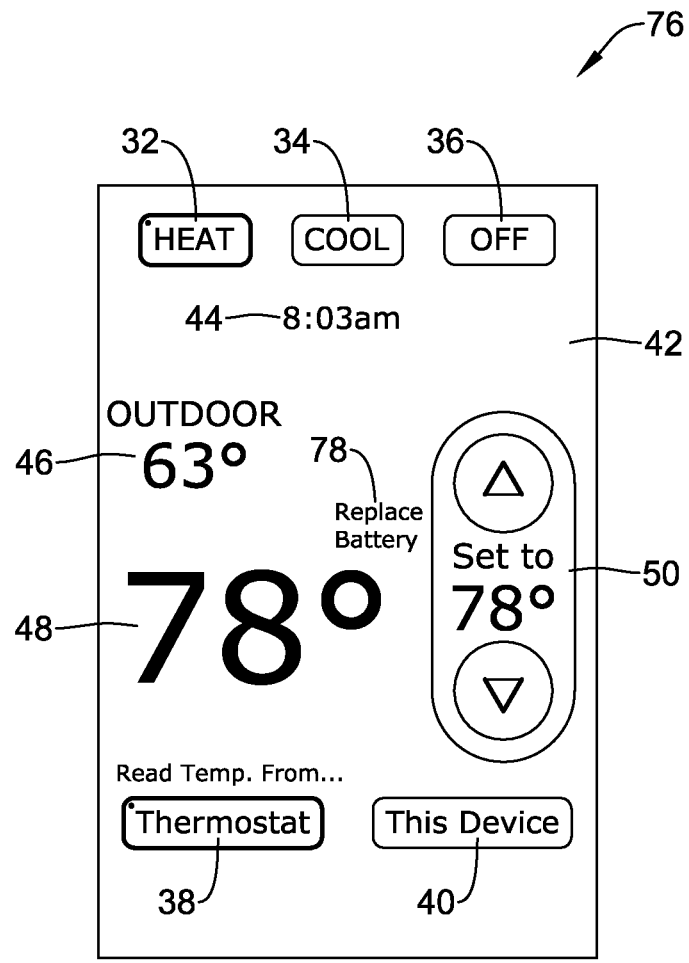

FIG. 6A is a pictorial view showing an illustrative screen 76 that may be displayed on the illustrative HVAC remote controller touch screen display 42 when the HVAC remote controller 24 detects a low battery condition. In the illustrative embodiment, the HVAC remote controller 24 is a portable hand held device, and may be powered by one or more local power sources such as batteries. If the control module 12 of the HVAC remote controller 10 detects that the battery is getting low, such as, for example, providing a voltage that is below a threshold voltage, the HVAC controller 10 may display screen 76. As illustrated, screen 76 may be similar to screens discussed previously with the addition of a low battery indicator 78. In some cases, the low battery indicator 78 may be displayed when the battery level is below a low battery threshold level. In some cases, the low battery threshold level may be 10%, 15%, 20%, 25%, 30%, or 50% of the battery life remaining. However, it is contemplated that any suitable low battery threshold may be used, as desired. As illustrated, the low battery indicator 78 displays the text "Replace Battery" on the touch screen display 42. However, it is contemplated that a battery icon may be displayed or any other suitable low battery indicator may be displayed, as desired. In some cases, the low battery indicator 78 may flash on and off at a rate, such as, for example, a rate of one second.

Figure 6B:
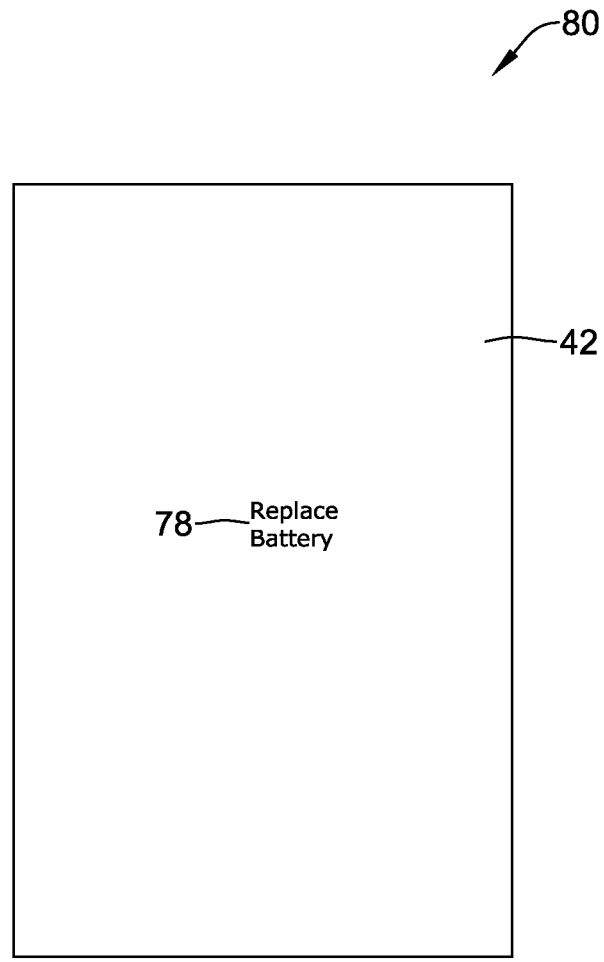

In some cases, when the battery level detected by the HVAC remote controller 24 decreases to or past a critical low battery threshold level, screen 80 of FIG. 6B may be displayed on the touch screen display 42 of the HVAC remote controller 24. In the illustrative screen 80, all (or at least some) of the displayed parameters and information may be removed from the touch screen display with the exception of the low battery indicator 78. In some cases, the low batter indicator 78 may flash, but this is not required. In some cases, the critical low battery threshold may be 2%, 5%, 7%, 10% of remaining battery life, or any other suitable remaining battery life less than the low battery threshold discussed with reference to FIG. 6A, as desired.

Figure 7A:
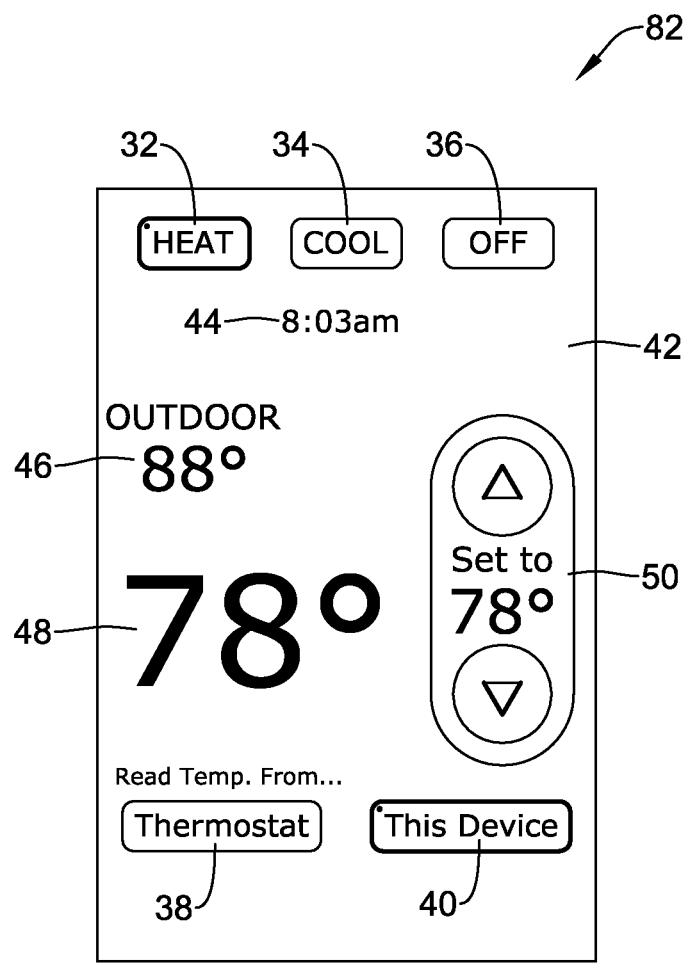

FIGS. 7A-7D are pictorial views showing illustrative screens that may be displayed on the HVAC remote controller touch screen display 42 to change which temperature sensor is currently being used to control the comfort level of the building or other structure. Referring to FIG. 7A, the screen 82 displayed on the touch screen display 42 may be similar to home screens discussed previously, such as, for example, screen 30 of FIG. 3A. As illustrated, screen 82 includes an icon 38 for indicating when a temperature sensor of the HVAC controller 8 is controlling the comfort level of the building, and an icon 40 for indicating when the temperature sensor of the HVAC remote controller 14 (shown in FIG. 1) is controlling the comfort level of the building. To indicate which device is currently controlling, the icon corresponding to the controlling device may include a bold outline, as illustrated by bold outline around icon 40, and/or a dot within the icon, or may include a different border, may be highlighted, grayed out or otherwise visually indicated, as desired. In some cases, a user may touch the area of the touch screen display 42 corresponding to icon 38 or 40 to manually select and switch which device's temperature sensor is controlling the comfort level of the building.

In some cases, the HVAC controller 8 and/or HVAC remote controller 24 may include a control algorithm that automatically switches control from one device to the other. For example, if the temperature sensed by the temperature sensor of the HVAC remote controller 24 differs from the temperature sensor of the HVAC controller 8 by more than a threshold amount and/or for a threshold period of time, control may automatically switch from the HVAC remote controller 24 to the HVAC controller 8. Such a temperature differential may occur when, for example, the user is holding the HVAC remote controller 24 in his/her hand, when the HVAC remote controller 24 is set down next to an open door or window, set down outside, and/or set down in direct sun light. This is just one examples of when control may automatically switch from the HVAC remote controller 24 to the HVAC controller 8. Others are also contemplated, including those disclosed in U.S. patent application Ser. No. 11/948,971 filed on Nov. 30, 2007, and entitled "BUILDING CONTROL SYSTEM WITH REMOTE CONTROL UNIT AND METHODS OF OPERATION", which is incorporated herein by reference.

Figure 7B:
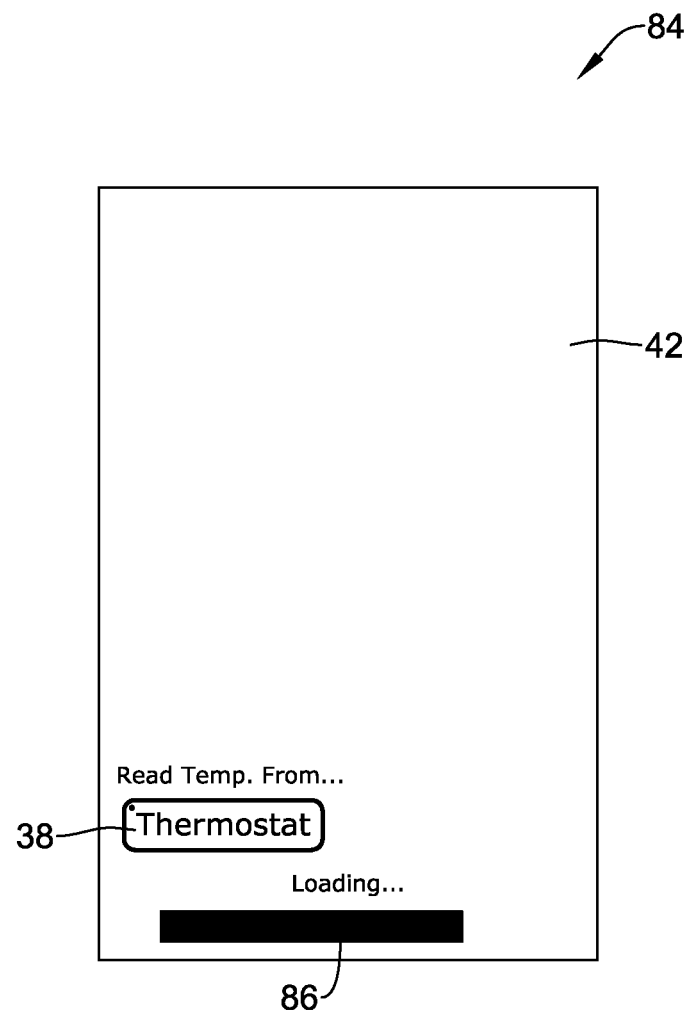

As illustrated in FIG. 7A by the bold outline around icon 40 and the dot within icon 40, the temperature sensor of the HVAC remote controller 24 is currently being used to control the comfort level of the building or other structure. When a user touches the touch screen display 42 adjacent to icon 38, the temperature control may be switched to use the temperature sensor of the HVAC controller 8. In one example, after the user has touched the touch screen display 42 to manually change control, and as shown in FIG. 7B, screen 84 may be displayed. Screen 84 may show a loading progress bar 86 and icon 38, indicating that control is being switched to the HVAC controller 8. A data exchange between the HVAC controller 12 and the HVAC remote controller 24 may take place during this time period.

In some cases, it may take a period of time for the HVAC remote controller 24 to wirelessly communicate with the HVAC controller 8 and upload and/or download updated data. The updated data can include any suitable data including updated set points, updated sensed temperature readings, updated sensed humidity readings, updated system status information, updated operational data and/or other data, as desired. In some cases, this may take up to 20 seconds or more. In other cases, shorter transmit times are contemplated, including nearly instantaneously.

Figure 7C:
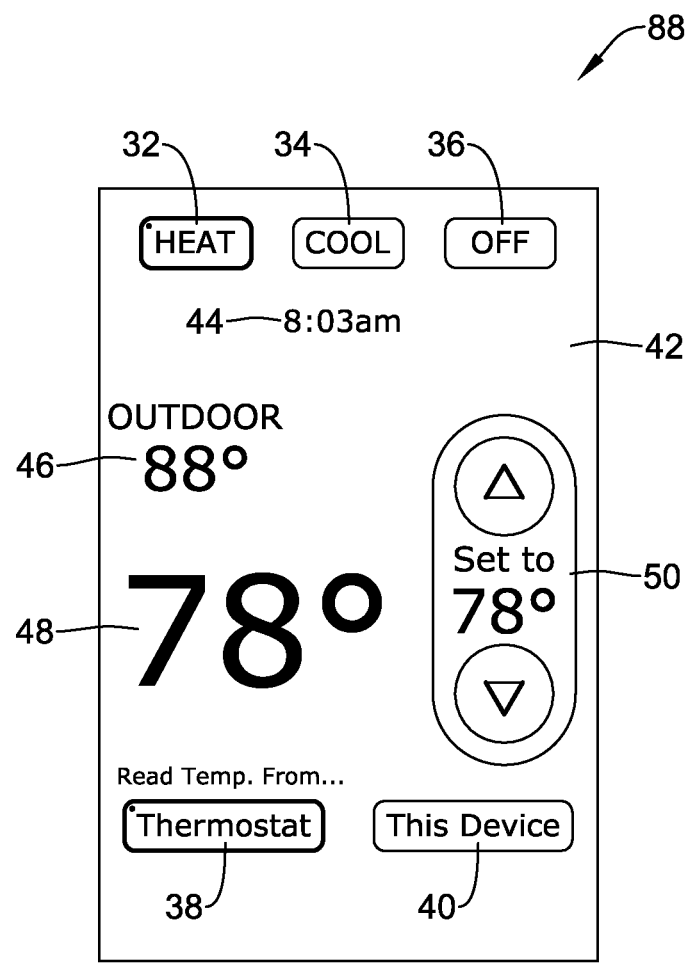

As indicated in FIG. 7C, when the HVAC remote controller 24 has uploaded the operational information from the HVAC controller 8, the touch screen display 42 may display a screen 88, which is similar to screen 82 shown in FIG. 7A, but with icon 38 indicating that the temperature sensor of the HVAC controller 8 (e.g. thermostat) is now controlling instead of the temperature sensor of the HVAC remote controller 24 (e.g. this device). Also, and in some cases, updated set point, sensed temperature, sensed humidity, system status and/or other data may also be displayed, if desired.

Figure 7D:
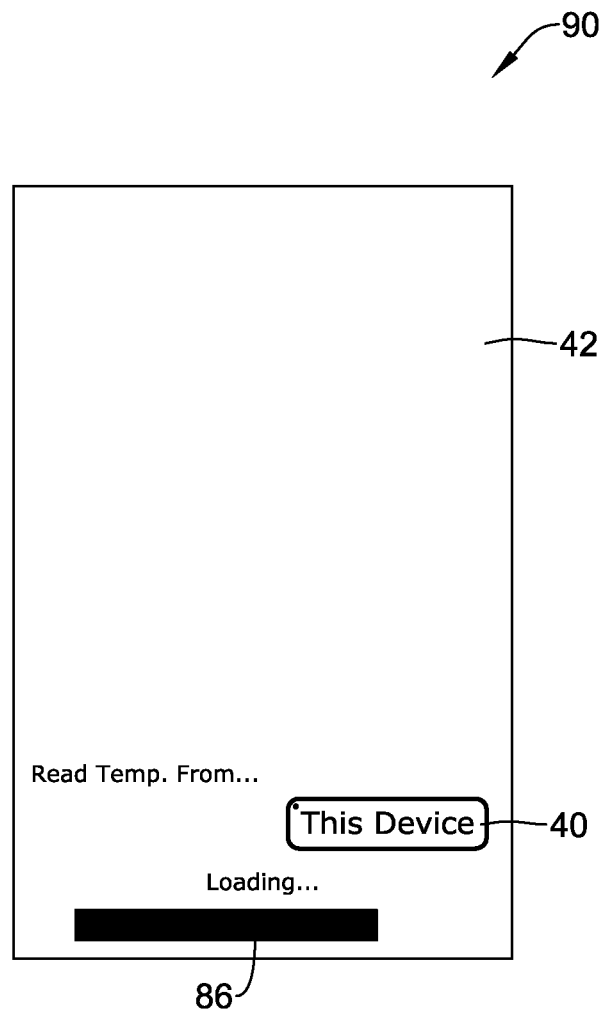

In some embodiments, when the user determines that control should be switched back to the temperature sensor of the HVAC remote controller 24, the user may touch the touch screen icon 40 to switch control back to the temperature sensor of the HVAC remote controller 24. When switching control back to the temperature sensor of the HVAC remote controller 24, and as shown in FIG. 7D, a progress bar 86 and icon 40 may be displayed on the screen 90, in a manner similar to that described above.

Figure 14A:
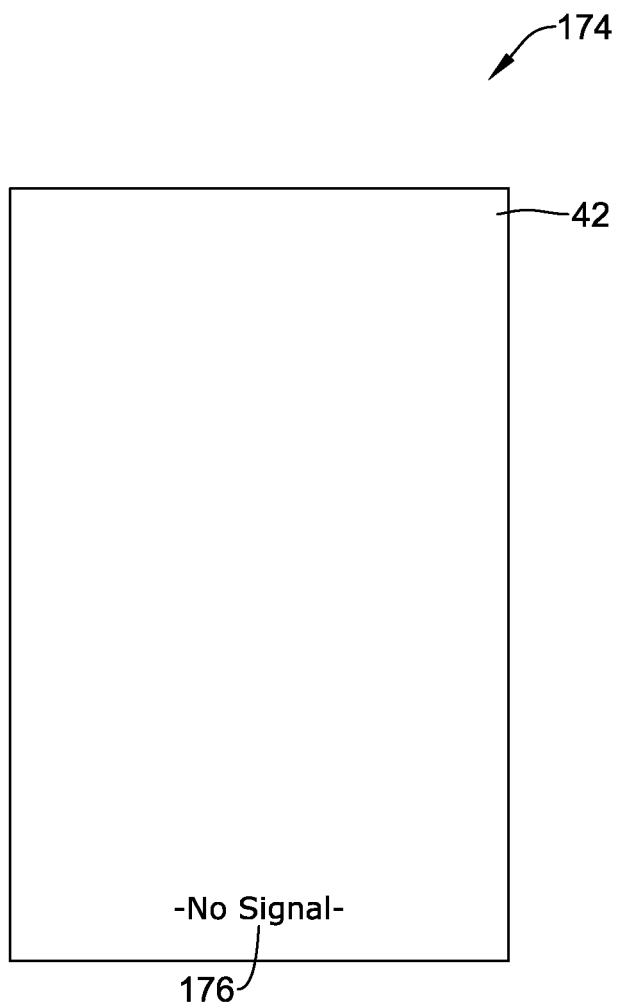

In some cases, the HVAC remote controller 24 may include a predetermined timeout period where, if the HVAC remote controller 24 is unable to establish wireless communication with a HVAC controller 8, the HVAC remote controller 24 may display a "No Signal" screen, similar to screen 174 of FIG. 14A. In some cases, the predetermined timeout period may be 5, 10, 20, 30, 60 seconds, or any other suitable time period, as desired. In one example, the predetermined timeout period may be about 7 seconds. In some cases, when changing between screens 82, 84, 86, and 90 or while attempting to establish wireless communication, the touch screen display 42 may not register any touches by a user, but this is not required.

FIGS. 8A-8E are pictorial views showing illustrative screens that may be displayed on the illustrative HVAC remote controller touch screen display 42 to change the heat and/or cool set point 50 and/or to program a temperature hold. In some embodiment, such as, for example, a non-programmable thermostat, the user may not be able to initiate a temperature hold with the HVAC remote controller 24.

Figure 8A:
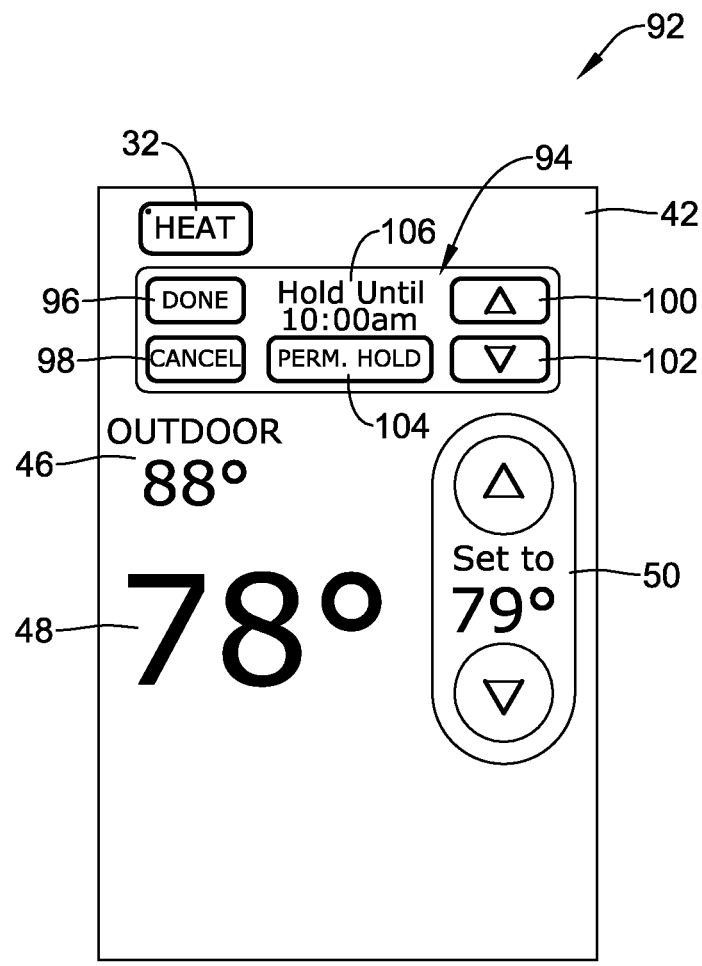

For those HVAC controllers that do allow hold operations, and referring to FIG. 8A, touch screen display 42 may display screen 92 when the touch screen display 42 detects a touch corresponding to the up or down arrow of the current heat and/or cool set point 50 in, for example, a home screen such as home screen 30 (see FIG. 3A). As illustrated, the user may adjust the heat and/or cool set point 50 by touching the up arrow and/or down arrow on the touch screen display 42. As illustrated, the set point may increase or decrease by one degree when a touch is detected. For example, the screen 92 displays a set point temperature of 79 degrees, which is one degree higher than, for example, the set point of 78 degrees shown for the home screen 30 in FIG. 3A. In this example, the user may have touched the touch screen display 42 adjacent to the up arrow of the current heat and/or cool set point 50 one time.

As illustrated, screen 92 may provide a hold display region 94 when the set point is adjusted. In some cases, a temperature hold may be initiated by a user to maintain a desired hold temperature set point for a period of time, regardless of the current set point of a previously programmed temperature schedule. As shown, the hold display region 94 may include a border defining the region, but this is not required. The illustrative hold display region 94 may include a "hold until" display with a time indicating the time at which the hold temperature should end. For example, as illustrated, the hold time may end at 10:00 AM. The user may be able to adjust the hold end time by touching the touch screen display 42 adjacent to icon 100, which may include an up arrow for increasing the time, or by touching the touch screen display 42 adjacent to icon 102, which may be a down arrow for decreasing the time. If, for example, the user touches the touch screen display 42 adjacent to icon 100, screen 108 shown in FIG. 8B may be displayed. As illustrated, the hold until time has changed from 10:00 AM to 10:15 AM. The user may continue to adjust the hold time until a desired hold end time is displayed. As illustrated, the hold end time may be changed in 15 minute increments, however, this is merely illustrative and any time increments may be used, as desired.

Figure 8B:
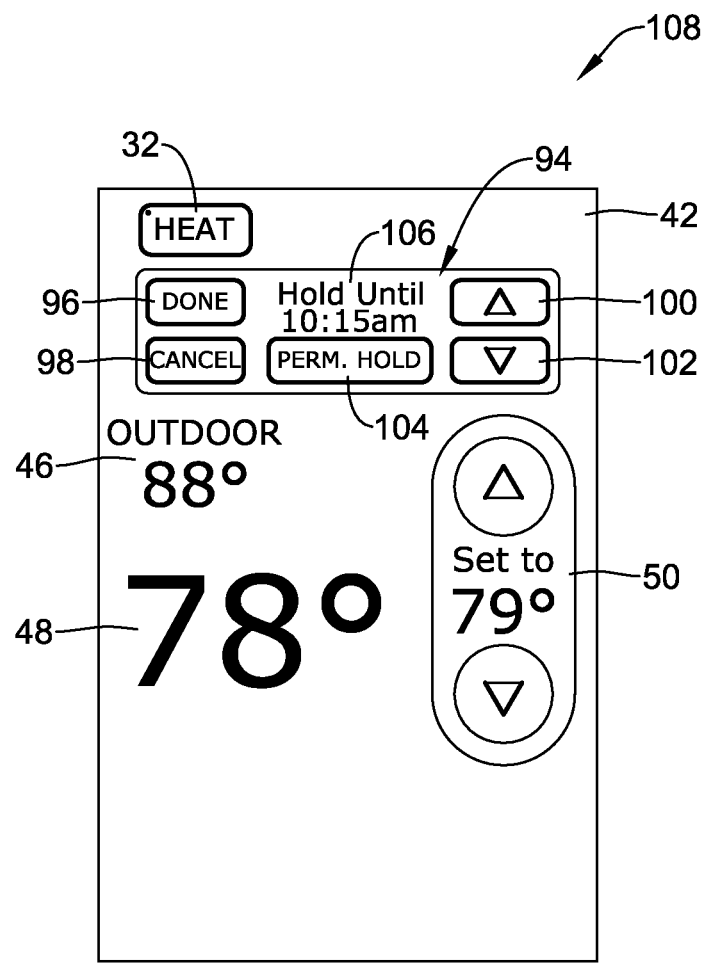

Referring to both screen 92 and 108 of FIGS. 8A and 8B, respectively, icons 96 and 98 may be provided in the hold display region 94. Icon 96 may be a done icon that may set or program the hold operation in the HVAC remote controller 8. In some cases, the hold operation may be properly setup when the user touches the done icon 96, and/or when screens 92 or 108 timeout when touch screen display 42 does not detect a touch within a period of time. In some cases, the period of time for the timeout may be on the order of seconds, such as, for example, three, four, five, ten, or more seconds, or on the order of minutes. However, it is contemplated that any other suitable timeout may be used, as desired. In some cases, if a hold operation is properly setup, the hold operation may be communicated to a corresponding HVAC controller 8, which may then control the corresponding HVAC components 2 accordingly. Icon 98 may be used to cancel the hold operation request and return to, for example, the home screen 30 of FIG. 3A.

Figure 8C:
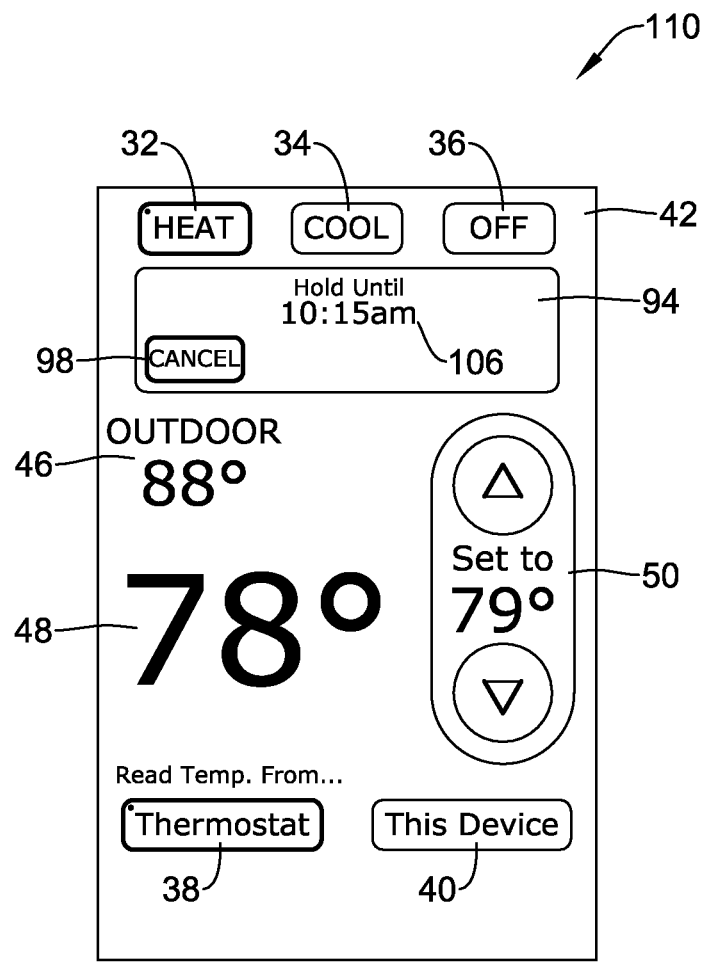

If a hold operation has been properly setup, the screen 110 of FIG. 8C may be displayed. In the illustrative embodiment, screen 110 may be similar to screens 92 and 108 with the difference of having icons 96, 100, 102, and 104 removed from the touch screen display 42. However, in some cases, if a user desires to see the hold options provided by icons 96, 100, 102, and 104, the HVAC remote controller 24 may be configured to display the hold options when a touch is sensed by the touch screen display 42. In some cases, the detected touch may need to be in the hold display region 94, but this is not required.

The temperature hold operation may expire when the HVAC remote controller 24 and/or HVAC controller 8 determines that the current time is the same as the "hold until" time. In this case, when the hold operation expires, the HVAC remote controller 24 may return to its previously programmed settings and/or schedule. In some cases, this may cause the touch screen display 42 to display the appropriate home screen, such as, for example, home screen 30 of FIG. 3A.

In some cases, and referring to FIGS. 8A and 8B, an icon 104 corresponding to a permanent hold may be provided. In some cases, a touch of icon 104 may set a permanent temperature hold of the HVAC remote controller 24 and/or HVAC controller 8. In some cases, a permanent hold may set the heat and/or cool set point 50 to a set temperature until the user manually cancels or terminates the permanent hold operation. In this case, the permanent temperature hold may not include the time element (e.g. an end time) of the previously described temporary hold operation.

Figure 8D:
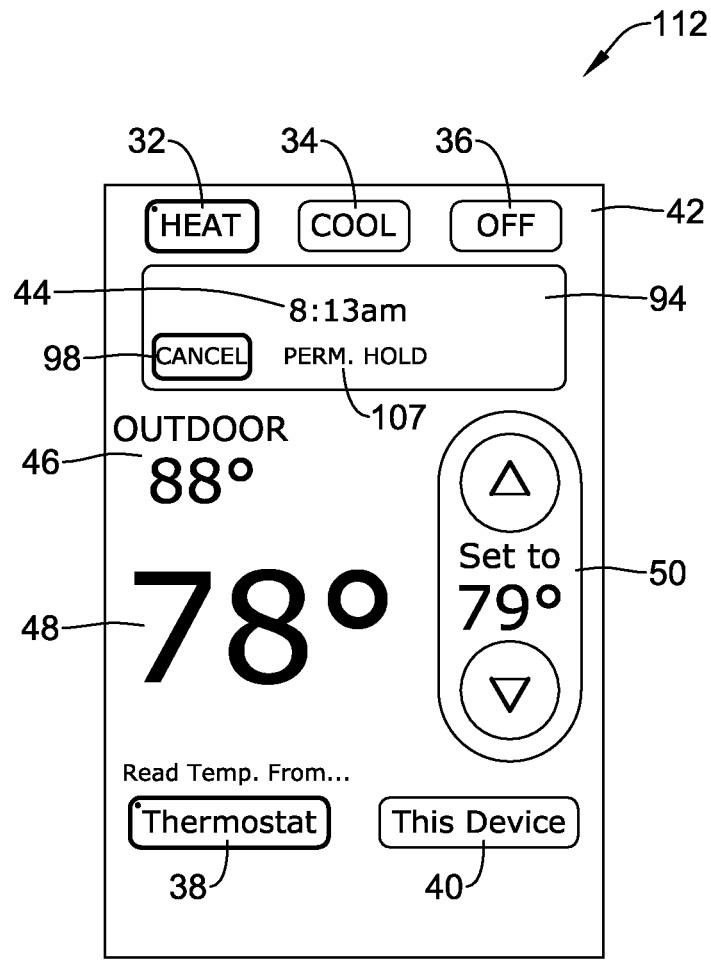
Figure 8E:
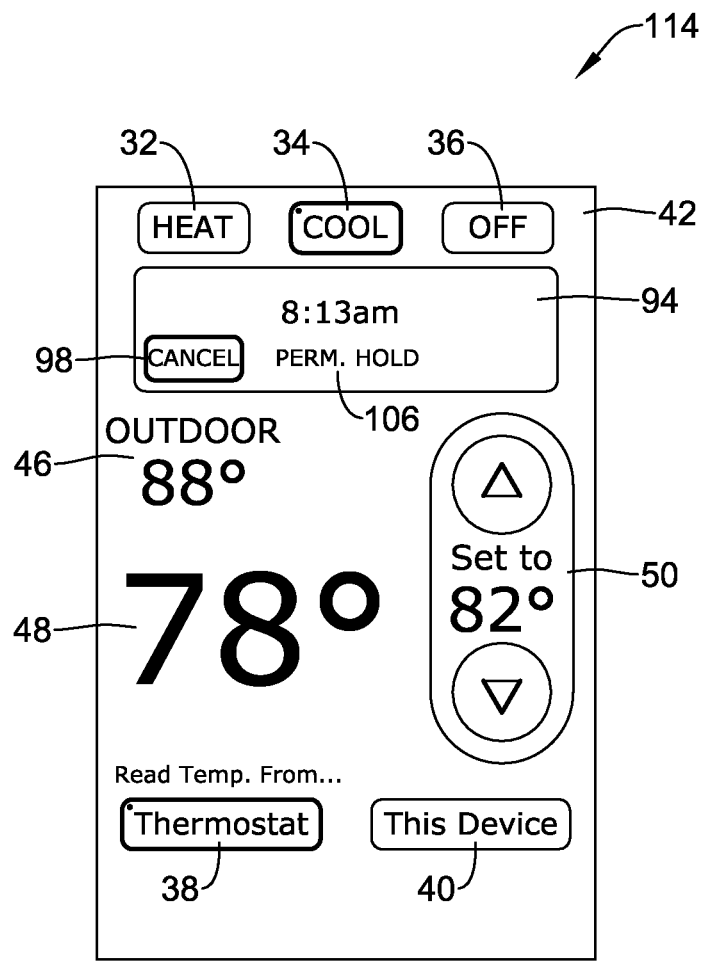

When a touch is detected on the touch screen display 42 corresponding to icon 104 (permanent hold button on screens 92 and 108), the HVAC remote controller 24 may display touch screen 112, shown in FIG. 8D. As illustrated, hold display region 94 displays icon 98 corresponding to a cancel button. A touch of icon 98 may cancel the permanent hold operation. Also, instead of the "hold until" time 106 as discussed above, the current time 44 may be displayed along with a permanent hold indicator 107 in the hold display region 94. In the illustrative diagram, the permanent hold indicator 107 includes the text "PERM. HOLD". However, it is contemplated that any suitable indicator may be used, as desired.

In some illustrative embodiments, when the user touches one or more icons shown in screen 112, the user may modify the current permanent hold set points and/or other options. In order to exit the permanent hold, the user may touch the touch screen display 42 adjacent to the "CANCEL" icon 98. In some cases, this ends the permanent hold operation and returns the touch screen display 42 to a home screen, such as, for example, home screen 30 of FIG. 3A.

During the permanent hold operation, if the user desires to switch the operational status or mode of the HVAC controller from heat to cool (or visa-versa), the user may touch the touch screen display 42 adjacent to the cool icon 34. When the user switches the operational status of the HVAC controller, the HVAC controller may switch its operational status to the cool mode, indicated by the bold outlined icon 34 and dot within icon 34 shown in screen 114 of FIG. 8E, but may retain the permanent hold set point and/or other settings. However, it is contemplated that the permanent hold may be canceled and/or terminated when the user changes the operational status of the HVAC controller 8, if desired.

FIGS. 9A-9E are pictorial views showing illustrative screens that may be displayed on the touch screen display 42 of an illustrative HVAC remote controller 24, including a screen lock indicator. In some embodiment, the illustrative HVAC remote controller 24 can be configured to lock and unlock the touch screen display 42 (or portions thereof) to help reduce the chance of accidental changes to the operation and/or settings of the HVAC remote controller 24 and/or HVAC controller 8. In some instances, the HVAC remote controller 24 may include a setup menu routine, as will be discussed below with reference to FIGS. 15D-15G, which may include an option to enable or disable such a screen lock function.

Figure 9A:
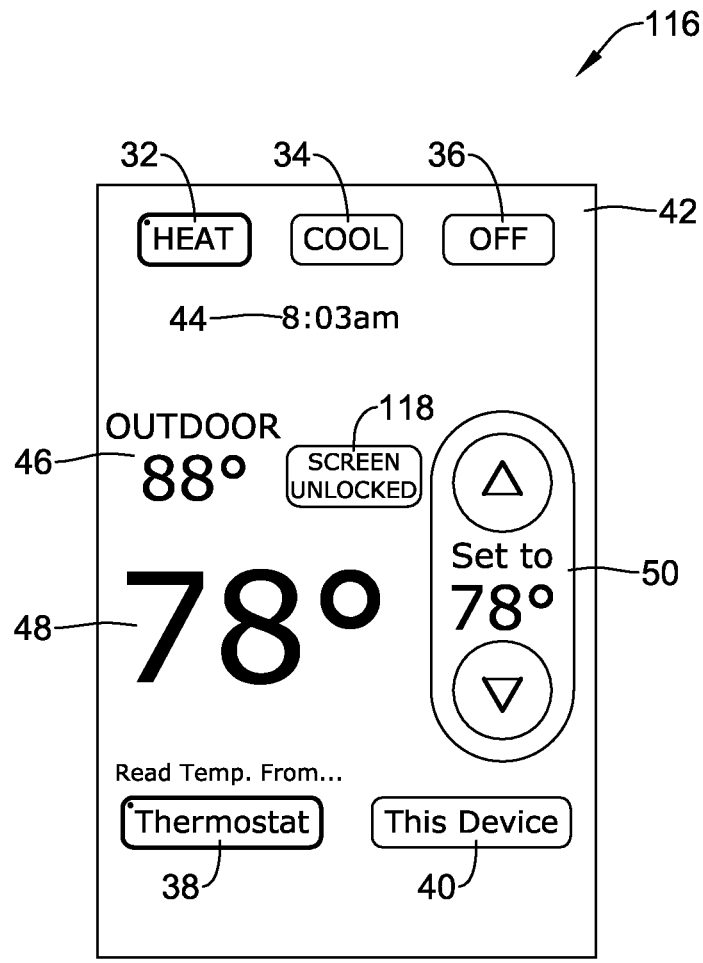

As illustrated in FIG. 9A, screen 116 may include the current inside temperature 48, the current outside temperature 46, the current time 44, the current heat and/or cool set point 50, the current operational status of the HVAC controller (e.g. heat 32, cool 34, and off 36), and the current device used for controlling the temperature of the HVAC comfort control system (e.g. HVAC controller icon 38, or this device icon 40). In addition, in the illustrative embodiment, screen 116 may include an icon 118 indicating that the screen is currently unlocked. In the illustrative example, icon 118 includes the text "SCREEN UNLOCK". However, it is contemplated that any suitable icon or indicator that indicates that the screen is currently unlocked may be used, such as, for example, a graphical image of a lock in the unlocked position. To lock the touch screen display 42, a user may touch icon 118. In some cases, the HVAC remote controller 24 may be configured to require continuous touching of the icon 118 for a period of time, such as, for example, 3 seconds to lock the display. In another case, the HVAC controller may be configured to lock the touch screen display upon detection of the user touching icon 118 and, in some cases, the HVAC controller 8 may wait a period of time before locking the touch screen display 42, such as, for example, one second, two seconds, three seconds, four seconds, five seconds, ten seconds, or any other suitable period of time, as desired.

Figure 9B:
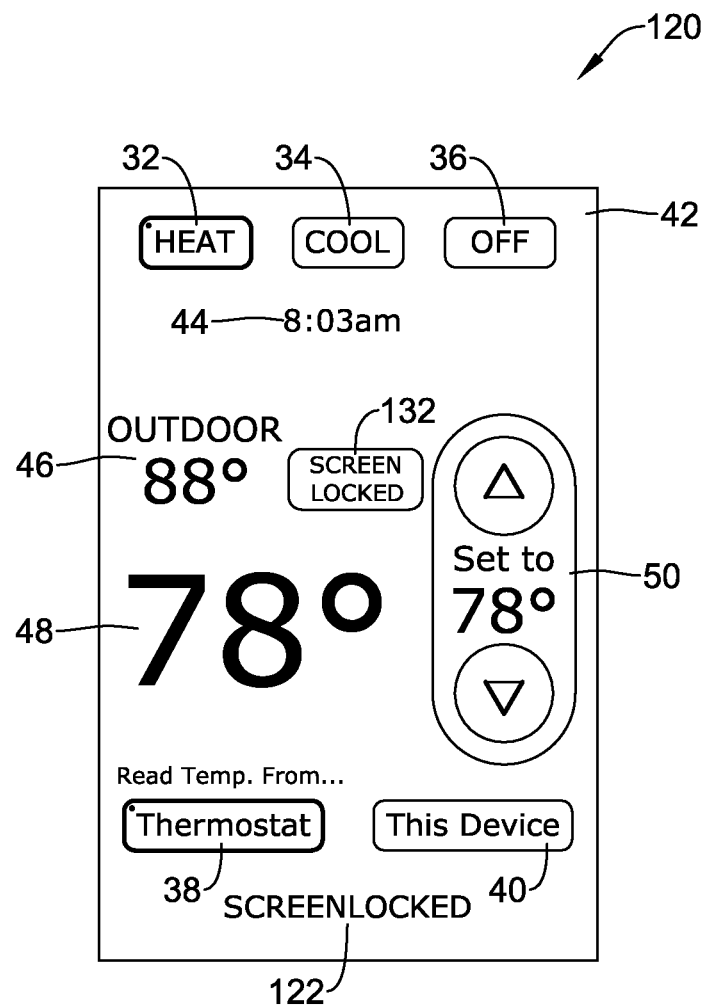

As illustrated in FIG. 9B, when the HVAC remote controller locks the touch screen display 42, icon 118 may be replaced by icon 132, which may include the text "SCREEN LOCKED" or some other suitable indicator, such as, for example, a graphical image of a lock in a locked position. At the same time that icon 132 appears, screen 120 may include the text "SCREEN LOCKED" 122 on a portion of the display, such as the lower portion of the display. In some cases, the illustrative screen 120 may only be displayed for a relatively short period of time, on the order of seconds, after the HVAC controller locks the screen. In some instances, screen 120 may only be shown on the touch screen display 42 when the HVAC remote controller 24 is configured to require a continuous touching for a period of time, but this is not required.

Figure 9C:
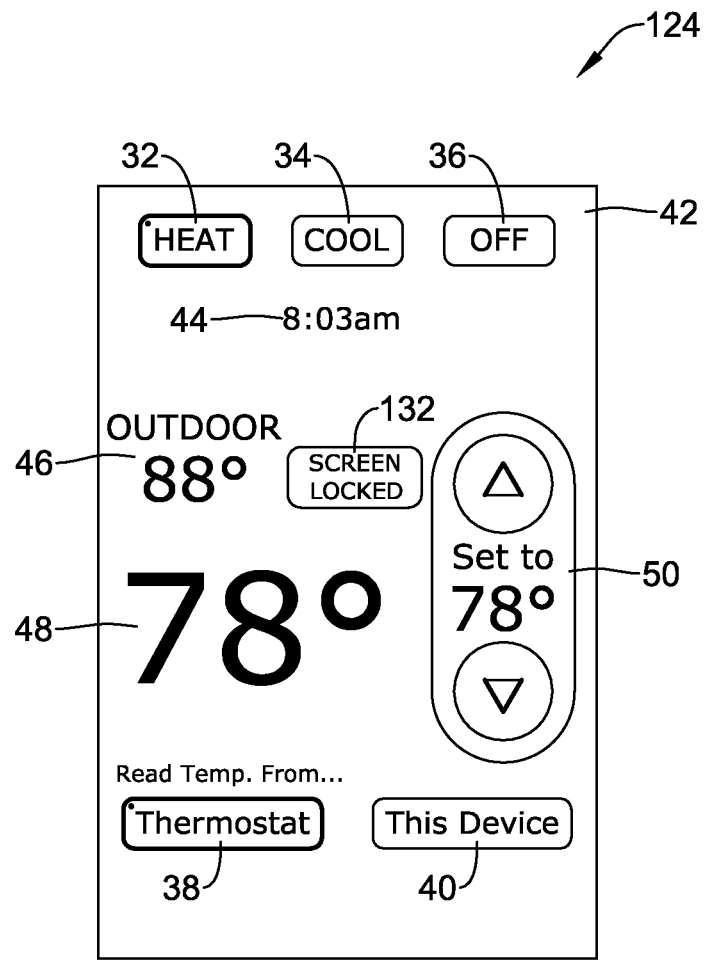

After displaying screen 120 of FIG. 9B for a period of time, touch screen display 42 may display screen 124 shown in FIG. 9C in the illustrative embodiment. Screen 124 is similar to screen 116 of FIG. 9A, except that screen unlocked icon 118 is replaced by screen locked icon 132. In the illustrative embodiment, when the touch screen display 42 is locked, the touch screen display 42 may not register any user touches, except to unlock the touch screen display 42. The screen may be unlocked by, for example, touching the screen locked icon 132 and, in some cases, holding the screen locked icon 132 for a period of time. In one example, the period of time may be 1, 2, 3, 4, or 5 seconds. However, any suitable period of time may be used, as desired. In another example, the screen may be unlocked by simultaneously touching two different regions of the display 42 for a period of time, such as two corners of the display. In yet another example, the display may include an interface that allows a user to enter a password, and the screen is unlocked once an appropriate password has been entered. These are just a few examples of how the screen can be unlocked.

In some cases, if any other region of touch screen display 42 is touched when the touch screen display 42 is locked, the screen locked icon 132 may flash once or a number of times at a rate. In some cases, the flashing rate may be one-half a second, one second, or any other flash rate, as desired. In some cases, the "SCREEN LOCKED" text of screen 120 may be displayed, and may also flash.

Figure 9D:
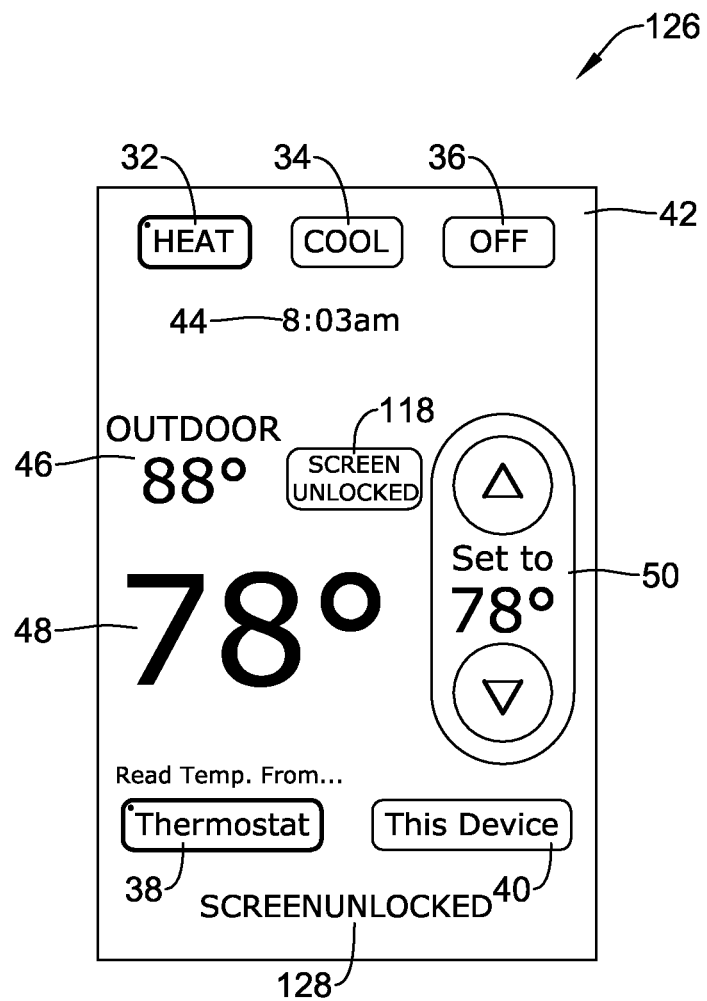
Figure 9E:
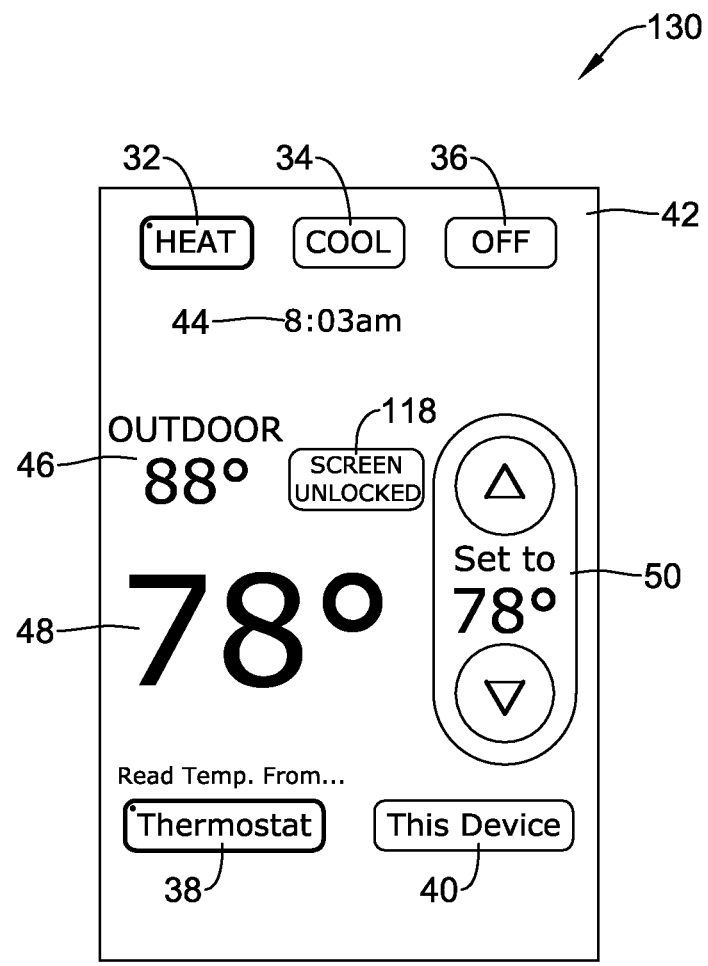

As illustrated in FIG. 9D showing screen 126, when the touch screen display 42 is unlocked, screen locked icon 132 may be replaced by screen unlocked icon 118. In some cases, "SCREEN UNLOCKED" may be provided on a portion of the touch screen display 42, such as a lower portion of the display 42. In some cases, the illustrative screen 126 may only be displayed for a relatively short period of time, on the order of seconds, when the HVAC remote controller 24 first unlocks the screen. Once the touch screen display 42 is unlocked, screen 130 shown in FIG. 9E may be displayed. In the illustrative embodiment, screen 130 may be the same as screen 116 of FIG. 9A, but this is not required in all embodiments.

Figure 10A:
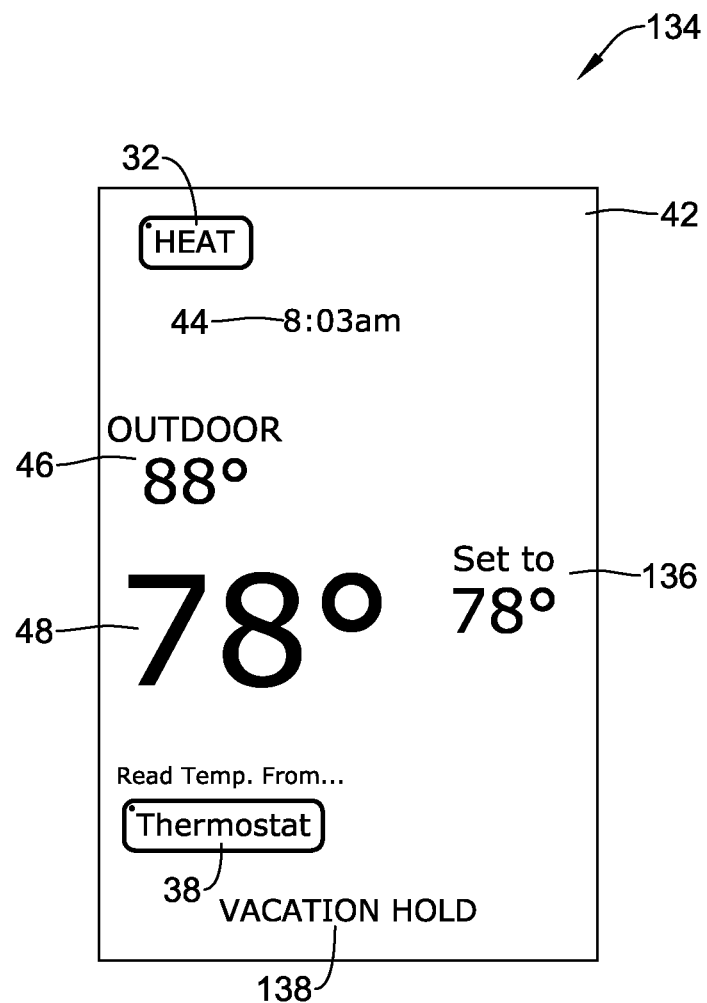
Figure 10B:
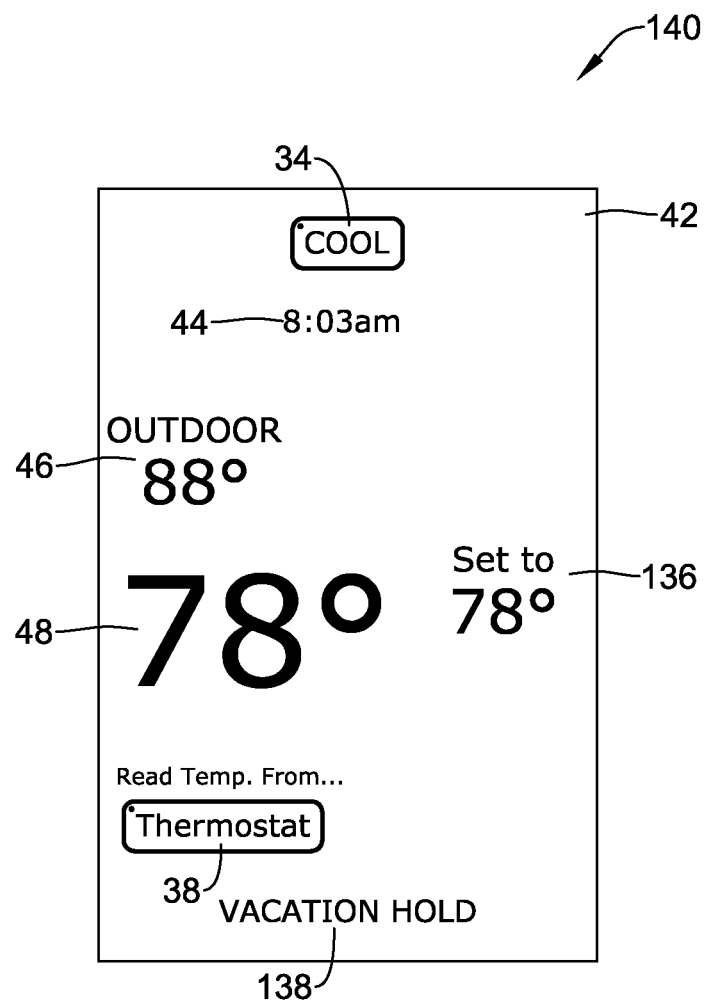

FIGS. 10A and 10B are pictorial views showing illustrative vacation hold screens 134 and 140 that may be displayed on the touch screen display 42 of an illustrative HVAC remote controller 24. FIG. 10A is an illustrative screen 134 that may be displayed when a vacation hold is set when the HVAC controller 8 is operating in heat mode. In some cases, the vacation hold may only be programmed through the HVAC controller 8, and the touch screen display 42 of the HVAC remote controller 24 only displays the status of the HVAC controller 8. However, it is contemplated that in some cases, the vacation hold may be programmed via the HVAC remote controller 24, similar to the temperature hold and/or permanent temperature hold operations discussed above.

As illustrated, screen 134 may show the current inside temperature 48, the current outside temperature 46, the current time 44, the current heat set point without up or down arrows 136, the current operational status of the HVAC controller (e.g. heat 32, cool 34, and off 36), and the current device used for controlling the temperature of the HVAC comfort control system. In the illustrative embodiment, only the current operational status icon is displayed (e.g. heat mode 32), and not the other unselected options (cool mode, off mode). For example, when the HVAC controller is in heat mode, only icon 32 is displayed, and when the HVAC controller is in cool mode, as shown in FIG. 10B, only icon 34 is displayed. However, this is merely illustrative and is not meant to be limiting in any manner. Similarly, screen 134 may only display the icon for the device that is currently controlling the temperature of the building, such as, for example, icon 38 when the temperature sensor of the HVAC controller 8 (e.g. thermostat) is controlling. A vacation indicator 138 may also be displayed, indicating that the HVAC controller 8 is in vacation hold mode. In one example, as illustrated, "VACATION HOLD" may be displayed on at least a portion of the touch screen display 42, such as a lower portion of the display 42. However, it is contemplated that any suitable indicator may be used at any suitable location, when provided. FIG. 10B shows an illustrative screen 140 that may be displayed when a vacation hold is set with the HVAC controller 8 in cool mode. Screen 140 is similar to screen 134 of FIG. 10A, except the cool icon 34 is shown instead of heat icon 32.

Figure 11A:
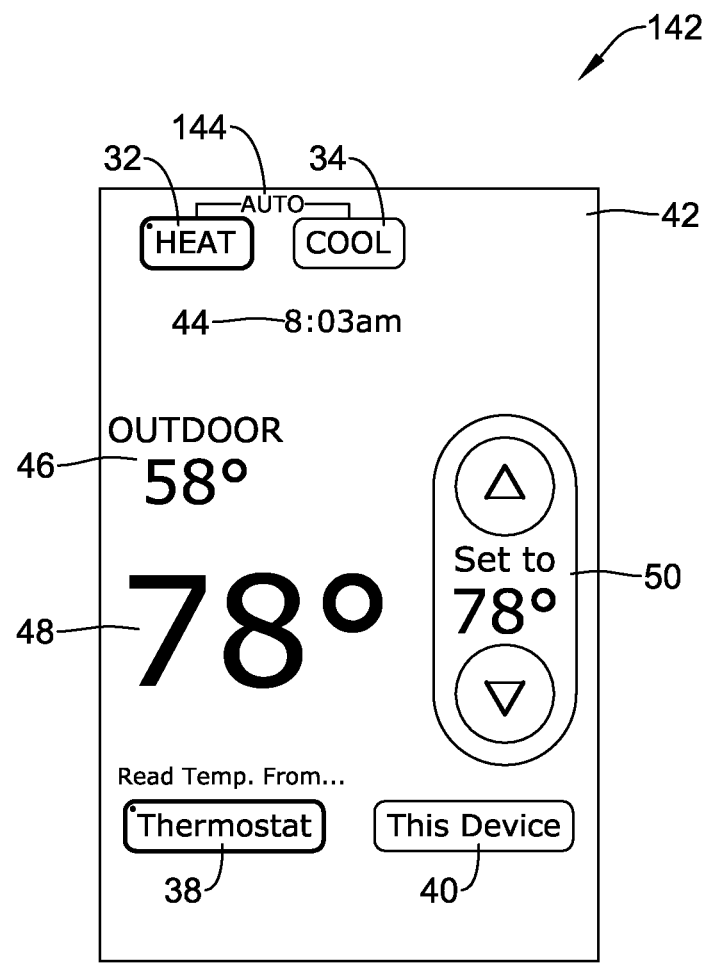
Figure 11B:
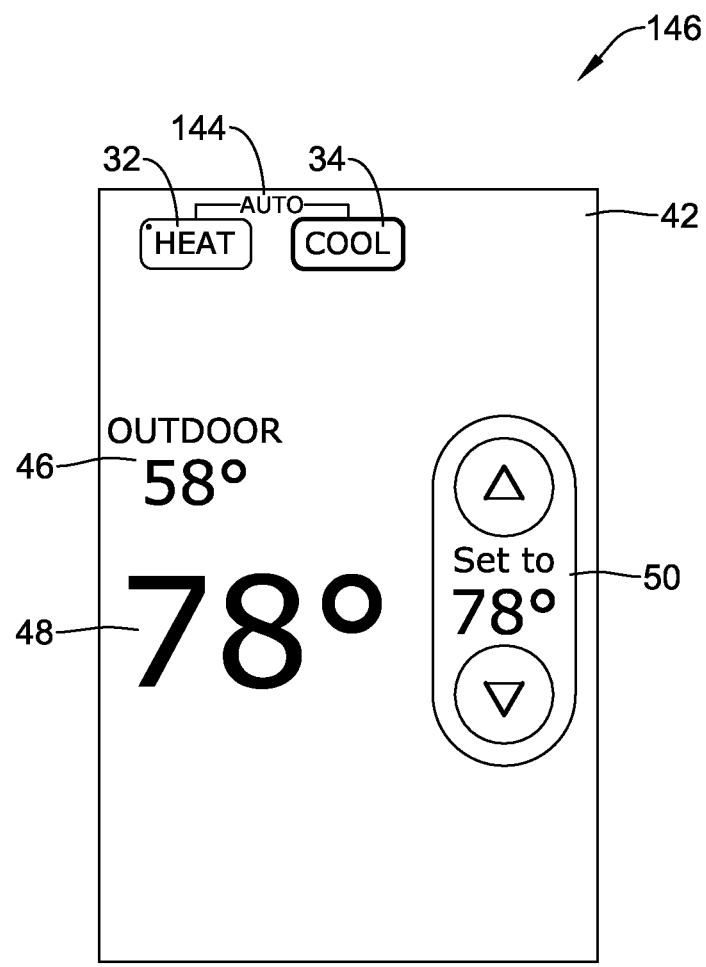
Figure 11C:
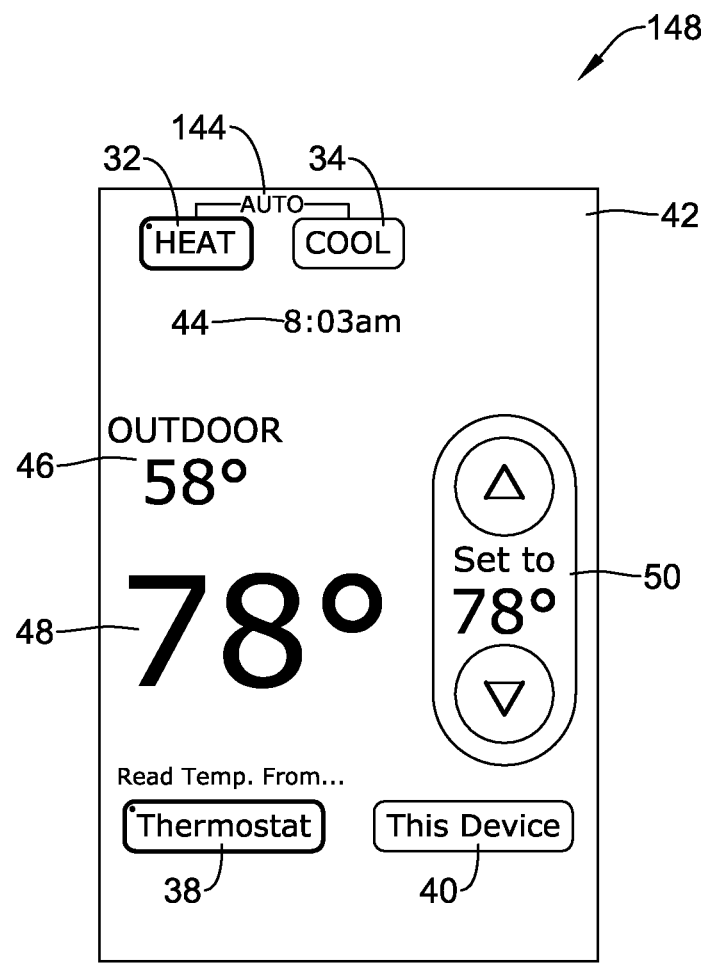
Figure 11D:
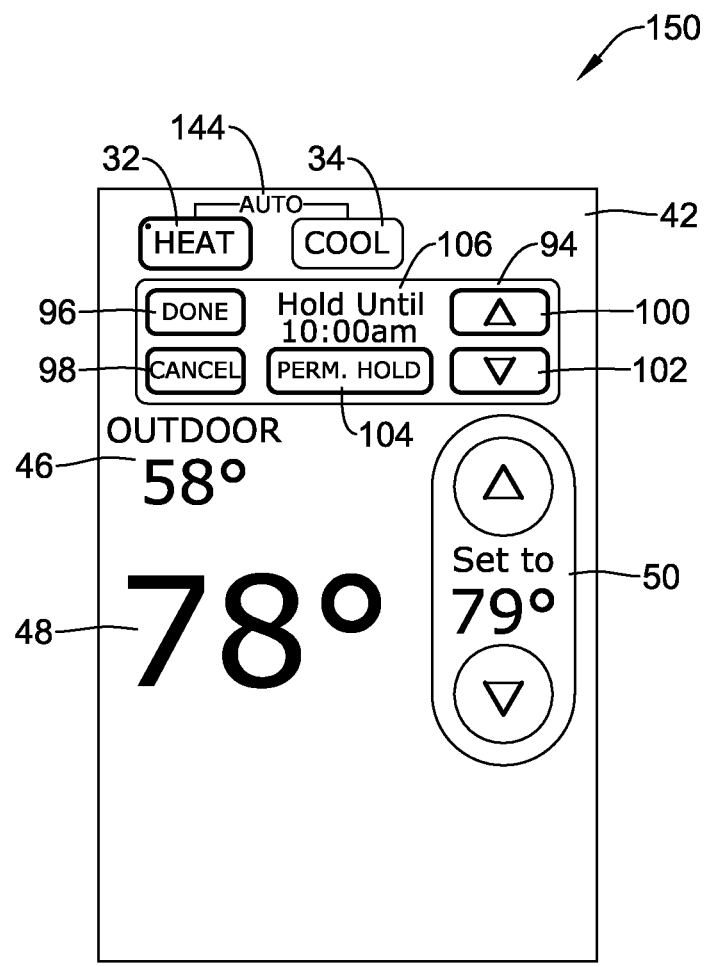
Figure 11E:
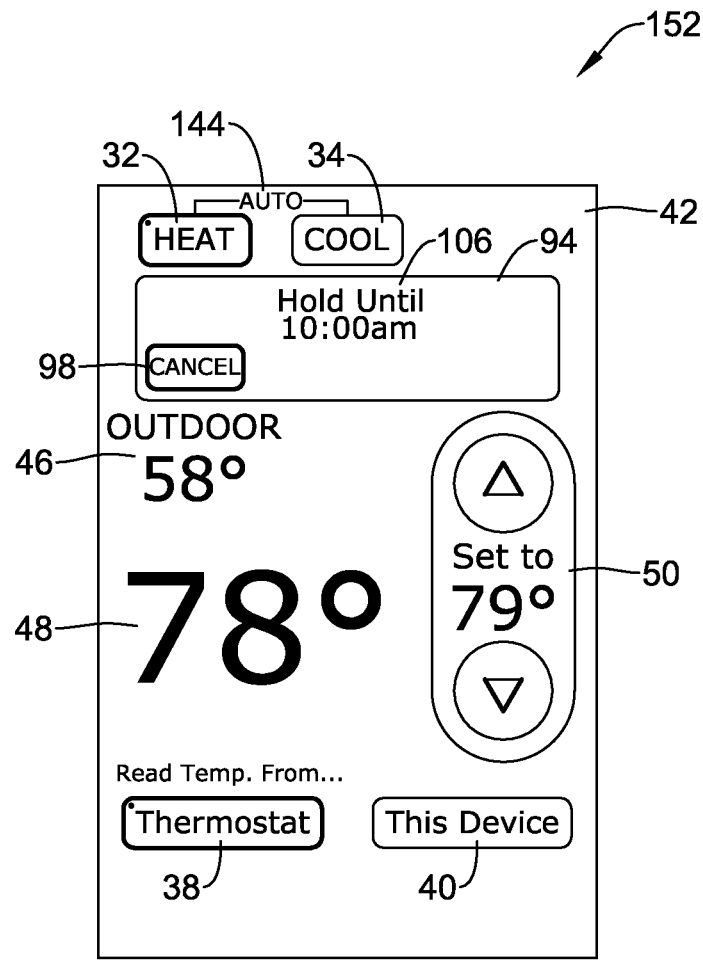
Figure 11F:
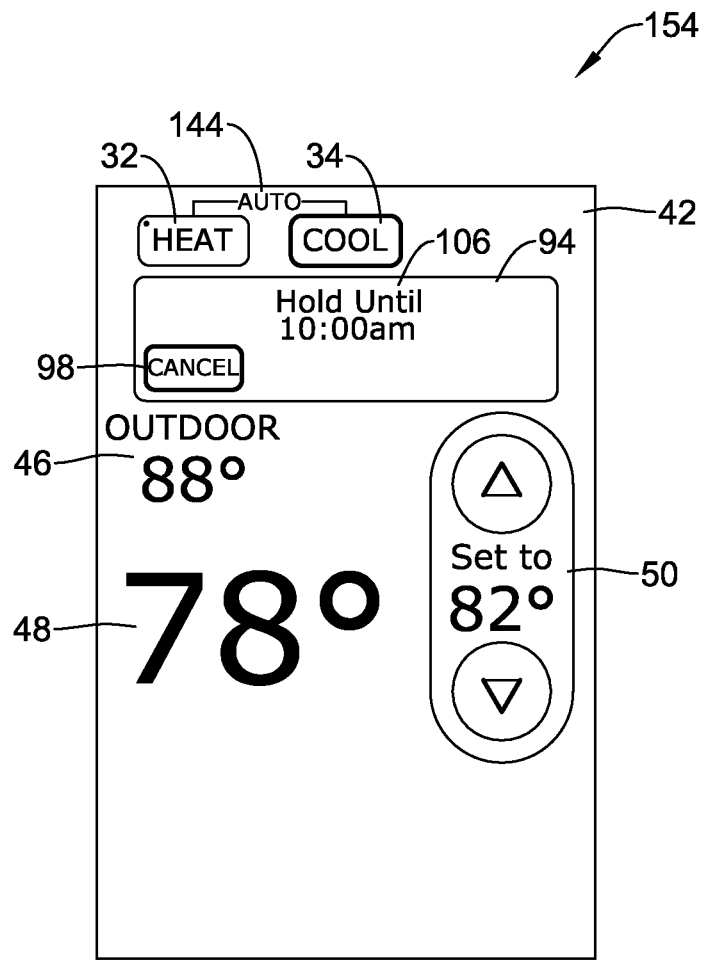
Figure 11G:
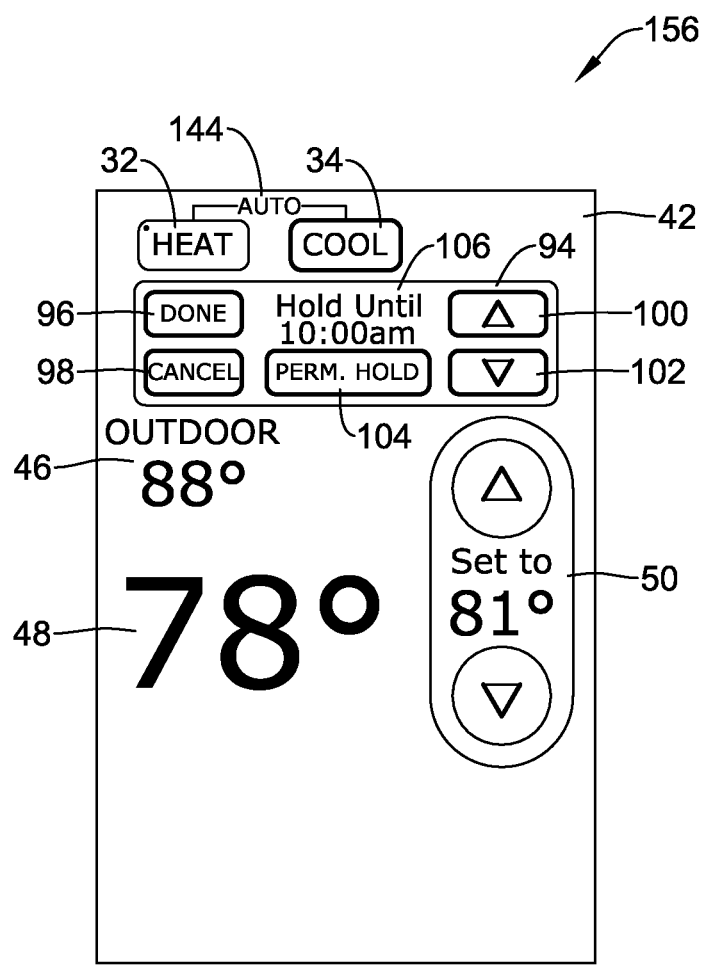
Figure 11H:
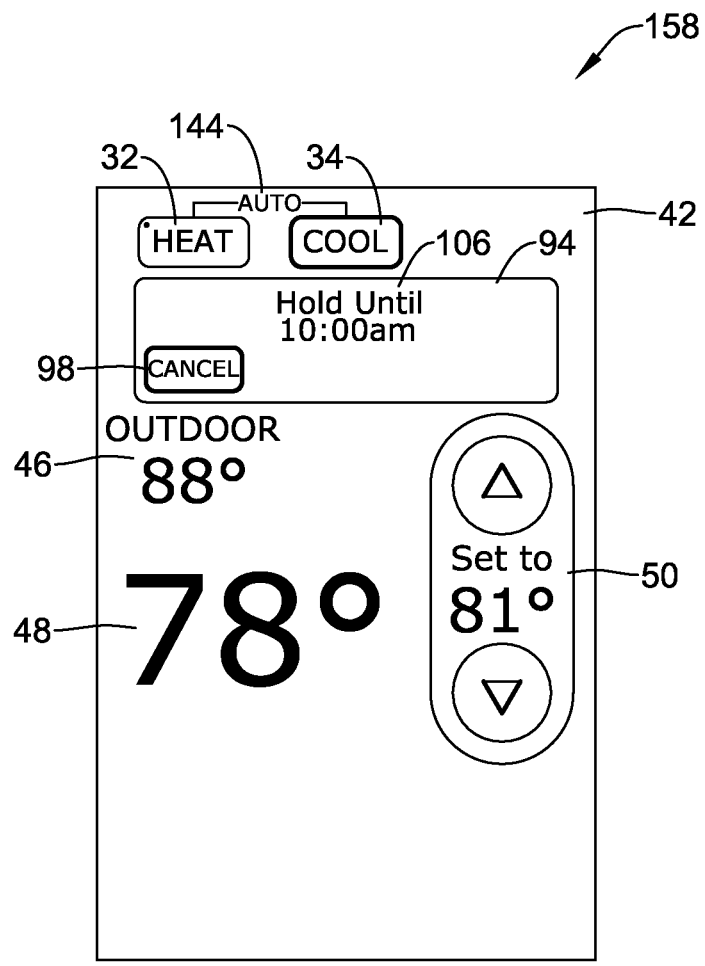
Figure 11I:
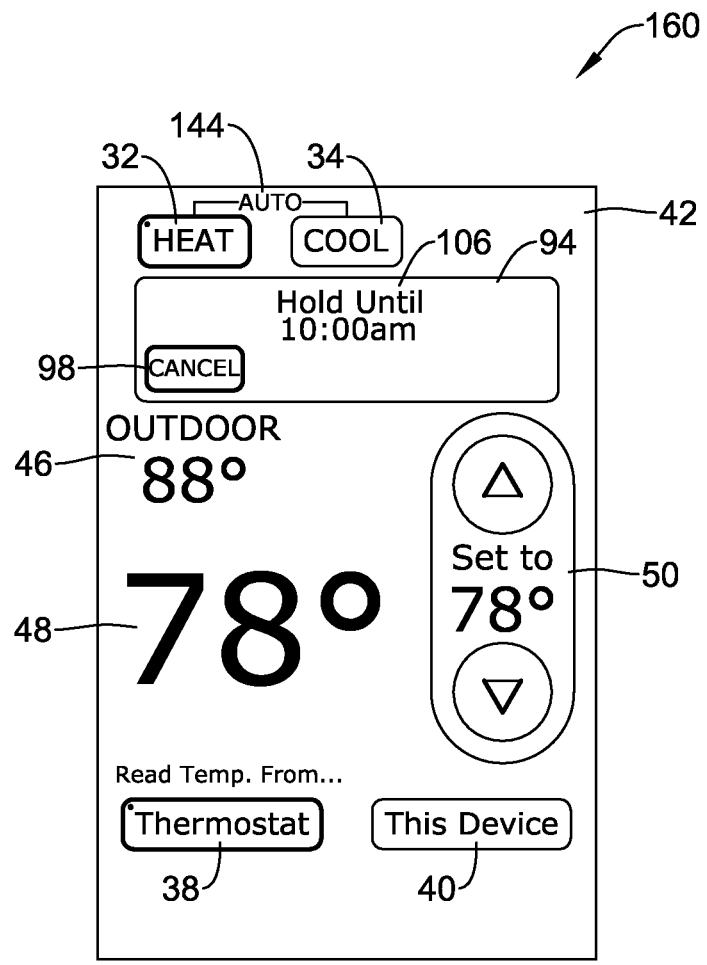
Figure 11J:
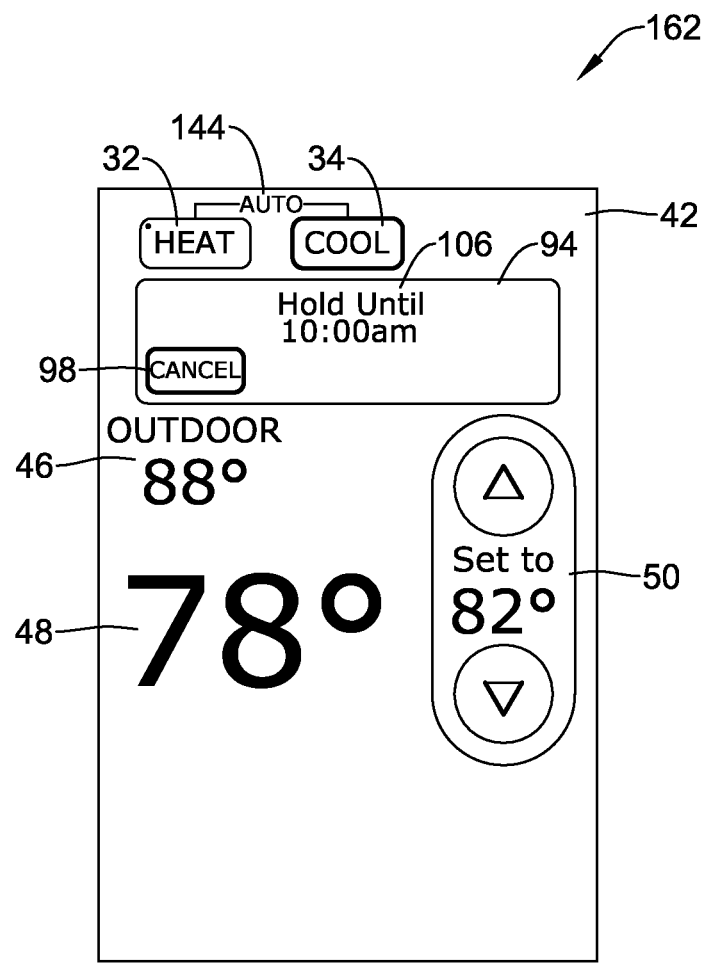
Figure 11K:
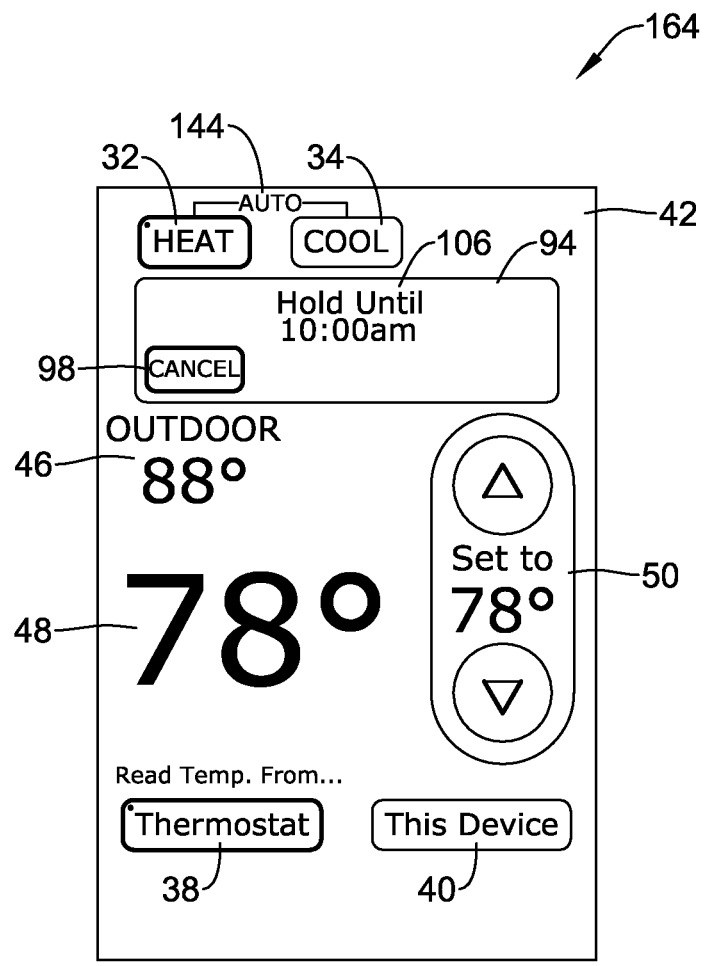
Figure 11L:
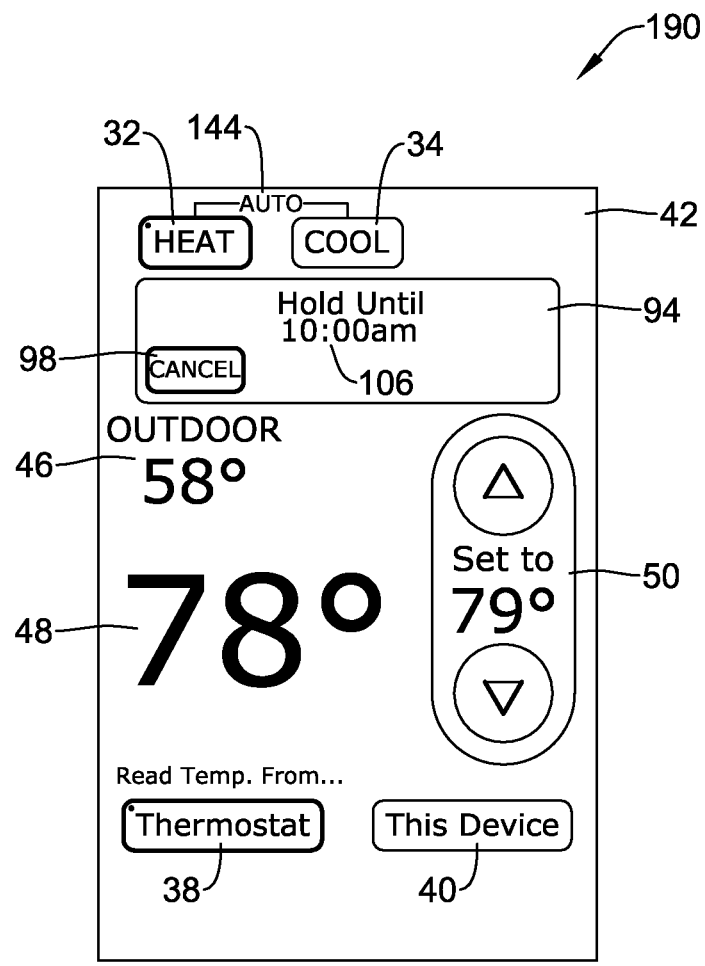
Figure 11M:
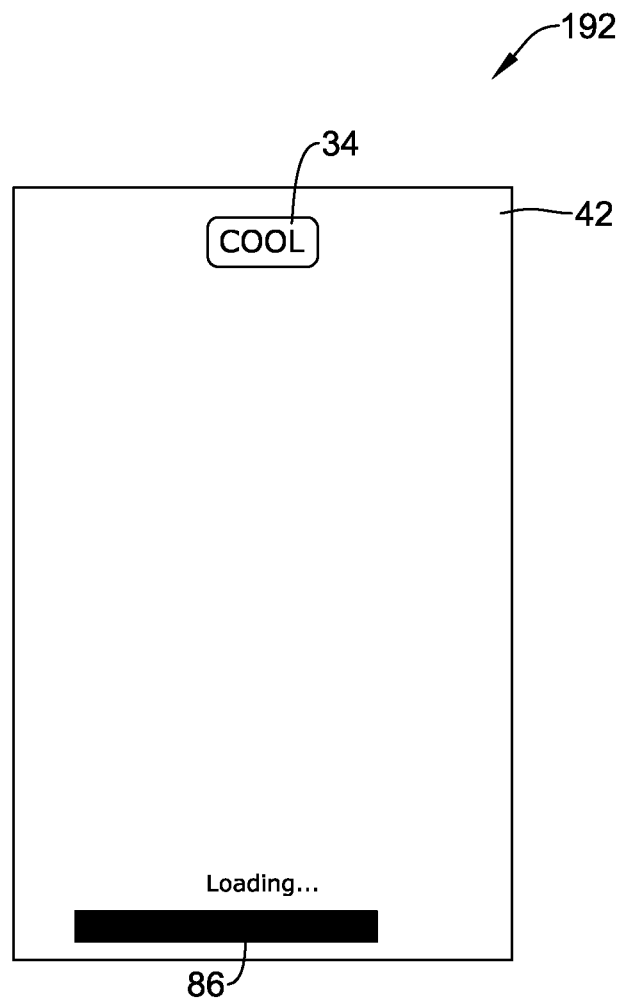
Figure 11N:
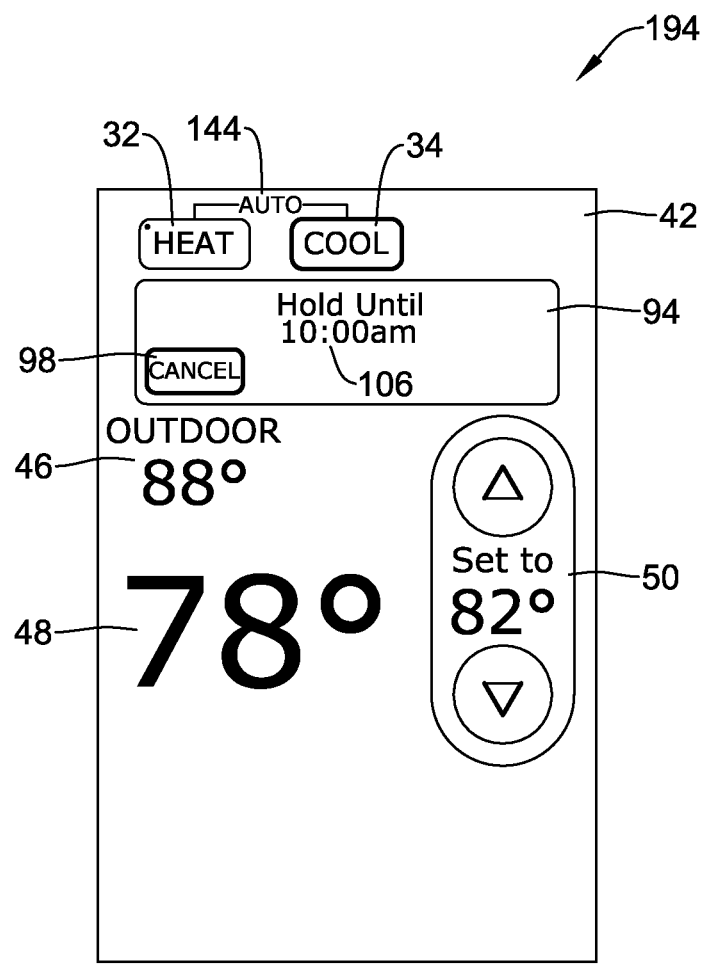

FIGS. 11A-11N are pictorial views showing illustrative screens that may be displayed on an illustrative HVAC remote controller touch screen display 42 for setting/changing an auto mode of the HVAC controller 8 and/or HVAC remote controller 24. In the illustrative embodiment, the touch screen display 42 may include the current time 44, the current outdoor temperature 46, the current inside temperature 48, the current head and/or cool set point 50, and the current device used to control the temperature of the comfort control system. In addition, when in auto mode, heat mode icon 32 and cool mode icon 34 may be displayed with "AUTO" text above the icons 32 and 34 as shown. In some cases, the auto mode may be entered via the HVAC remote controller 24 by detecting a touch of the touch screen display 42 corresponding to both the heat icon 32 and the cool icon 34 for a period of time. The period of time may be one second, two seconds, three seconds, four seconds, five seconds, or any other suitable time period, as desired. To exit the auto mode, the user may touch the touch screen display 42 corresponding to both the heat icon 32 and cool icon 34 for the period of time. Alternatively, it is contemplated that a separate "auto" mode icon (not shown) may be provided on the display, which when touched, switches to the auto mode. When the auto mode is exited, the touch screen display 42 may display a home screen, such as, for example, home screen 30 shown in FIG. 3A.

When in auto mode, the user may view the set points 50 of both the heat and cool modes. As illustrated on screen 142 of FIG. 11A, the user may view the heat set points. To view the cool set points, the user may touch the touch screen display 42 adjacent to the cool icon 34. Then, screen 146 shown in FIG. 11B may be displayed on the touch screen display 42. As illustrated, the current outdoor temperature 46, the current indoor temperature 48, and the current cool set point 50 may be displayed on screen 146. In some cases, icon 34 may include a bold outline even though the HVAC remote controller is in heat mode. The heat mode may be indicated by the dot that remains within heat mode icon 32. After a period of time, touch screen display 42 may display screen 148 of FIG. 11C, which is similar to screen 142 if FIG. 11A showing the current heat set point 50.

FIG. 11D is a pictorial view showing a screen 150 that can be displayed on the touch screen display 42 to change the current set point 50 while in auto mode. To enter screen 150 for changing the current set point 50, the touch screen display 42 may monitor the touch screen adjacent to the current set point 50 for a touch. When a touch is detected adjacent to the current set point 50, hold display region 94 may be displayed, similar to that discussed above with reference to FIG. 8A. As illustrated, hold display region 94 may include a hold until time 106, a done icon 96, a cancel icon 98, an up arrow icon 100, a down arrow icon 102, and a permanent hold icon 106. Using the hold display region 94, the user may adjust the hold settings, such as, for example, the hold until time, set a permanent hold, or the user may continue to adjust the set point 50. When the desired hold setting is displayed, the user may touch the touch screen adjacent to the done icon 96 or may wait until the touch screen display 42 times out. When a temporary hold operation is properly setup, screen 152 shown in FIG. 11E may be displayed. To cancel the hold operation either during programming or after it is has been setup, cancel icon 98 may be touched to return the touch screen display 42 to show, for example, screen 142 of FIG. 11A.

FIGS. 11F-11K are pictorial views showing illustrative screens for changing the cool set point and/or other settings when the HVAC controller 8 is in auto-heat mode. Screen 154 shown in FIG. 11F may be displayed on the touch screen display 42 when, from screen 152 of FIG. 11E, the touch screen display 42 is touched adjacent to the cool icon 34. As illustrated, screen 154 shows the current set points and/or other settings of the cool mode, similar to screen 146 of FIG. 11B, with the addition of the hold display region 94. To adjust the cool set point, the user may touch the touch screen corresponding to either the up arrow or down arrow of cool set point 50. When the HVAC remote controller 24 detects a touch, screen 156 shown in FIG. 11G may be displayed on the touch screen display 42. While screen 156 is displayed, the cool set point 50 may be adjusted to a desired set point. Screen 156 may be removed from the touch screen display by detecting a touch of the touch screen 42 corresponding to icon 96 (DONE) or if no touch is detected on the touch screen display 42 and the HVAC remote controller 24 timeout period expires.

When a temporary hold operation has been properly setup, screen 158 shown in FIG. 11H may be displayed on touch screen display 42. As illustrated, screen 158 may be similar to screen 154 of FIG. 11F, showing the cool set point and/or other settings, but with the modified cool set point temperature 50. After a period of time, if no touches are detected on the touch screen display 42, the screen may timeout after a period of time. However, if the cool set point 50 is not at a desired set point, a touch of the up arrow and/or down arrow may return to screen 156 of FIG. 11G to allow for further changes.

If the timeout period for screen 158 expires, then screen 160 of FIG. 11I may be displayed on the touch screen display 42. The illustrative screen 160 may display the heat mode and current settings of the HVAC remote controller 24, similar to screen 152 of FIG. 11E. When the touch screen display 42 switches to screen 160, at the same time, the HVAC remote controller 24 may communicate with the one or more HVAC controllers 8 to upload and/or download current HVAC controller settings and/or parameters. In some cases, this data transfer may last seconds or minutes. When the data transfer is complete, touch screen display 42 may display screen 162, shown in FIG. 11J, illustrating the current cool settings. After a timeout period, screen 164 shown in FIG. 11K may be displayed. As illustrated, screen 164 may be the same as screen 160 showing the current mode and settings of the HVAC remote controller.

FIGS. 11L-11N are illustrative screens showing the HVAC remote controller 24 requesting cool mode set points from an HVAC controller 8 when in heat mode. As illustrated in screen 190, and as shown in FIG. 11L, the HVAC controller 8 may be set in auto heat mode, as indicated by "AUTO" 144 and the bold outline and dot of icon 32. Additionally, the heat set point may have been adjusted, as indicated by the hold display region 94. When the HVAC controller detects a touch of the touch screen display 42 adjacent to cool icon 34, screen 192 shown in FIG. 11M may be displayed on touch screen display 42.

In some cases, screen 192 may include a loading bar 86 indicating that the HVAC remote controller 24 is attempting to communicate with the HVAC controller 8. In some cases, this communication may be to upload and/or download cool mode set points, parameters, and/or other settings. In some cases, the communication may last for seconds or for minutes, depending on the application. When the cool set point information and/or other settings are uploaded to the HVAC remote controller 24, screen 194 shown in FIG. 11N may be displayed on touch screen display 42.

Figure 12:
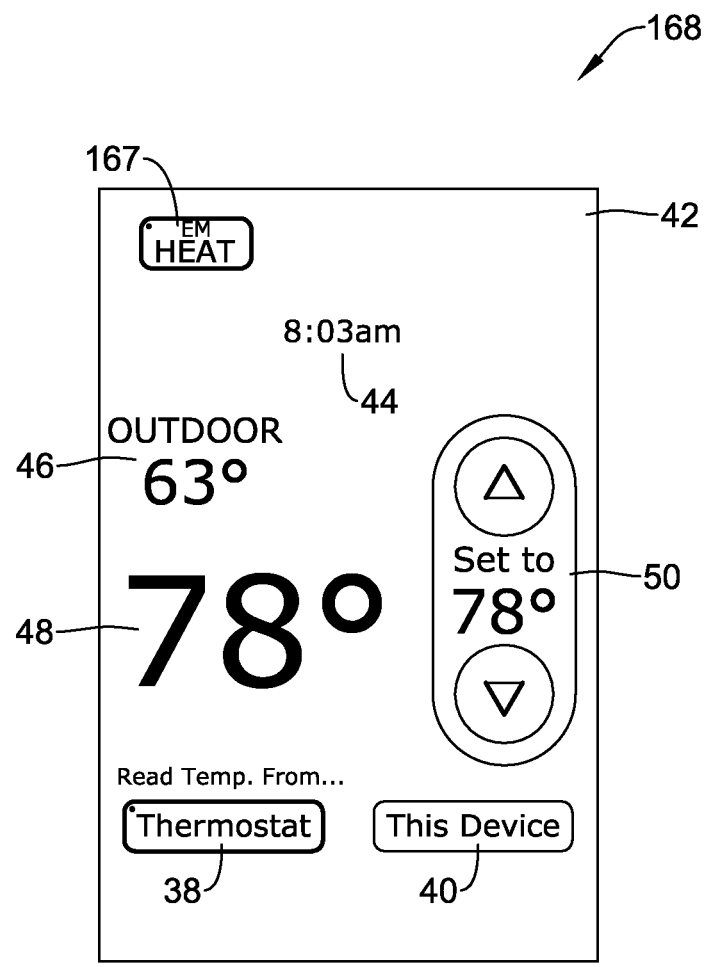

FIG. 12 is pictorial view showing illustrative emergency (EM) heat mode screens 168 that may be displayed on the touch screen display 42 of an illustrative HVAC remote controller 24. In some cases, an emergency heat mode may activate a second heat stage, or backup or supplemental heating, when a heat pump (or other heat source) is unable to provide sufficient heating to the building or other structure. In some cases, the EM heat mode may only be programmed through the HVAC controller 8 and, in this case, the touch screen display 42 of the HVAC remote controller 24 may only display the status of the HVAC controller 8. Additionally, in some cases, EM heat mode may only be exited via the HVAC controller 8. However, it is contemplated that, in some cases, the EM heat mode may be entered and exited via the HVAC remote controller 24, if desired.

As illustrated, when the HVAC controller 8 is in EM heat mode, screen 168 may include the current inside temperature 48, the current outside temperature 46, the current time 44, the current heat and/or cool set point 50, and the current device used for control of the HVAC comfort control system (e.g. HVAC controller icon 38, or HVAC remote controller icon 40). In the illustrative embodiment, instead of the foregoing described operational status icons 32, 34, and 36, icon 167 may be displayed indicating that the HVAC controller is in EM heat mode.

Figure 13:
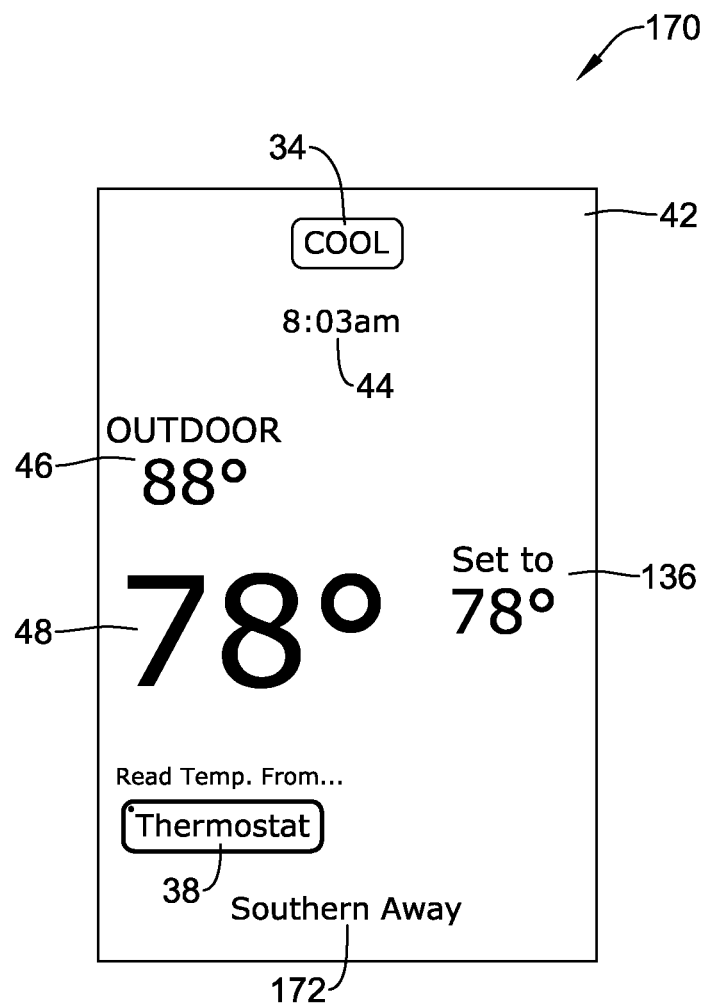

FIG. 13 is pictorial view showing an illustrative "southern away" hold screen 170 that may be displayed on the touch screen display 42 of an illustrative HVAC remote controller 24. In some cases, a southern away hold may be an extended hold that may provide appropriate heating or cooling to, for example, maintain the temperature and/or humidity levels below threshold values, as desired. This may help prevent excessive heat and/or moisture to buildup in a building or other structure, such as when the occupants of the house are away for an extended period of time. In some cases, a southern away hold may only be programmed and/or entered through the HVAC controller 8 and, in this case, the touch screen display 42 of the HVAC remote controller 24 may only display the status of the HVAC controller 8. Additionally, in some cases, southern away hold may only be exited via the HVAC controller 8. However, it is contemplated that, in some cases, a southern away hold may be entered and exited via the HVAC remote controller 24, such as, for example, similar to the temporary hold and permanent temperature hold operations discussed previously.

As illustrated, when the HVAC controller is in southern away hold, screen 170 of FIG. 13 may include the current inside temperature 48, the current outside temperature 46, the current time 44, the current heat and/or cool set point 50, the current device used for control of the HVAC comfort control system (e.g. HVAC controller icon 38, or HVAC remote controller icon 40), and the current operational status icon. In the illustrative embodiment, the operational status of the HVAC controller 8 may be in the cool mode when in the southern away hold and, as such, screen 170 may include cool mode icon 34. As illustrated, the touch screen display 42 may also include a southern away indicator 172 on at least a portion of the touch screen display 42, such as a lower portion of the display 42. In the illustrated example, the southern away indicator may include the text "SOUTHERN AWAY", but it is contemplated that any suitable indicator may be provided, as desired.

Figure 14B:
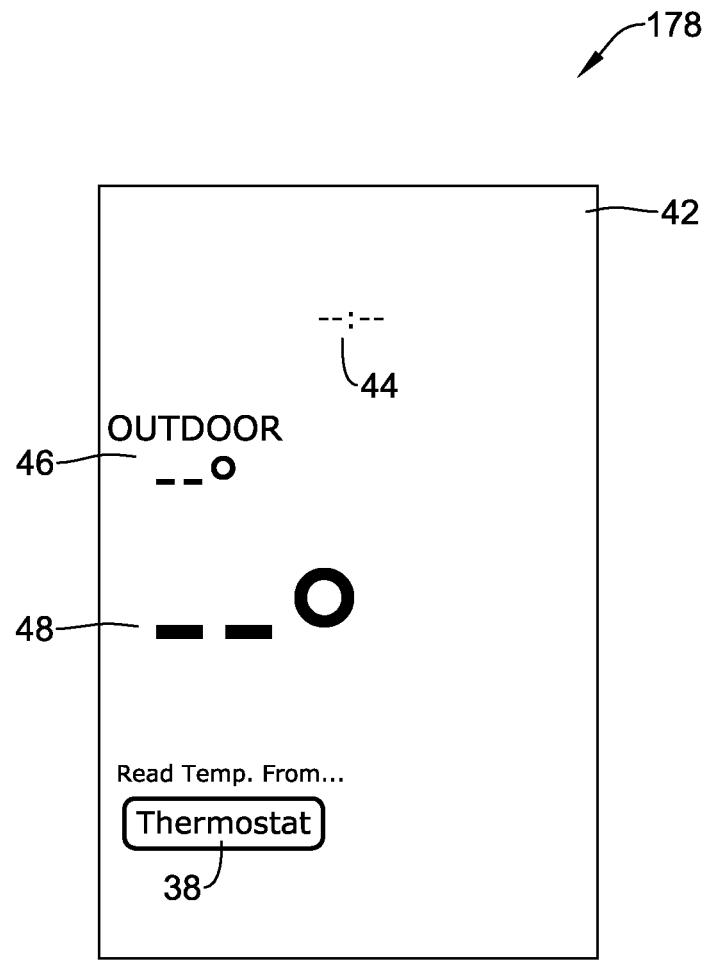

FIGS. 14A-14D are pictorial views showing illustrative no signal screens that may be displayed on the touch screen display 42 of an illustrative HVAC remote controller 24. In some cases, a "no signal" screen may be displayed when the HVAC remote controller 24 has failed to establish communication or has lost communication with one or more of the HVAC controllers 8. FIGS. 14A and 14B show illustrative no signal screens 174 and 178 that may be displayed on the illustrative HVAC remote controller 24 touch screen display 42 when the HVAC remote controller is not in a zoned HVAC system. As illustrated in FIG. 14A, when no signal is present, screen 174 may be empty with only a no signal indicator 176 provided on a portion of the display. FIG. 14B shows no signal screen 178, which may include the current time 44, the current outdoor temperature 46, the current inside temperature 48, and the current device controlling the comfort level in the building or other structure (e.g. icon 38). However, each of the current time 44, current outdoor temperature 46 and current inside temperature 48 may be blank or have dashed lines instead of the appropriate value, especially if current values are not available to the HVAC remote controller 24 via the wireless interface.

In some cases, either no signal screen 174 of FIG. 14A or no signal screen 178 of FIG. 14B may be provided when the HVAC remote controller 24 is unable to establish communication with the HVAC controller 8. Alternatively, in some cases, the HVAC remote controller 24 may toggle between screens 174 and 178 on the touch screen display 42. In some cases, the toggle rate may be 1 second, 2 seconds, 5 seconds, 10 seconds, 30 seconds, 1 minute, or any suitable rate of time, as desired.

Figure 14C:
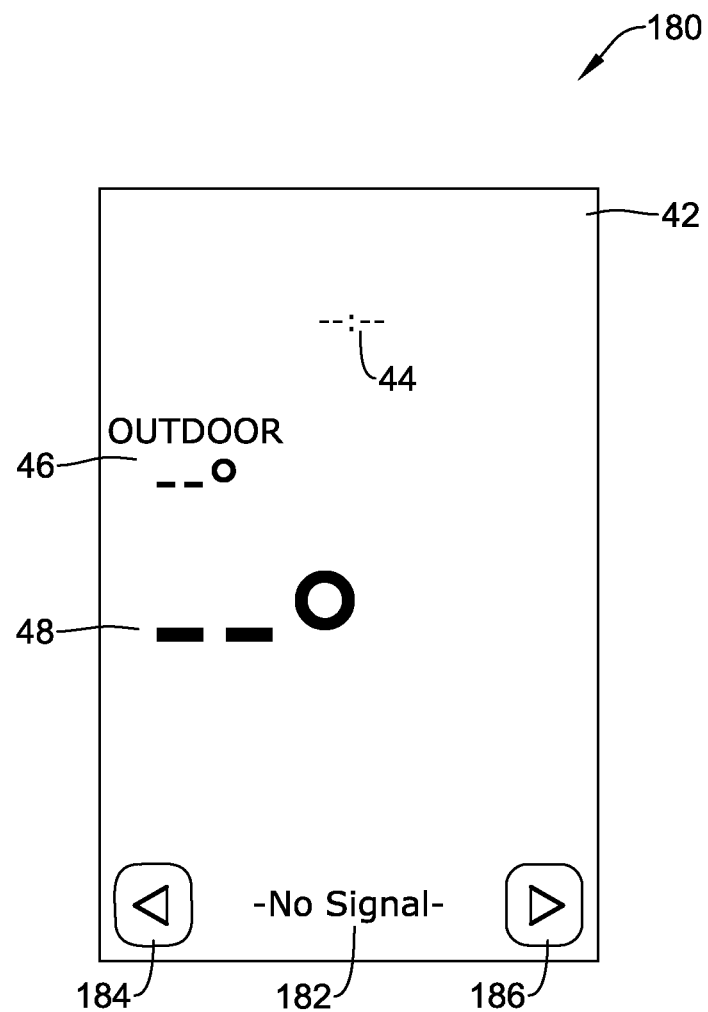
Figure 14D:
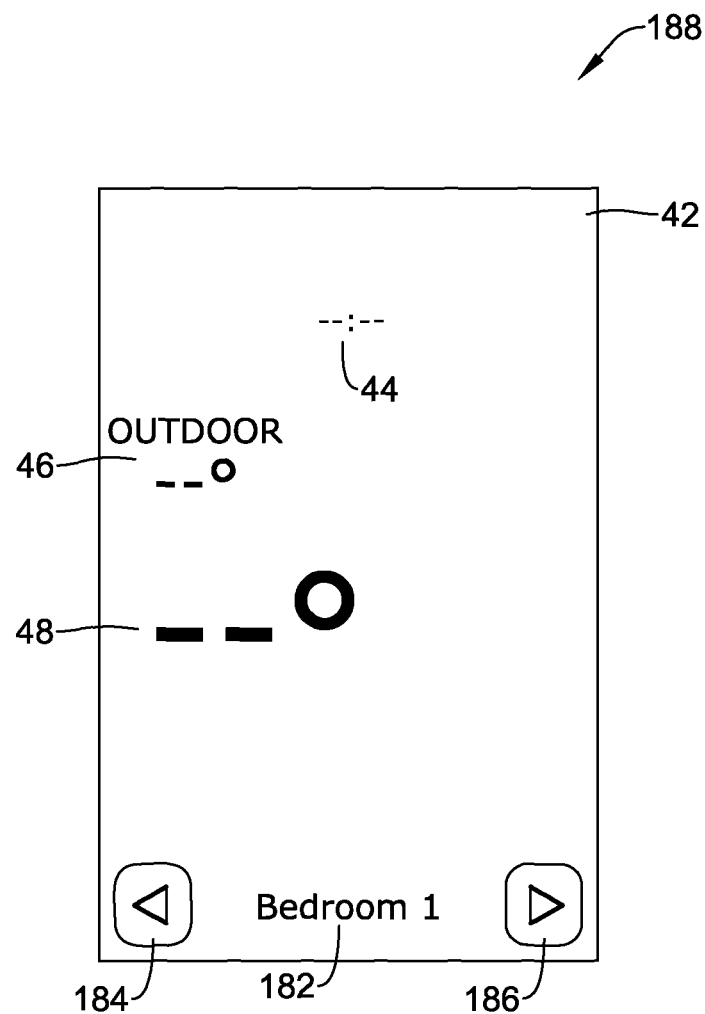

FIGS. 14C and 14D show illustrative no signal screens 180 and 188 that may be displayed on the illustrative HVAC remote controller 24 touch screen display 42 when the HVAC remote controller 8 is connected to a zoned HVAC system. As illustrated in FIGS. 14C and 14D, when no signal is present, screen 174 may include the current time 44, the current outdoor temperature 46, and the current inside temperature 48. However, each of the current time 44, current outdoor temperature 46, and current inside temperature 48 may be blank or have dashed lines appearing instead of the appropriate data value. As illustrated in FIGS. 14C and 14D, a pair of icons 184 and 186 may be provided in at least a portion of the touch screen display 42. Icons 184 and 186 may be arrows that allow a user to scroll through the available zones of the HVAC system, as discussed previously. In screen 180 of FIG. 14C, "NO SIGNAL" may be provided between icons 184 and 186 at region 182. In some cases, and as shown in FIG. 14D, the current zone may be displayed in region 182 of the touch screen display 42. For example, as illustrated, "BEDROOM 1" may be displayed at region 182. However, any suitable zone as discussed previously may be displayed at region 182, as desired.

In some cases, either no signal screen 180 of FIG. 14C or no signal screen 188 of FIG. 14D may be provided when the HVAC remote controller is unable to establish communication with a corresponding zoned HVAC controller 8. Alternatively, and in some cases, the HVAC remote controller 24 may toggle between the screens 180 and 188 on the touch screen display 42. In some cases, the toggle rate may be one second, two seconds, five seconds, ten seconds, thirty seconds, one minute, or any suitable rate of time, as desired. In some embodiments, if the user touches icons 184 and/or 186 to select a different zone in the HVAC system, and the HVAC remote controller 24 can establish communication with the corresponding HVAC controller 8, then neither of the no signal screens 180 and 188 may be displayed for the selected zone.

Figure 15A:
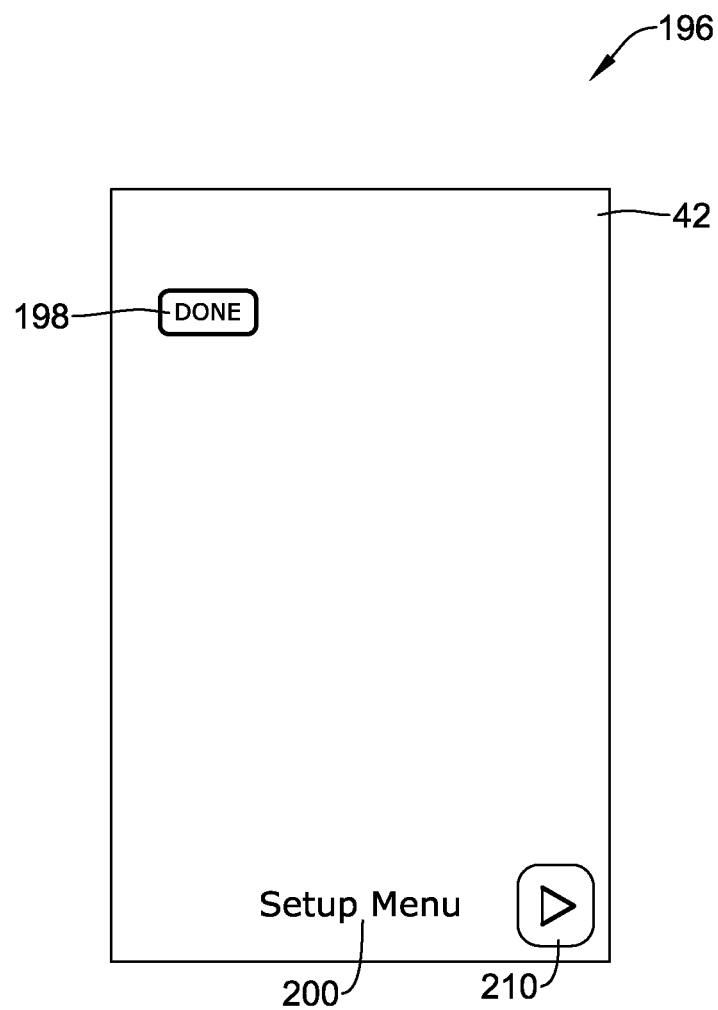
Figure 15B:
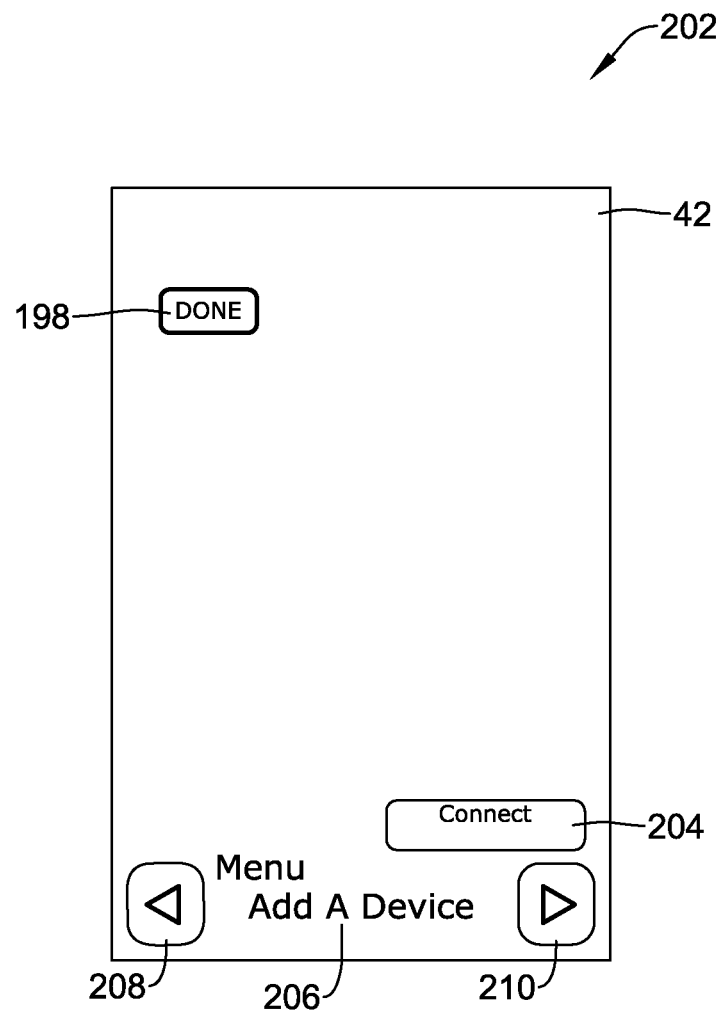
Figure 15C:
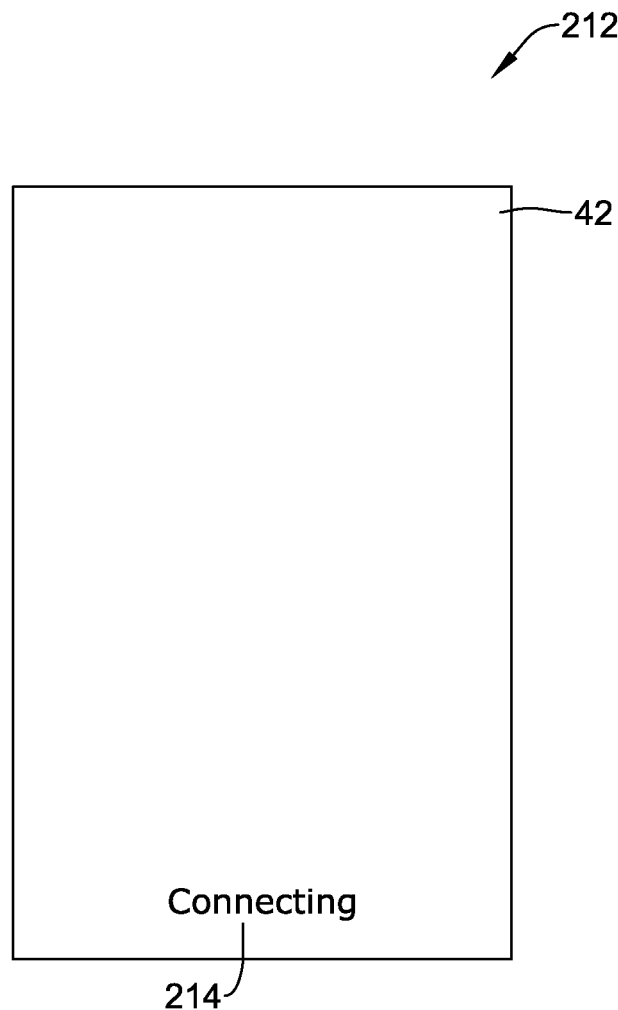
Figure 15D:
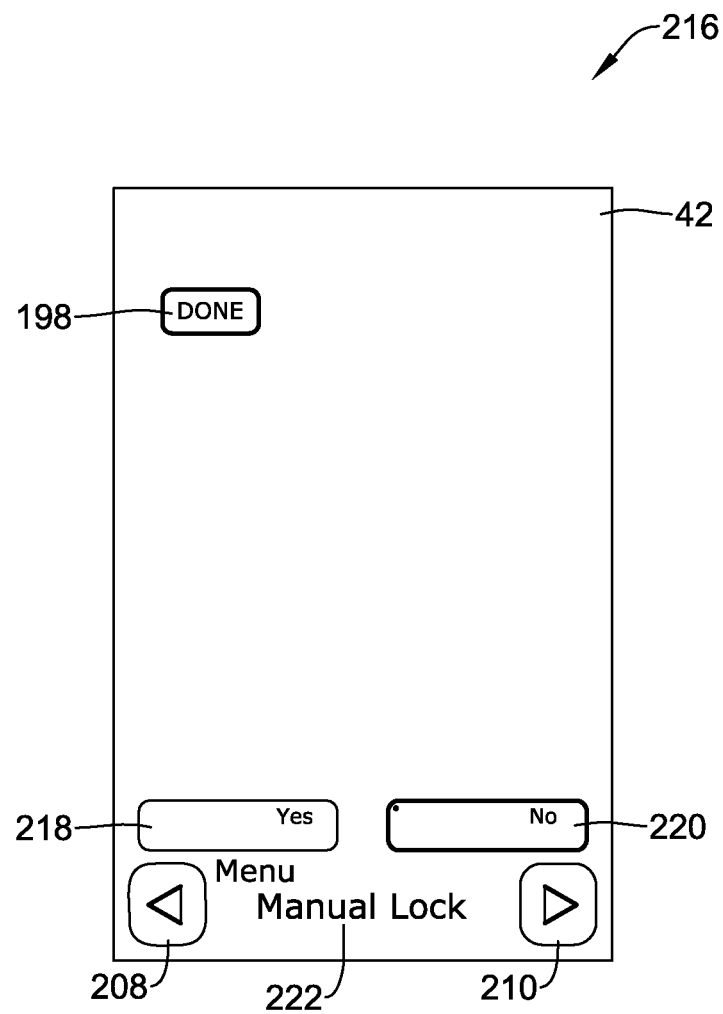
Figure 15E:
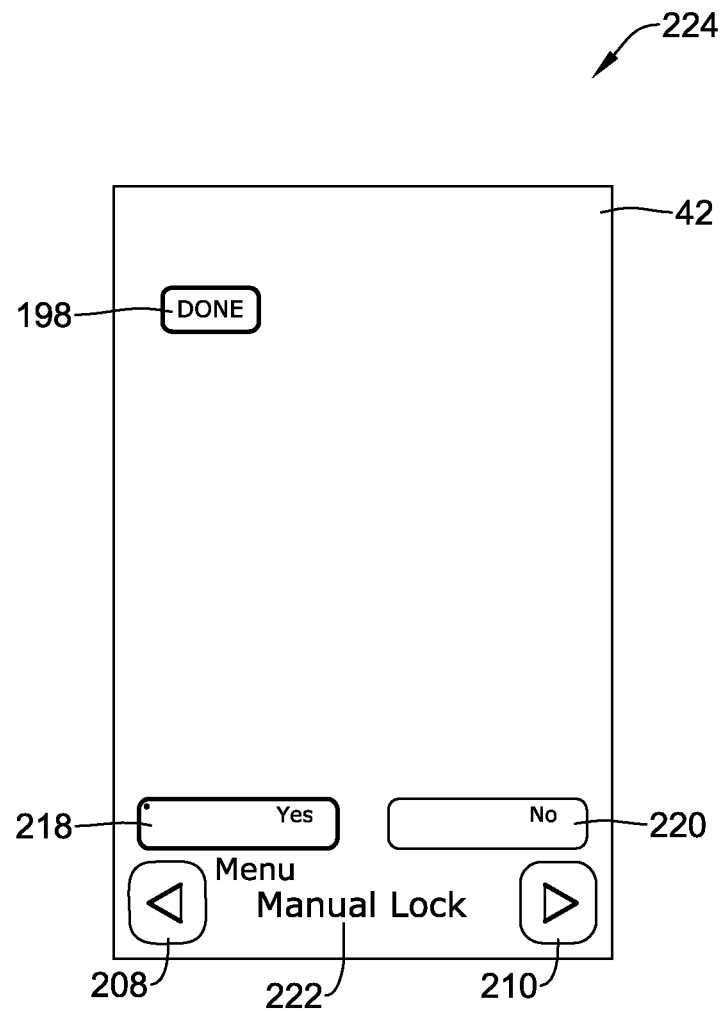
Figure 15F:
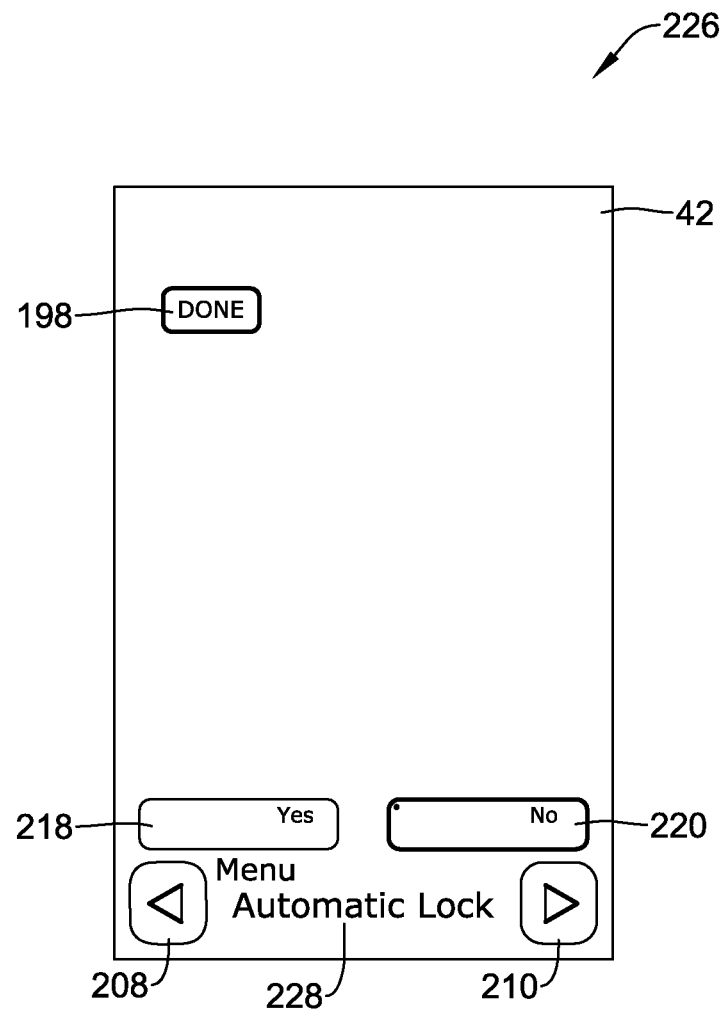
Figure 15G:
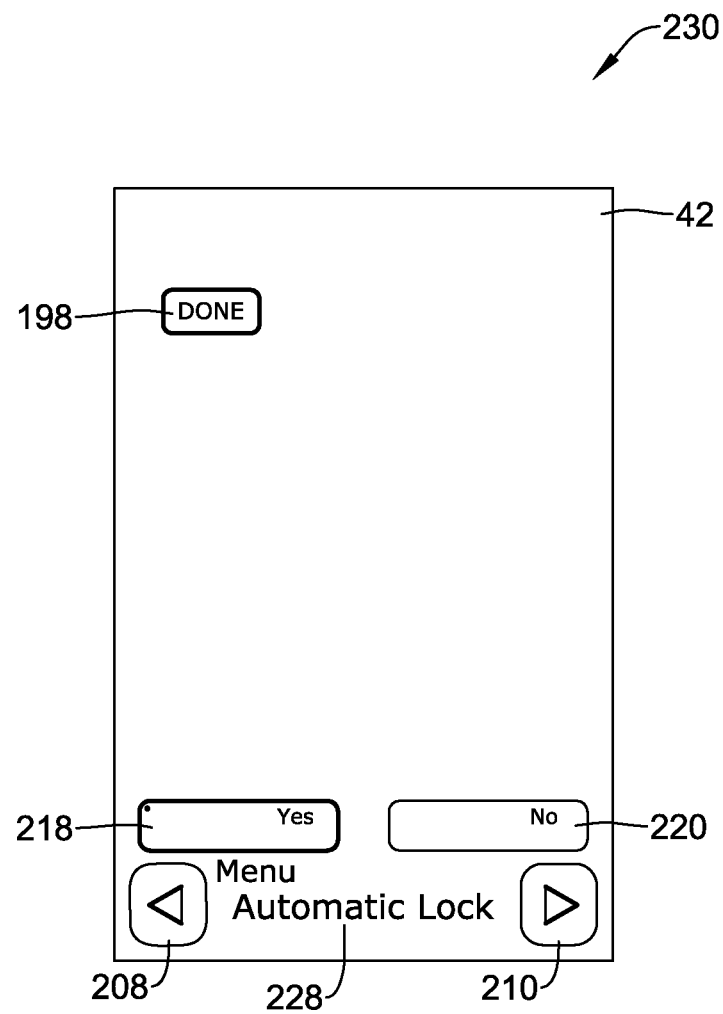
Figure 15H:
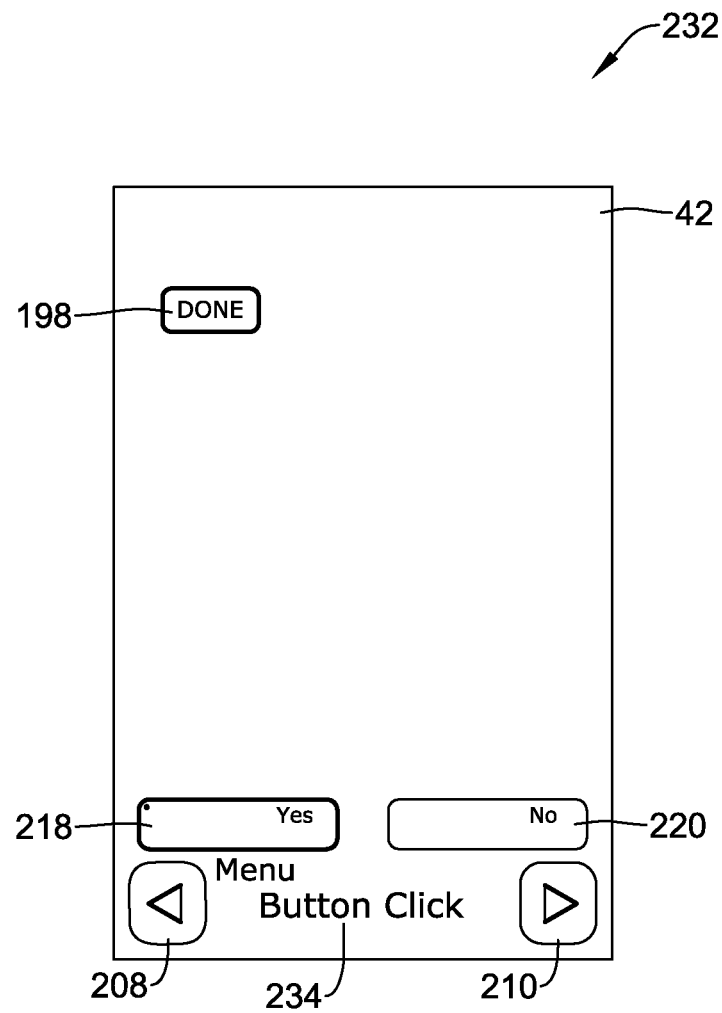
Figure 15I:
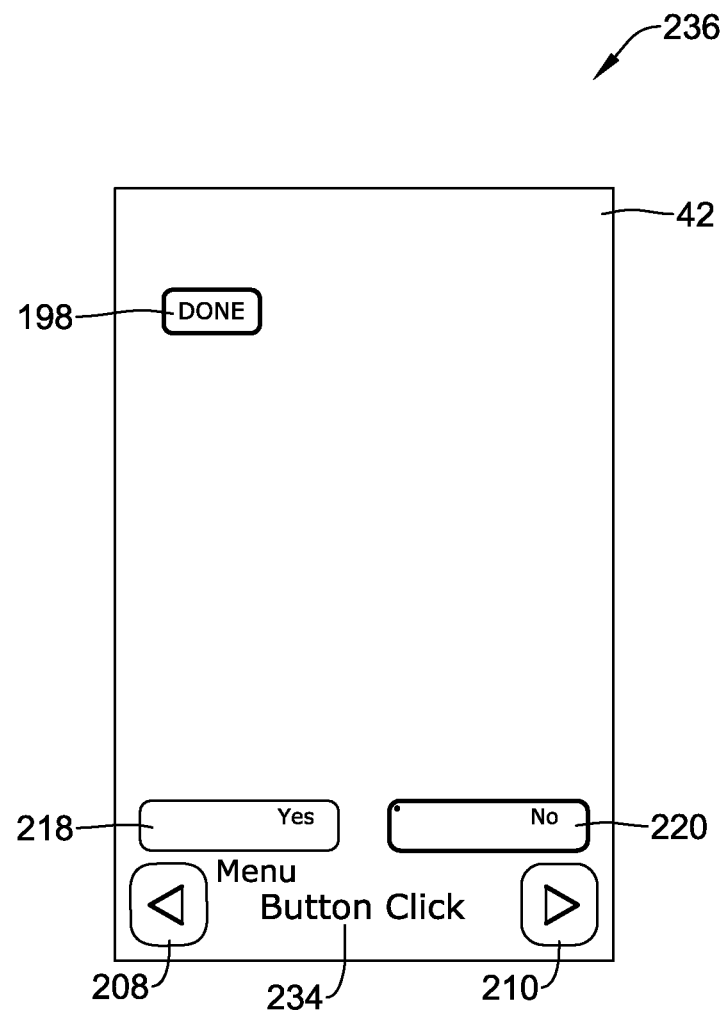
Figure 15J:
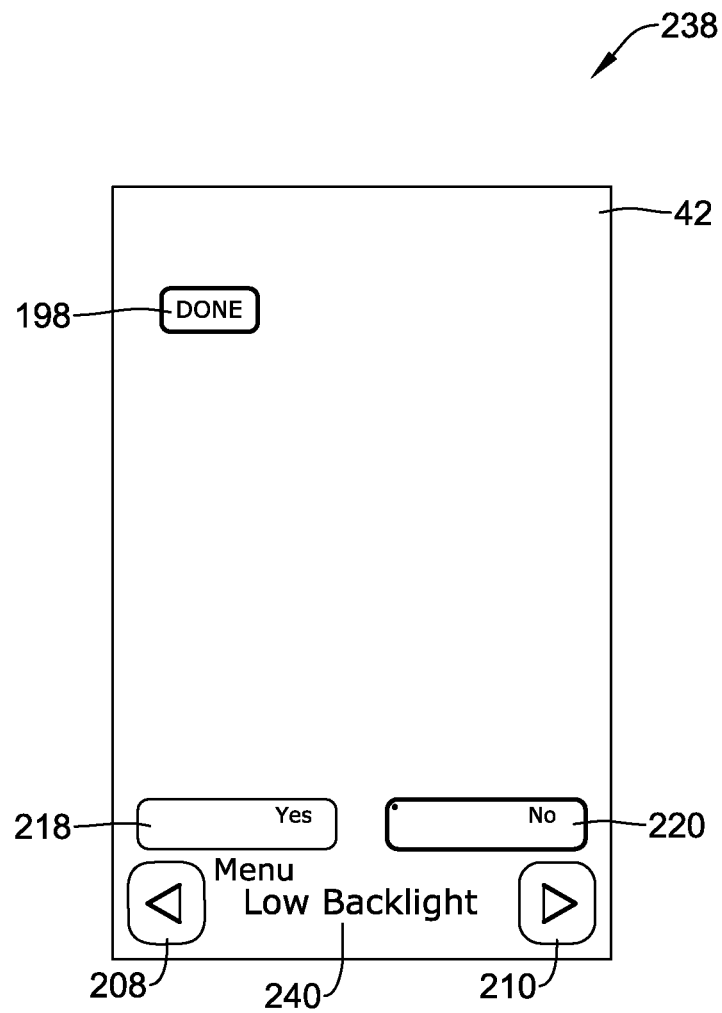
Figure 15K:
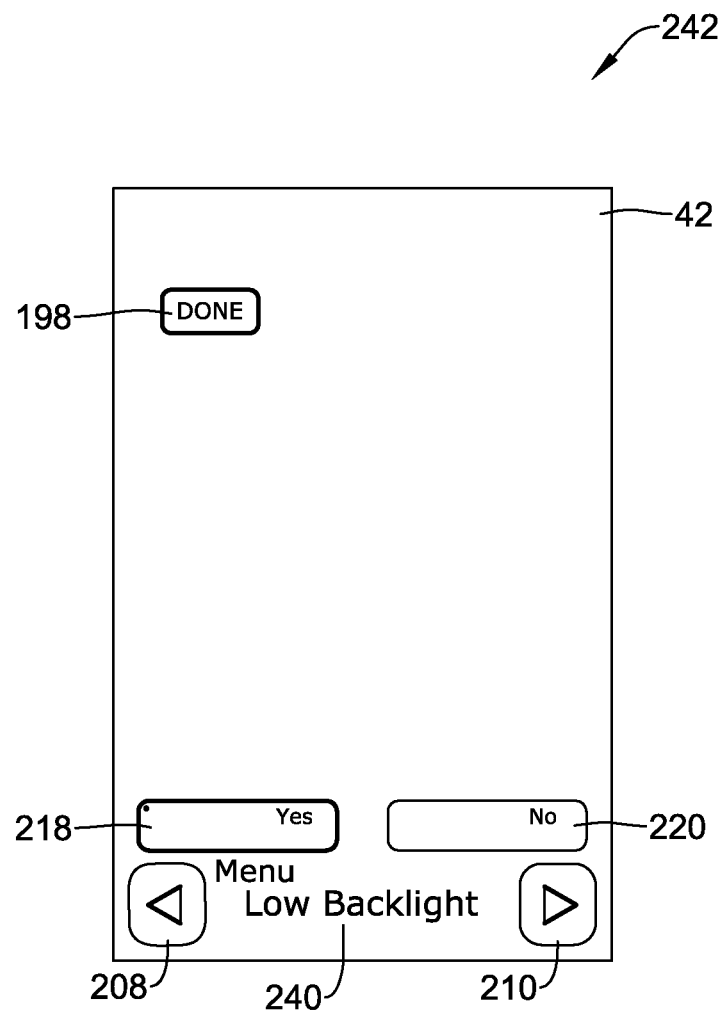
Figure 15L:
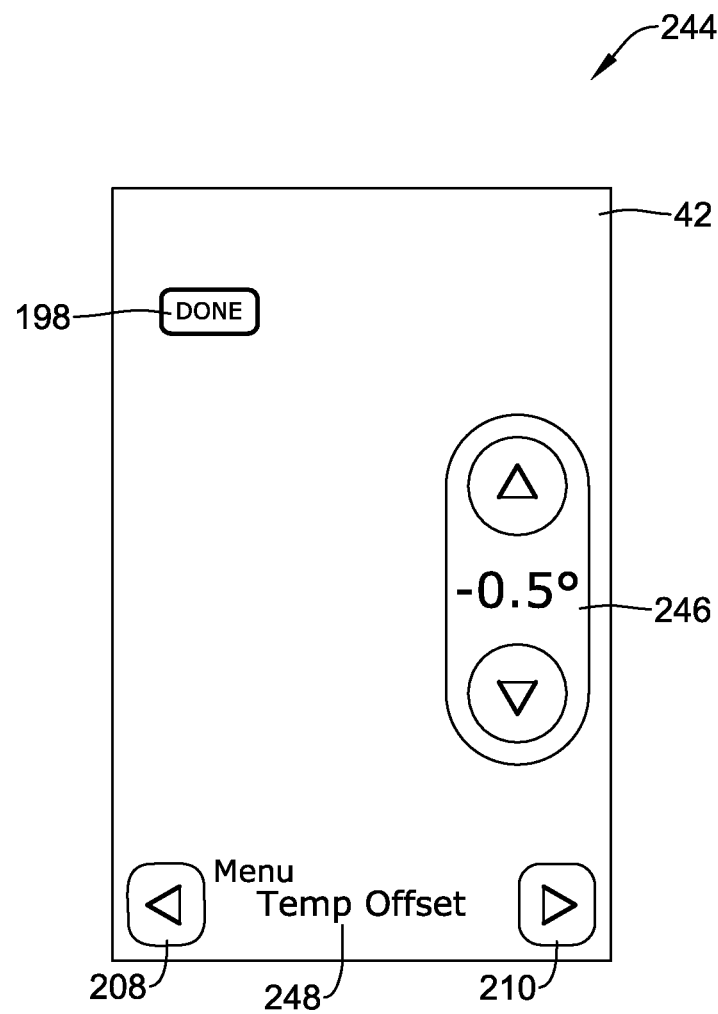
Figure 15M:
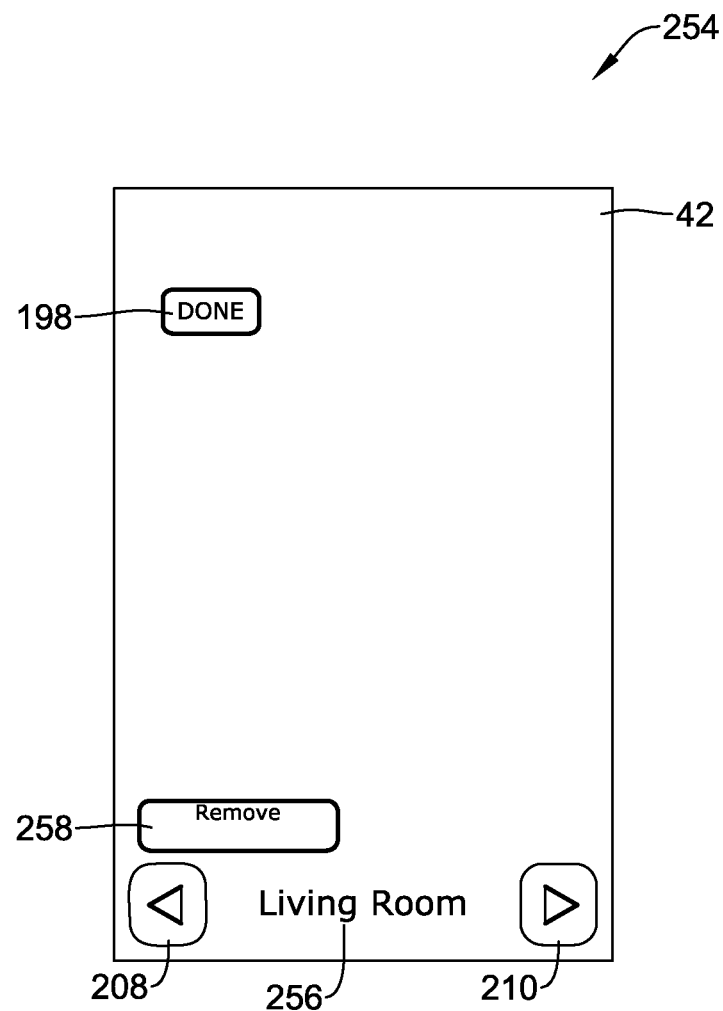
Figure 15N:
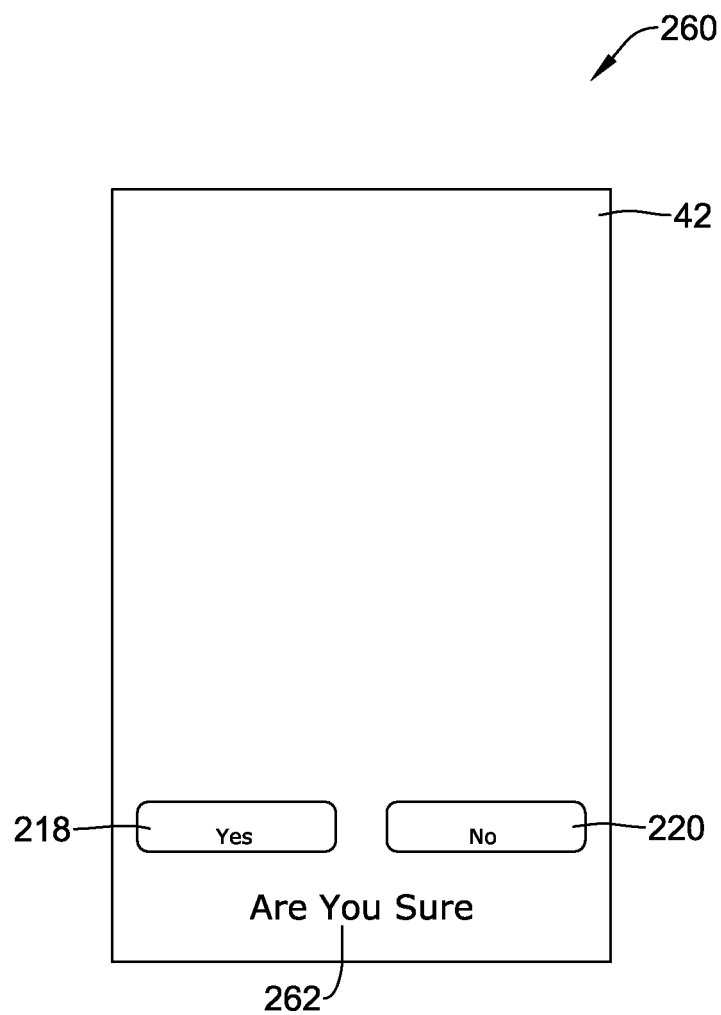
Figure 15O:
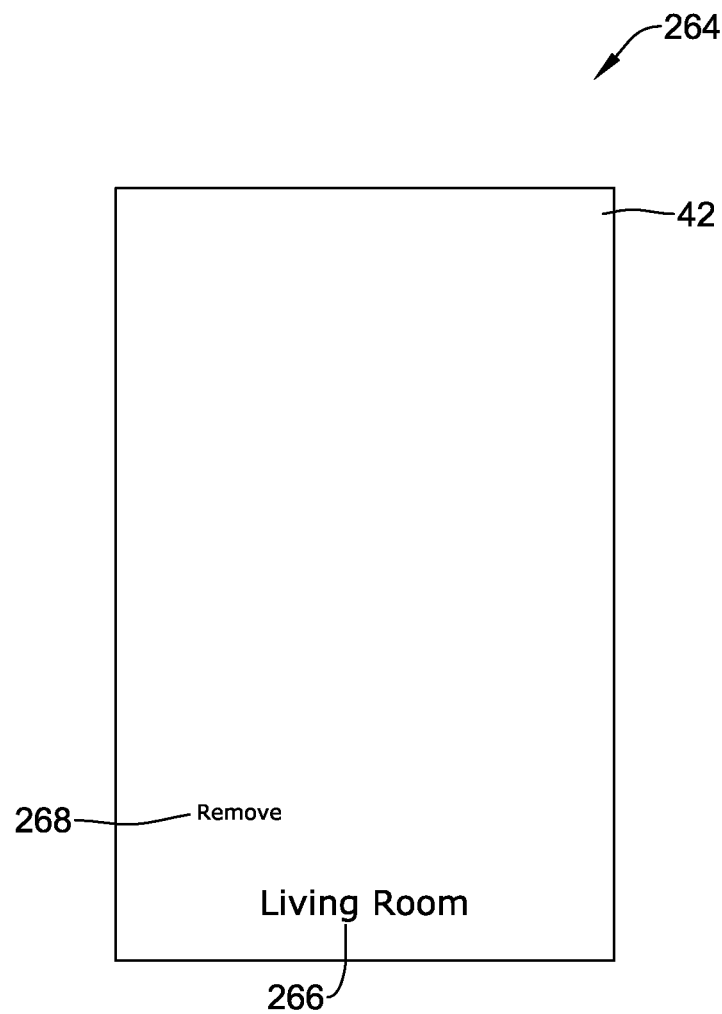
Figure 15P:
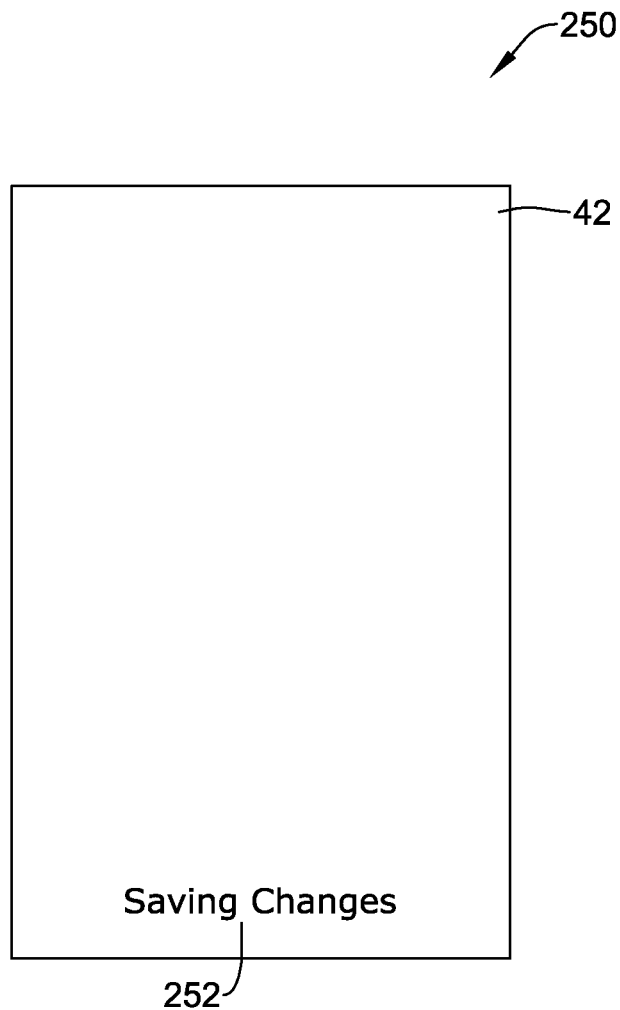

FIGS. 15A-15P are pictorial views of illustrative screens that may be displayed on the touch screen display 42 of an illustrative HVAC remote controller 24. In the illustrative embodiment, FIGS. 15A-15P may provide a series of screens, typically accesses sequentially, that help set up the HVAC remote controller 24. In some cases, the series of screens are at a common menu level rather than a sub-menu. It is contemplated that the illustrative screens may provide an easily navigatable menu including readable words to indicate the menu settings and/or available options as well as the current settings.

The HVAC remote controller 24 may be configured to have a variety of options or settings that can be initially setup by an installer or other user. These options or settings can include, for example, a screen lock feature, a button click feature, a low backlight feature, a temperature offset, a number of zones setting, as well as other features and/or settings.

As illustrated in FIG. 15A, an illustrative setup screen 196 may be displayed on the touch screen display 42. In the illustrative example, screen 196 may include a message center to display the type of screen that is currently displayed. Screen 196 provides "SETUP MENU" 200 in the message center. Adjacent to the message center is an icon 210, having a directional arrow that can be used to navigate to the next screen. Also, icon 198, which may be a done icon, may be provided so that when the setup is completed, the setup menu may be exited and a home screen may be displayed.

In the illustrative embodiment, when the user selects icon 210 of FIG. 15A, the touch screen display 42 may display screen 202 shown in FIG. 15B. As illustrated, screen 202 may include "ADD A DEVICE" text 206 in the message center under a "MENU" heading. In this case, two arrow icons 208 and 210, left and right directional arrows, may be provided to allow the user to navigate forward and backward through the sequential menu structure. For example, a touch of the touch screen 42 corresponding to icon 210 may navigate to the next screen, such as, for example, screen 216 of FIG. 15D, and, a touch of the touch screen 42 corresponding to icon 208 may display the previous screen, or in this case, screen 196 of FIG. 15A.

In addition, icon 204, corresponding to a "connect to device" command, may be provided on screen 202. When icon 204 is touched, the HVAC remote controller 24 may attempt to connect to a device such as an HVAC controller 8 or other device. In some cases, during the connection attempt, screen 212 of FIG. 15C may be displayed on the touch screen display 42 to indicate the attempt. As illustrated, screen 212 may be a blank screen with only "CONNECTING" 214 provided in the message center. Once the HVAC remote controller 24 connects to the device, screen 202 may again displayed.

In some cases, the next menu screen, shown as screen 216 in FIG. 15D, may be displayed when icon 210 of screen 202 of FIG. 15B is touched. As illustrated, screen 216 may include done icon 198, forward and back navigation icons 208 and 210, and also "MANUAL LOCK" 222 in the message center. In some cases, manual lock may activate a screen lock function that requires the user to hold the lock/unlock icons 118, as described above with respect to FIGS. 9A and 9D, to lock/unlock the screen. As illustrated, screen 216 may also include an icon 218 for indicating that manual lock is to be set, and an icon 220 for indicating that manual lock is not to be set. In some cases, icon 218 may be a yes icon and icon 220 may be a no icon, but these labels are only illustrative. In the illustrative embodiment, the selected icon may include a bold outline and/or a dot to indicate that it is selected. However, it is contemplated that the selected icon may be designated in any suitable manner. As illustrated, icon 220 is selected, indicating that the manual lock feature is not enabled. To enable the manual lock feature, icon 218 may be touched. In this case, screen 224 shown in FIG. 15E may be displayed on the touch screen display 42. Screen 224 is the same as screen 216 except that icon 218 includes a bold outline and dot indicating that the manual lock feature is now enabled.

If the user selects the next screen by touching icon 210 from screens 216 or 224, screen 226 shown in FIG. 15F may be displayed. As illustrated, screen 226 may include done icon 198, forward and back navigation icons 208 and 210, and also "AUTOMATIC LOCK" 228 in the message center. In some cases, the automatic lock feature may automatically lock the HVAC remote controller screen after a period of inactivity by the user, and can be unlocked by, for example, touching icon 118 as described above with respect to FIGS. 9A and 9D. In some cases, there may be a delay before the screen is locked and/or unlocked.

As shown on screen 226 of FIG. 15F, icon 220 includes a bold outline and dot indicating that the automatic locking feature is disabled. Conversely, in screen 230 of FIG. 15G, icon 218 includes a bold outline and dot indicating that the automatic locking feature is enabled. As discussed previously, the feature may be disabled or enabled by detecting a touch of the touch screen corresponding to icons 218 or 220, as desired.

In some cases, if icon 208 is touched in either screen 226 or 230, the HVAC remote controller 24 may navigate back to screen 216 or 224, depending on whether the manual lock feature was enabled or disabled. If icon 210 is touched in either screen 226 or 230, the HVAC remote controller 24 may navigate to the next screen, which in some cases, is screen 232 shown in FIG. 15H. As illustrated in both screens 232 and 236 of FIGS. 15H and 15I, done icon 198, navigation icons 208 and 210, yes icon 218, and no icon 220 may be displayed. In the illustrative screens 232 and 236, "BUTTON CLICK" 234 may be displayed in the message center. In some cases, the button click feature may enable or disable a click or other sound to be emitted by the HVAC remote controller 24 when the touch screen is touched and the corresponding input is accepted by the HVAC remote controller 24. This may help provide feedback to the user that the input has been recognized by the HVAC remote controller 24. As shown on screen 232 of FIG. 15H, icon 218 includes a bold outline and dot, which in the illustrative embodiment, indicates that the button click feature is enabled. Conversely, in screen 236 of FIG. 15I, icon 220 includes a bold outline and dot, which in the illustrative embodiment, indicates that the button click feature is disabled. This feature may be enabled or disabled by simply touching icon 218 or 220, respectively.

In the illustrative embodiment, if the HVAC remote controller 24 is advanced to the next screen by touching icon 210 of FIG. 15H or 15I, screen 238 shown in FIG. 15J may be displayed. Screen 238 allows a user so configure a "LOW BACKLIGHT" feature of the HVAC remote controller 24. In screen 238, "LOW BACKLIGHT" 240 may be displayed in the message center. As shown on screen 238, icon 220 includes a bold outline and dot indicating that the low backlight feature is disabled. Conversely, in screen 242 of FIG. 15K, icon 218 includes a bold outline and dot indicating that the low backlight feature is enabled. As discussed previously, this feature may be enabled or disabled by simply touching icons 218 or 220, respectively.

In the illustrative embodiment, if the HVAC remote controller 24 is advanced to the next screen by touching icon 210 of FIG. 15J or 15K, screen 244 shown in FIG. 15L may be displayed. Screen 244 allows a user so configure a temperature offset feature of the HVAC remote controller 24. The temperature offset feature may offset the temperature that is provided on the display 42 relative to the temperature that is sensed by the temperature sensor. In screen 244, the label "TEMP OFFSET" 248 may be displayed in the message center. Screen 244 may also include a current temperature offset 246, which may be adjusted to increase and/or decrease the temperature offset to a desired value.

In the illustrative embodiment, if the HVAC remote controller 24 is advanced to the next screen by touching icon 210 of FIG. 15L, screen 254 shown in FIG. 15M may be displayed. As illustrated, screen 254 of FIG. 15M may include a done icon 198 and back and forward navigation icons 208 and 210. In the illustrative screen 254, the message center may display a list of zones connected to the HVAC remote controller 24, such as, for example, "LIVING ROOM" 256, or any other suitable zone or zones, as discussed previously. In screen 254, icons 208 and 210 may toggle or navigate through the list of connected zones for the HVAC remote controller 24. To remove a zone, remove icon 258 may be touched.

When remove icon 258 is touched, screen 260 of FIG. 15N may be displayed on the touch screen display 42. As illustrated, screen 260 may include yes icon 218, no icon 220, and "ARE YOU SURE" 262 message displayed in the message center. In screen 260, a user may reaffirm the removal of the selected zone by selecting yes icon 218, or the user may cancel the removal by selecting no icon 220. If yes icon 218 is selected, screen 264 shown in FIG. 15O may be temporarily displayed. As illustrated, screen 264 may identify the zone removed in the message center, which, in the illustrative example is "LIVING ROOM" 266 and may further include a remove indicator 268. After a period of time, screen 264 may timeout and screen 254 of FIG. 15M may be displayed but with a different zone identified in message center 256. If the no icon 220 is selected in screen 260, screen 254 may be displayed.

In the illustrative embodiment, when done icon 198 is selected from any of the screens described previously, screen 250 of FIG. 15P may be displayed on the touch screen display 42. Screen 250 may display "SAVING CHANGES" 252 in the message center. After a period of time, a home screen may be displayed on the touch screen display 42.

The illustrative setup parameters and menus described above with respect to FIGS. 15A-15P are merely illustrative and are not meant to be limiting in any manner. It is contemplated that any suitable HVAC remote controller and/or HVAC controller feature, parameter, and/or setting may be provided in a setup menu, as desired.

Figure 16A:
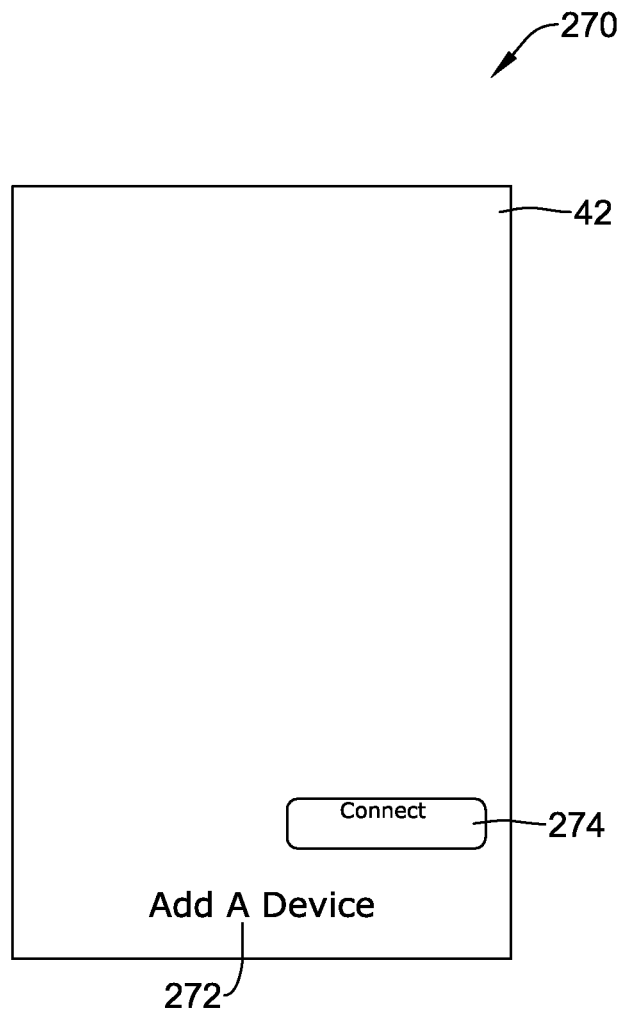
Figure 16B:
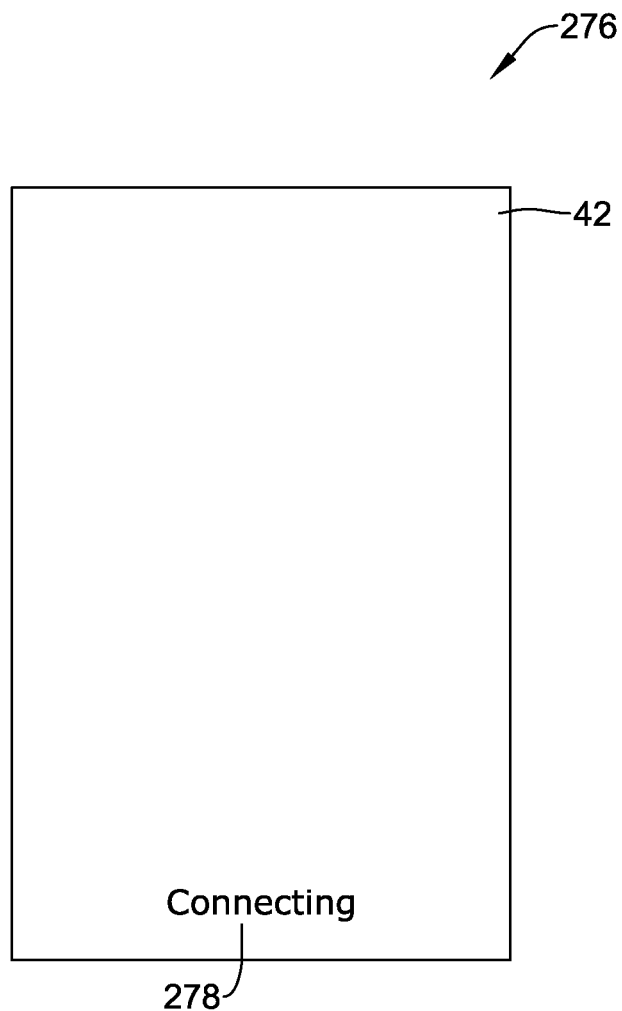

FIGS. 16A-16D are pictorial views of illustrative screens that may be displayed on the touch screen display 42 of an illustrative HVAC remote controller 24. In some cases, FIGS. 16A-16D may be the initial screens displayed when the HVAC remote controller is to be installed, or when the HVAC remote controller is removed from the box. As illustrated in FIG. 16A, screen 270 may be displayed on touch screen display 42. In the illustrative embodiment, the message center may provide "ADD A DEVICE" 272 along with icon 274 for initializing an attempt to establishing a connection with a device, such as an HVAC controller 8. When icon 274 is touched, screen 276 shown in FIG. 16B may be displayed on the touch screen display 42. In some cases, screen 274 may be a blank screen with "CONNECTING" 278 provided in the message center, and in some cases, may blink or otherwise provide an indication that the HVAC remote controller is working. In some cases, though not illustrated, a status bar may be provided if desired. After a period of time, if the HVAC remote controller is able to establish a connection with a device, screen 280 shown in FIG. 16C may be displayed on the touch screen display 42. If no connection is established, then screen 270, or, in some cases, the previously described no signal screens may be displayed, if desired.

Figure 16C:
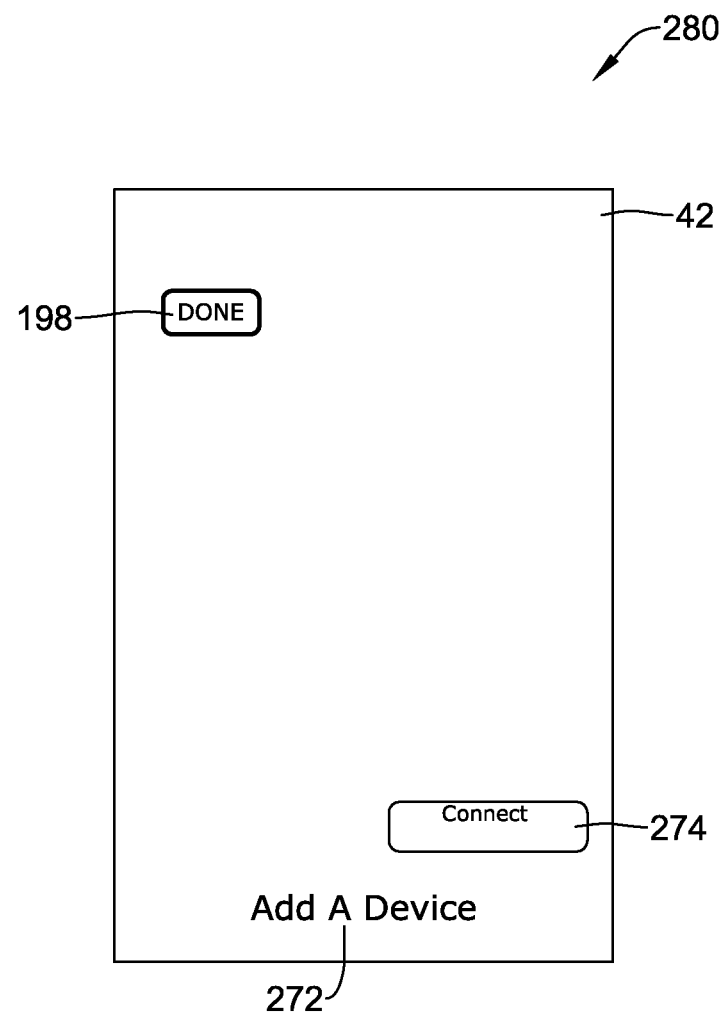
Figure 16D:
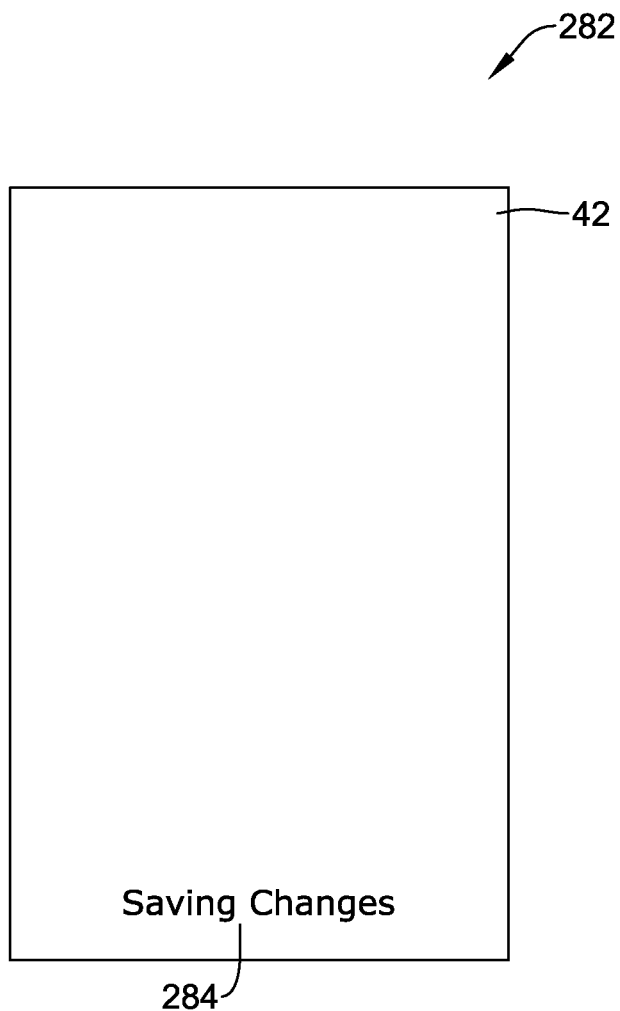

As illustrated, screen 280 shown in FIG. 16C may be similar to screen 270 with the addition of "DONE" icon 198. In some cases, a listing of all currently connected devices can be displayed. From this screen, another device may be added to the HVAC remote controller 24 or the setup may be finished. To add another device, icon 274 may again be touched, similar to that discussed above. To finish setup, the done icon 198 may be touched, and then, screen 282 shown in FIG. 16D may be displayed on the touch screen display 42. Screen 282 may provide "SAVING CHANGES" 284 in the message center. In the illustrative embodiment, screen 282 may be displayed on the touch screen display 42 for a period of time and then, an appropriate home screen of the HVAC remote controller 24 may be displayed.

While many of the foregoing embodiments have been described with reference to the HVAC controller 8 and/or HVAC remote controller 24 being in the heat mode or in the cool mode, this is not meant to be limiting in any manner. It is to be understood that the description with reference to the heat mode is equally applicable when the HVAC controller 8 and/or HVAC remote controller 24 are in the cool mode, and that the description with reference to cool mode is equally applicable to when the HVAC controller 8 and/or HVAC remote controller 24 are in the heat mode.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention.

What is claimed is:

1. A portable wireless remote control unit for use in conjunction with an HVAC system, the wireless remote control unit comprising:
   a hand-held portable housing;
   a wireless interface disposed within the portable housing;
   a temperature sensor disposed within the portable housing;
   a touch screen display secured to the portable housing and accessible from outside of the portable housing;
   a controller in communication with the wireless interface and with the touch screen display, the controller configured to communicate with the HVAC system via the wireless interface;
   the controller further configured to simultaneously display two or more selectable options on the display with each of the two or more selectable options having a border that defines a button having an interior region on the touch screen display, wherein the user is allowed to select one of the two or more selectable options by touching a corresponding defined button resulting in a selected option, wherein the controller displays a different border around at least part of the interior region of the button for the selected option than for the remaining ones of the two or more selectable options to visually distinguish the selected option from the remaining ones of the two or more selectable options, and wherein for the selected option, the interior region of the corresponding button is visually distinguishable from both the border and the different border; and
   wherein the controller further displays a marker within the confines of the different border of the selected option to further visually distinguish the selected option from the remaining two or more selectable options.

2. The portable wireless remote control unit of claim 1, wherein the marker is a dot.

3. The portable wireless remote control unit of claim 2, wherein the dot is positioned adjacent the top left corner of the button of the selected option.

4. The portable wireless remote control unit of claim 1, wherein the different border for the selected option is a highlighted border relative to the remaining ones of the two or more selectable options.

5. The portable wireless remote control unit of claim 1, wherein the touch screen display is a fixed segment touch screen display.

6. The portable wireless remote control unit of claim 1, wherein the touch screen display is a dot matrix touch screen display.

7. An HVAC system including one or more controllable HVAC components, the HVAC system comprising:
- a wall mountable thermostat configured to provide one or more control signals to the one or more HVAC components, the wall mountable thermostat including:
  - a first temperature sensor;
  - a wireless interface; and
  - a display;
- a portable hand-held remote control unit, the portable hand-held remote control unit comprising:
  - a controller;
  - a second temperature sensor;
  - a display; and
  - a wireless interface for communicating with the wall mountable thermostat via the wireless interface of the wall mountable thermostat wherein
  - the controller of the portable hand-held remote control unit simultaneously displays two or more options on the display of the portable hand-held remote control unit, wherein the user is allowed to select one of the two or more options resulting in a selected option, the two or more options including a first selectable option corresponding to selection of the wall mountable thermostat that when selected by a user causes the HVAC system to be controlled to a temperature sensed by the first temperature sensor of the wall mountable thermostat, and a second selectable option corresponding to the portable hand-held remote control unit that when selected by a user causes the HVAC system to be controlled to a temperature sensed by the second temperature sensor of the portable hand-held remote control unit, wherein the controller of the portable hand-held remote control unit displays a visual cue for the selected option that visually distinguishes the selected option from the remaining ones of the two or more options, wherein the visual cue includes a highlighted border around the selected option and a marker displayed in or adjacent the highlighted border.

8. The portable wireless remote control unit of claim 7, wherein the marker includes a dot positioned inside the highlighted border.

9. The portable wireless remote control unit of claim 7, wherein the visual cue includes a marker displayed in or adjacent the selected option.

10. The portable wireless remote control unit of claim 9, wherein the marker includes a dot.

11. The portable wireless remote control unit of claim 7, wherein each of the two or more options include a border.

12. The portable wireless remote control unit of claim 7, wherein the display is a fixed segment display.

13. The portable wireless remote control unit of claim 7, wherein the display is a dot matrix display.

14. The portable wireless remote control unit of claim 7, wherein the display is a touch screen display.

15. An HVAC controller comprising:
- a display;
- a controller in communication with the display;
- the controller configured to display a plurality of selection options on the display including a first selection option corresponding to a heating mode, a second selection option corresponding to a cooling mode and a third selection option corresponding to an off mode, wherein each of the selection options includes an interior region defined at least in part by a border, the interior region and border defining the selection option on the display, wherein the controller changes the border to visually indicate that the selection option has been selected by a user; and
- wherein the controller further provides a marker within the confines of the border to indicate that the selection option has been selected by a user.

16. The HVAC controller of claim 15, wherein the controller highlights the border to indicate that the selection option has been selected by a user.

17. The HVAC controller of claim 15, wherein the controller changes the border from a un-bolded border to a bolded border to indicate that the selection option has been selected by a user.

18. An HVAC controller comprising:
- a display;
- a controller in communication with the display; and
- the controller is configured to display a selection option on the display, wherein the selection option includes a border defining the selection option on the display, wherein the controller changes the border and adds a marker within or adjacent to the changed border to indicate that the selection option has been selected by a user.

19. The HVAC controller of claim 18, wherein the marker includes a dot.

* * * * *